(12) United States Patent
Horie et al.

(10) Patent No.: US 6,236,759 B1
(45) Date of Patent: May 22, 2001

(54) IMAGE PROCESSING APPARATUS

(75) Inventors: Hitoshi Horie, Aageo; Hideyuki Shirai, Tokyo, both of (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/070,775

(22) Filed: May 1, 1998

(30) Foreign Application Priority Data

Oct. 16, 1997 (JP) ..................................................... 9-299460

(51) Int. Cl.[7] ...................................................... G06K 9/36
(52) U.S. Cl. .......................... 382/244; 382/245; 382/246
(58) Field of Search ................................ 358/262, 261.1, 358/261.3, 427; 348/314; 382/244, 245, 246, 247

(56) References Cited

U.S. PATENT DOCUMENTS 5,574,834   11/1996  Horie .................................... 395/114
5,701,160 *  12/1997  Kimura ................................. 348/413

OTHER PUBLICATIONS

"Architectural Design of a Bi–Level Image High Speed CODEC", pp. 527–535, IEEE Transactions on Circuits and Systems for Video Technology, vol. 4, No. 6, Dec. 1994.

* cited by examiner

Primary Examiner—Jerome Grant, II
(74) Attorney, Agent, or Firm—Greenblum & Bernstein, P.L.C.

(57) ABSTRACT

This image processing apparatus comprises a plurality of coding/decoding devices performing encoding and decoding by different codes, internal memory which the each coding/decoding device shares, and a control section controlling operation of the each coding/decoding device, wherein the coding/decoding devices, internal memory and control section are integrated on one chip and encoded data are converted to the encoded data with a different form within one chip.

87 Claims, 57 Drawing Sheets

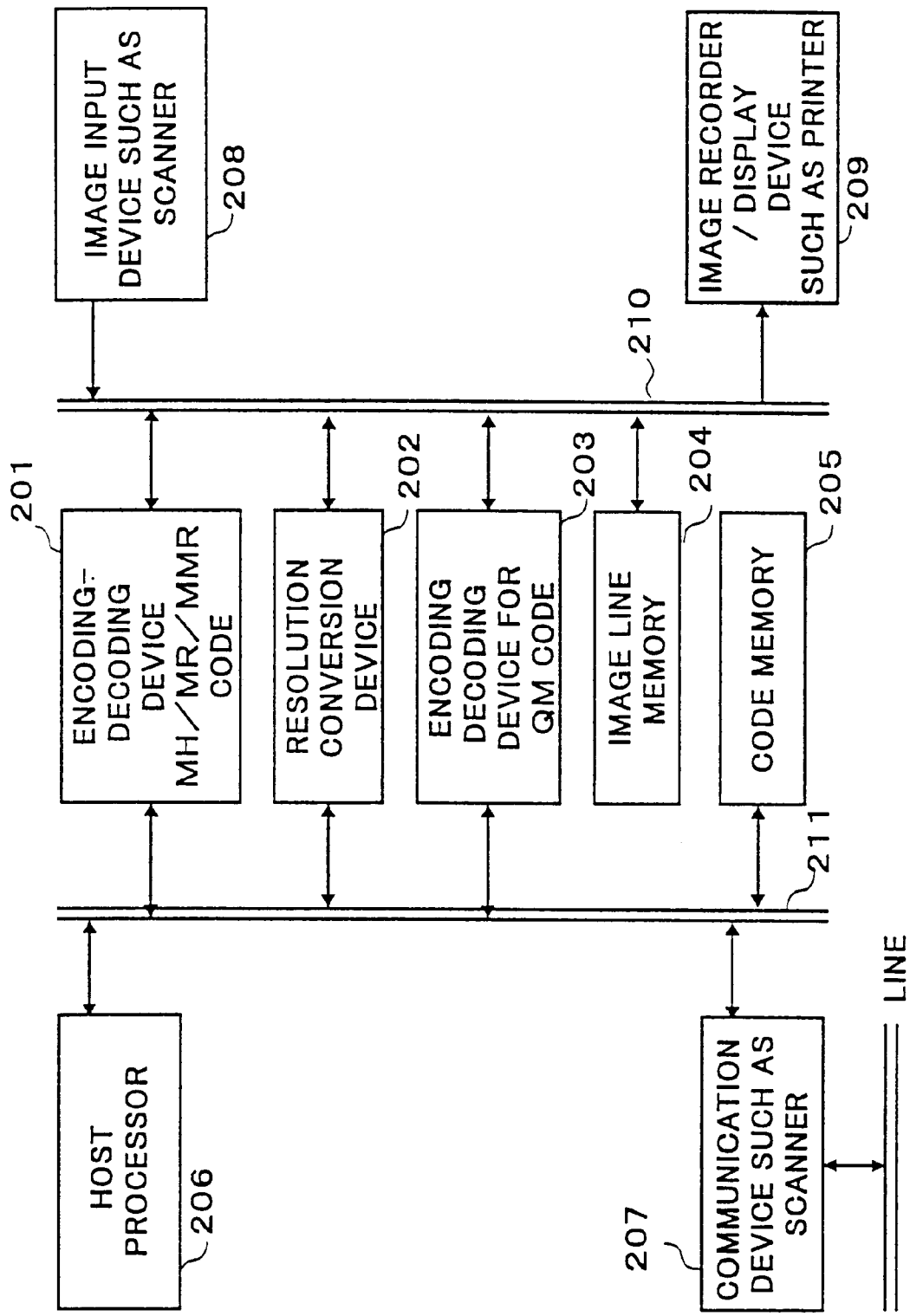

FIG.14

COMMAND LIST

| CODE | COMMAND PROCESSING CONTENT | CODE | COMMAND PROCESSING CONTENT |
|---|---|---|---|
| 0×00 | GLOBAL INITIALIZATION | 0×18 | QM CODING INITIALIZATION |
| 0×01 | T. 4 CODING INITIALIZATION | 0×19 | QM DECODING INITIALIZATION |
| 0×02 | T. 4 DECODING INITIALIZATION | 0×1A | QM CODING |
| 0×03 | DATA TRANSFER INITIALIZATION | 0×1B | QM DECODING |
| 0×04 | PARAMETER WRITE | 0×1C | CODE CONVERSION QM→MH |
| 0×05 | PARAMETER READ | 0×1D | CODE CONVERSION QM→MR |
| 0×06 | MH CODING | 0×1E | CODE CONVERSION QM→MMR |
| 0×07 | MR CODING | 0×1F | CODE CONVERSION MH→QM |
| 0×08 | MMR CODING | 0×20 | CODE CONVERSION MR→QM |
| 0×09 | RTC SENDING #0 | 0×21 | CODE CONVERSION MMR→QM |
| 0×0A | RTC SENDING #1 | 0×22 | CODE CONVERSION QM→QM |
| 0×0B | MH DECODING | 0×23 | NEWLEN MARKER SENDING |
| 0×0C | MR DECODING | | |
| 0×0D | MMR DECODING | | |
| 0×0E | CODE CONVERSION MH→MH | | |
| 0×0F | CODE CONVERSION MH→MR | | |
| 0×10 | CODE CONVERSION MH→MMR | | |
| 0×11 | CODE CONVERSION MR→MH | | |
| 0×12 | CODE CONVERSION MR→MR | | |
| 0×13 | CODE CONVERSION MR→MMR | | |
| 0×14 | CODE CONVERSION MMR→MH | | |
| 0×15 | CODE CONVERSION MMR→MR | | |
| 0×16 | CODE CONVERSION MMR→MMR | | |
| 0×17 | DATA TRANSFER | | |

FIG.27
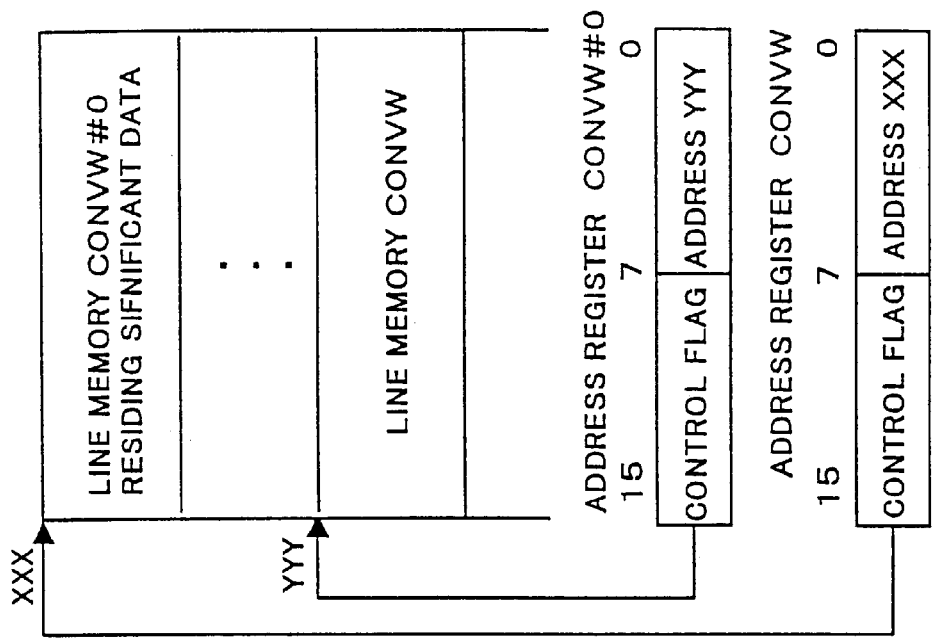
(a) BEFORE CONVERSION
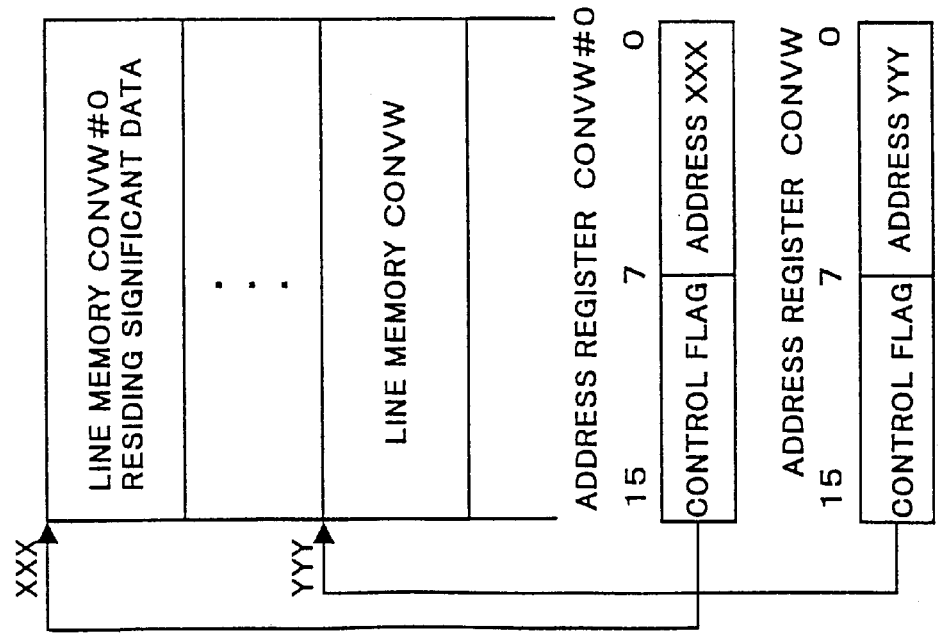
(b) AFTER CONVERSION

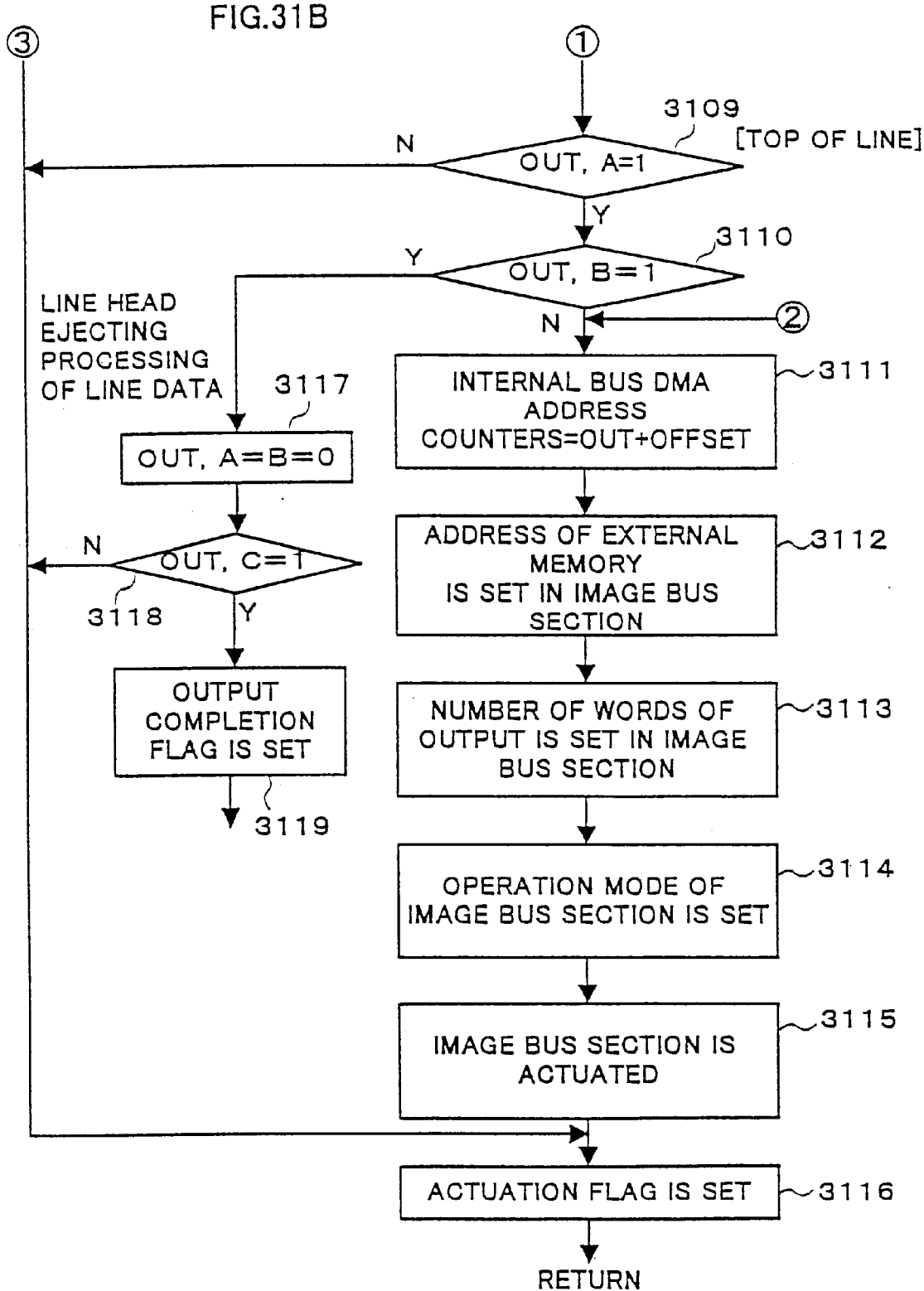

FIG.39
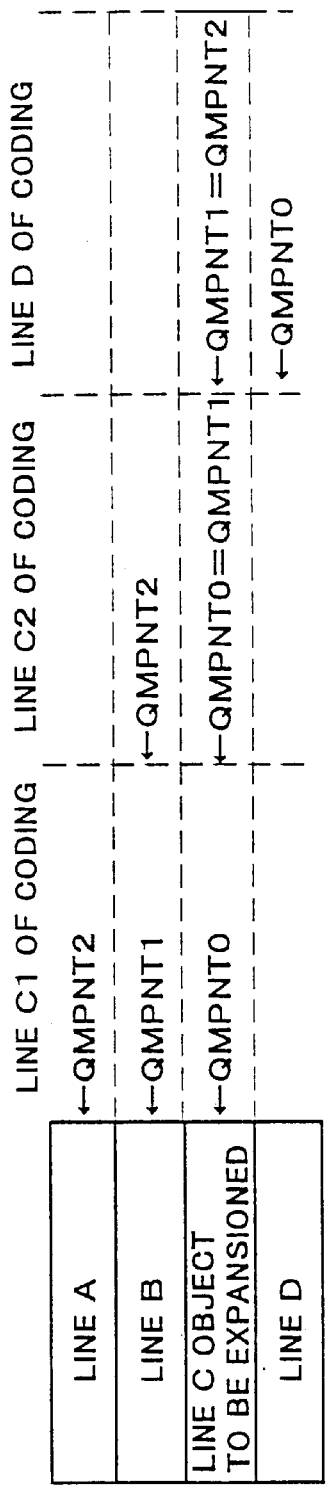
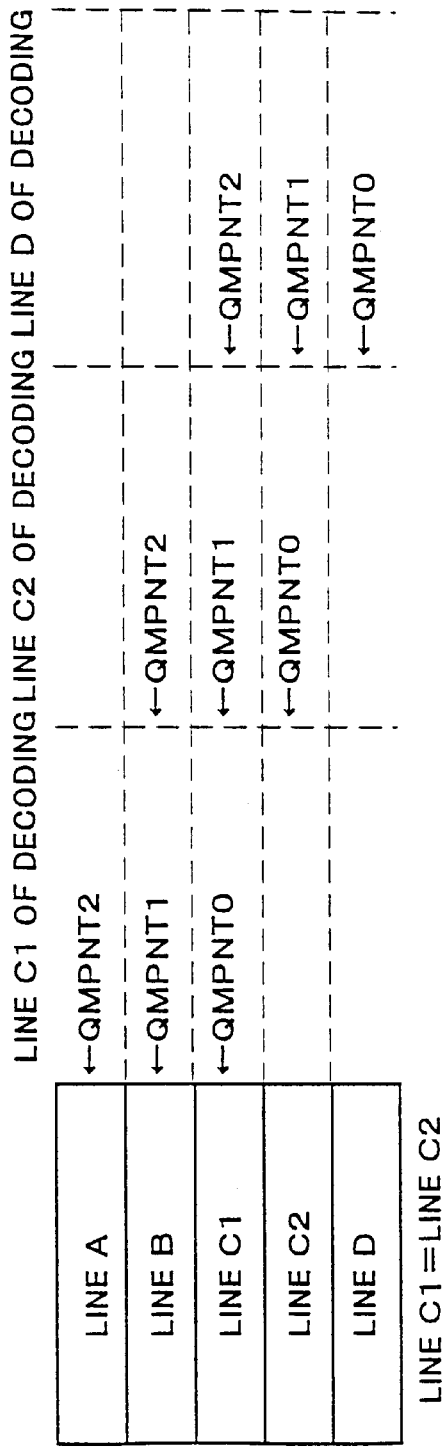

FIG.40 [QM DECODING PROCESSING]

[CONVERSION FROM T.4 T.4 CODE]

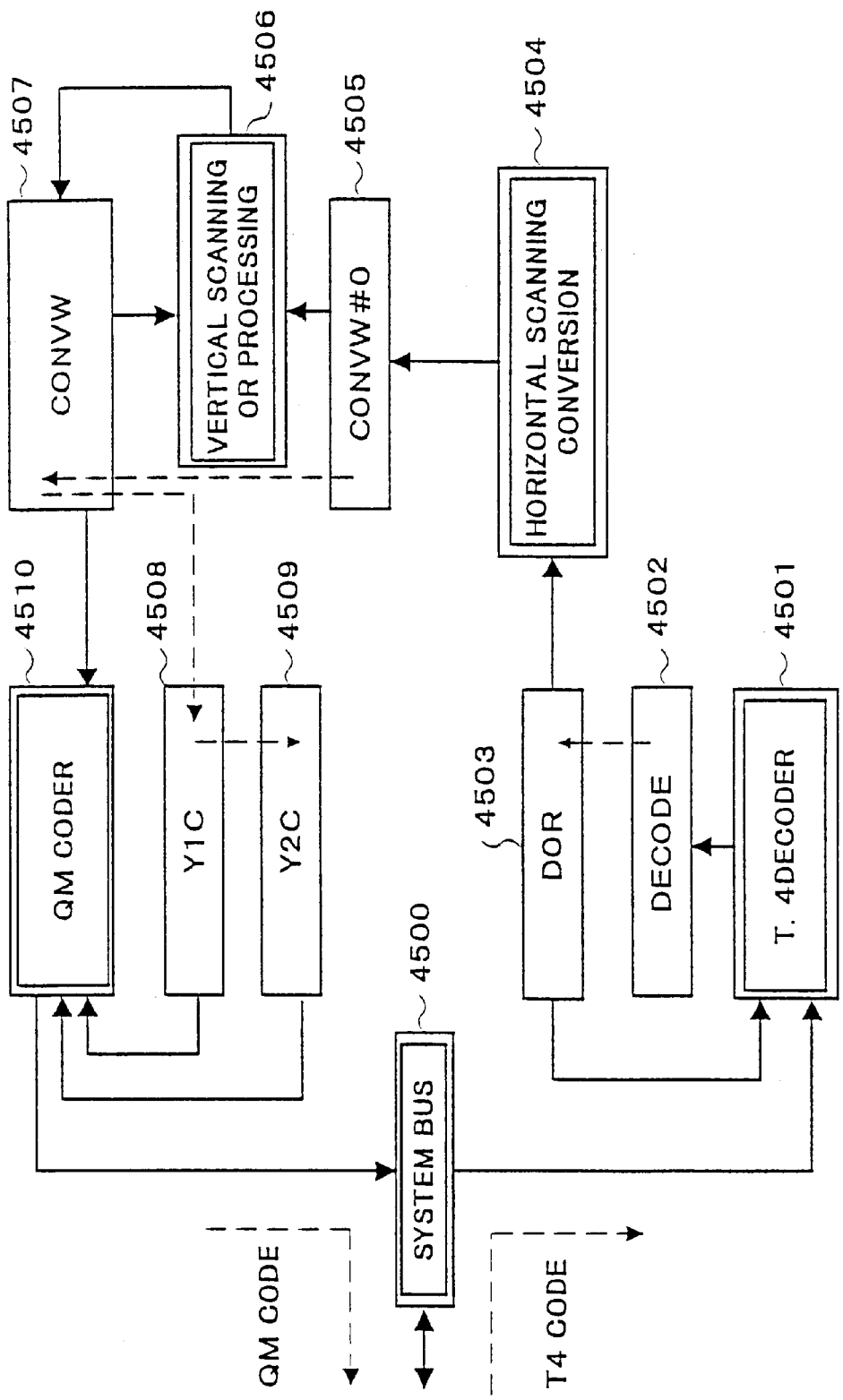
FIG.45 [CONVERSION FROM T.4 CODE TO QM CODE]

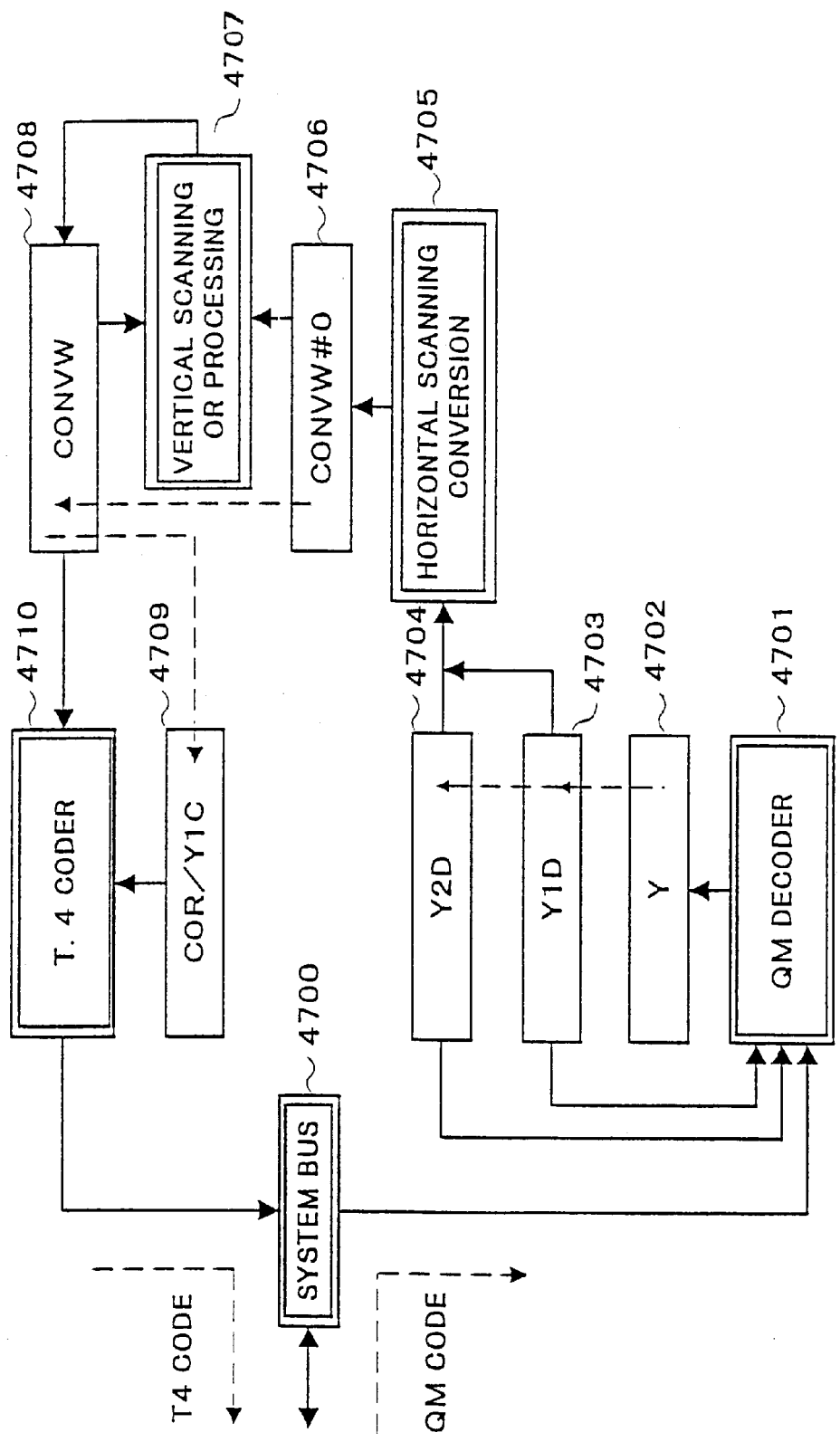
FIG.47 [CONVERSION FROM QM CODE TO T.4 CODE]

FIG.50 CODE CONVERSION PROGRAM FROM QM CODE TO T.4 CODE

IMAGE PROCESSING APPARATUS

BACKGROUND OF THE INVENTION

1. Field of the Invention

The present invention relates to an image processing apparatus for processing a image data or the encoded data thereof, and more sectionicularly to an image processing apparatus for compressing image data, expanding image encoded data, converting image data (scaling) and converting from the image encoded data to other code required in a facsimile or the like.

2. Description of the Related Art

Such kind of image processing apparatus is required in a facsimile, other image communication device, image filing system or the like.

An example of a conventional facsimile is shown in FIG. 2. In this facsimile, two kinds of coding/decoding device 201 and 203 are used for expansion of received encoded data or reduction of image data. The standardized MH, MR and MMR cording are executed by the coding/decoding device 201 as an encoding which is adapted to document image data. On the other hand, QM encoding which is arithmetic code conformed to ITU recommendation T.81, which is adapted to reduction of a halftone image, is executed by the coding/decoding device 203. A resolution conversion device 202 converts sizes of horizontal scanning and vertical scanning directions. These image processing apparatus are connected to data bus 210 and 211, and are placed under control of a host processor 206.

The host processor 206 selects the coding/decoding device 201 and 203 in accordance with capability of a receiving terminal to decode image data red in from a image input device 208. The encoded data is buffered by a code memory 205 to be transmitted from a communication device 207 like a modem to a communication line. The image is reconstituted by reverse processing thereof at receiving to be send to a image recorder/display device such as a printer.

In memory communication that transmission is carried out after once storing all the encoded data to be transmitted in the code memory 205, page size and encoding are required to be converted so as to adapt to capability of the receiving terminal (hereinafter referred to as code conversion). Typically, this code conversion function is realized as repetition of writing the image decoded at every one line in an image line memory 204, reading therefrom to perform resolution conversion processing, writing in an image line memory 204 again and reading out again to carry out encoding processing.

However, the conventional facsimiles are constituted by the structure that a plurality of image processing apparatus that various code conversion functions and resolution conversion functions are integrated into integrated circuits separately are connected to a common bus (an external bus) and the image memory placed on the external bus are shared. Therefore, the time required for read and write of large amount of image data and encoded data is increased, whereby there is the limitation in speeding up.

SUMMARY OF THE INVENTION

This invention is made in view of the above circumstances and it is the object of the present invention to provide an image processing apparatus for carrying out at high speed reduction processing, expansion processing, image conversion processing and code conversion processing required in the a facsimile or the like.

This invention provides an image processing apparatus which comprises a plurality of coding/decoding devices performing encoding and decoding by different codes, internal memory which the each coding/decoding device shares, and a control section controlling operation of the each coding/decoding device, wherein the coding/decoding devices, internal memory and control section are integrated on one chip and encoded data are converted to the encoded data with a different form within one chip.

Moreover, the present invention provides an image processing apparatus which comprises a plurality of code-conversion device performing encoding and decoding by different codes, a control section controlling operation of the each code-conversion device, internal memory which provides line memory to the each code-conversion device, an internal bus for data transfer to the each code-conversion device and said internal memory and external bus control unit for controlling an external bus for interface with the external.

By such configuration, encoded data can be converted to the encoded data of a different form within one chip and access to image memory placed on the external bus is not required, whereby speeding up of processing can be planed.

Farther the present invention provides an image processing apparatus which comprises a plurality of code-conversion devices performing encoding and decoding by different coding/decoding system, a resolution converting device performing resolution conversion of the image, internal memory which the code-conversion device and the resolution converting device share, and a control section controlling operation of the code-conversion device and the resolution converting device are integrated on one chip and code conversion to the encoded data of a different form and resolution conversion to different resolution are performed within one chip.

And, the present invention provides an image processing apparatus which comprises a plurality of code-conversion devices performing encoding and decoding by different coding/decoding system, a resolution converting device performing resolution conversion of the image, a control section controlling operation of the each code-conversion device and the resolution converting device, internal memory which provides line memory to the each code-conversion device and the resolution converting device, an internal bus for data transfer to the code-conversion device, the resolution converting device and the internal memory and external bus control unit for controlling an external bus for interface with the external are provided.

By such configuration, a plurality of code-conversion device and resolution converting device are integrated concentrating on line memory, whereby code-conversion, conversion of page size and processing of a combination thereof can be performed flexibly and moreover at high speed.

Farther, the present invention provide an image processing apparatus which comprises a plurality of code-conversion devices including a first code-conversion device performing encoding and decoding by MH code, MR code or MMR code and a second code-conversion device performing encoding and decoding by QM code, in a code-conversion process that MH code, MR code or MMR code entered from the external bus are converted to QM code, the first code-conversion device and the second code-conversion device performing decoding processing of MH code, MR code or MMR code and encoding processing of QM code using the line memory secured in internal memory, thereby converting without sending intermediate data to the exterior.

By such configuration, each code-conversion device of MH, MR and MMR and QM being a typical encoding of a binary image is integrated concentrating on line memory, whereby decoding processing of MH code, MR code or MMR code and QM encoding processing can be performed at high speed.

Farther the present invention provide an image processing apparatus which comprises a plurality of code-conversion device comprising: a first code-conversion device performing encoding and decoding by MH code, MR code or MMR code and a second code-conversion device performing encoding and decoding by QM code, in a code conversion process that QM code entered from the external bus are converted to MH code, MR code or MMR code, the first code-conversion device and the second code-conversion device performing encoding processing of QM code and encoding processing of MH code, MR code or MMR code using the line memory in the internal memory, thereby converting without sending intermediate data to the exterior.

By such configuration, each code-conversion device of MH, MR and MMR and QM being a typical encoding of a binary image is integrated concentrating on line memory, whereby decoding processing of QM code and encoding processing of MH code, MR code or MMR code can be performed at high speed.

Farther the present invention provide an image processing apparatus which comprises a plurality of code-conversion device comprising: a first code-conversion device performing encoding and decoding by MH code, MR code or MMR code and a second code-conversion device performing encoding and decoding by QM code, in a code conversion process that QM code entered from the external bus are converted to QM code of which encoding parameter is different, the second code-conversion device performs encoding processing of QM code and encoding processing to QM code of which the encoding parameter is different using the line memory in the internal memory, thereby converting without sending intermediate data to the exterior.

By such configuration, each code-conversion device of MH, MR and MMR and QM being a typical encoding of a binary image and the resolution converting device is integrated concentrating on line memory, whereby code conversion, conversion of page size and combination processing thereof can be performed flexibly and moreover at high speed.

Further the present invention provide an image processing apparatus which comprises the internal memory including the line memory used by a resolution converting device, wherein the line memory of the internal memory is used in process of resolution conversion by the resolution converting device, thereby converting without sending intermediate data to the exterior.

By such configuration, a plurality of code-conversion device and resolution converting device are integrated concentrating on line memory, thereby to perform, combining code conversion and conversion of page size flexibly.

Farther, the present invention provide an image processing apparatus which includes the internal memory having a line memory area used in encoding processing and decoding processing by a plurality of code-conversion devices and a parameter register area storing the parameter groups used in the encoding processing and the decoding processing.

By such configuration, a parameter register area storing the parameter groups used in encoding processing and decoding processing is provided, whereby processing content can be changed readily by operating data in the parameter register area.

Farther, the present invention provide an image processing apparatus which takes a configuration that a reference line of MR or MMR encoding and a reference line of QM encoding are assigned in a common area of the line memory area.

By such configuration, effective utilization of memory resources can be planed by utilizing that the reference line of MR and MMR encoding and the reference line of QM encoding can not be not used simultaneously.

Farther, the present invention provide an image processing apparatus which takes a configuration that the reference line of MR or MMR decoding and the reference line of QM decoding are assigned in a common area of the line memory area.

By such configuration, effective utilization of memory resources can be planed by utilizing that the reference line of MR and MMR decoding and the reference line of QM decoding can not be not used simultaneously.

Farther, the present invention provide an image processing apparatus which takes a configuration that the parameter groups are stored in the register area, separating into processing units such as MR encoding and QM decoding.

By such configuration, since the parameter groups are stored in the register area, separating into processing units, exchange of the parameter is not required when processing is switched such as, for example, from encoding processor to decoding processing, whereby speeding up of processing can be planed.

Farther, the present invention provide an image processing apparatus which takes a configuration that the parameter groups of the parameter register areas are transferred to a storage section being under control of the control section of a processing unit by one operation.

By such configuration, the number of access to internal memory which provides line memory can be reduced, whereby high speed processing by reduction of the number of read write to internal memory is realized.

Farther, the present invention provide an image processing apparatus which has a configuration that expansion/encoding is performed by operating an address pointer of an encoding line and the reference line, when expansion processing of the vertical scanning direction to the encoded data is executed.

By such configuration, for encoding processing for expansion of the vertical scanning direction, code data corresponding to the image to be extended can be generated by operating the address pointer of the line to be encoded and the reference line without constituting the image to be extended on memory, whereby a device size can be minimized and high speed processing is realized.

Farther, the present invention provide an image processing apparatus which has a configuration that expansion is performed by read out an object line to be extended a plurality of times, when expansion processing of the vertical scanning direction is executed to the decoded data By such configuration, the decoded image data can be extended by reading out the object line only a plurality of times without access to external memory at decoding, whereby the device size can be minimized and high speed processing is realized.

Farther, the present invention provide an image processing apparatus which has a configuration that the object line to be extended is read out a plurality of times without expanding the image data to be extended to a external memory, when the image data entered from the exterior is sent to the exterior after being extended in the vertical scanning direction, thereby expansion being performed.

By such configuration, image data at data transfer can be extended by reading out the object line to be extended only a plurality of times without accessing to external memory, whereby the device size can be minimized and high speed processing is realized.

Farther, the present invention provide an image processing apparatus which has a configuration that the resolution converting device combines consecutive thinned-out processing and consecutive OR thinned-out processing, when reduction conversion of the entered image data is performed in the vertical scanning direction.

By such configuration, flexibility of vertical scanning conversion where reduction conversion of entered image data is performed in the vertical scanning direction is improved.

Farther, the present invention provide an image processing apparatus which has a configuration that the parameter for reduction conversion is constituted by the combination of consecutive thinned-out processing and consecutive OR thinned-out processing.

By such configuration, the conversion parameter is represented by a set of the number of line being thinned-out consecutively and the number of line OR thinned-out being consecutively at reduction conversion of the vertical scanning direction, thereby flexibility of vertical scanning reduction being able to be improved.

Farther, the present invention provide an image processing apparatus which has a configuration that an address counter in which a leading address of line memory is set, an address register in which the leading address of line memory being set as an initial value of the address counter is stored an offset register in which an offset value to be added to a leading address which is sent from the address register is stored, and control section for moving the image to both sides within a page by controlling the offset value at write and read of the line memory are provided.

By such configuration, the leading address at write and at read of line memory can be set independently, whereby the movement of the image to both sides within a page can be executed freely.

Farther, the present invention provide an image processing apparatus which has a configuration that the movement of the image to both sides within a page is executed substantially in parallel with generation the encoded data by a plurality of code-conversion device.

By such configuration, a combination with encoding can be performed, whereby the encoded data corresponding to the movement of the image to both sides within a page can be generated.

Farther, the present invention provide an image processing apparatus which has a configuration that while a plurality of code-conversion devices are operated, exchanging a plurality of lines so as to the reference lines of the code-conversion devices objected to operation are secured in line memory.

By such configuration, when MR and MMR encoding and MR and MMR decoding, and QM encoding and QM decoding are performed exchanging at groups of a plurality of lines, exchange of the reference line is performed automatically, whereby time sharing processing of a different encoding can be performed at high speed.

Farther, the present invention provide an image processing apparatus which has a configuration that when detection of control code representing the number of the reconstituted lines is retarded at QM decoding, the information representing the retardation is noticed to the external devices.

By such configuration, when detection of NEWLEN marker code at QM decoding is retarded by any cause, the code and the number of the lines reconstituted excessively showing the retardation can be calculated to notice to an MPU, whereby the disused line data can be removed before recording.

Farther, the present invention provide an image processing apparatus which has a configuration that, at encoding by QM code a final stripe is identified, and the control code required to inserted.

By such configuration, the final stripe is determined automatically at QM encoding and insertion of the control code required is performed at high speed without interposition of the MPU.

The invention according to claim 24, in an image processor according to any one of claim 1 to claim 23, takes a configuration that a control section executes additional processing of the header information of for a row of the encoded data.

Farther, the present invention provide an image processing apparatus which has a configuration that the control section executes analysis/separation of the header information added to the encoded data stream.

By such configuration, addition, analysis/separation of the header information to the stream of the encoded data is executed at high speed without interposition of the MPU at QM encoding and QM decoding.

BRIEF DESCRIPTION OF THE DRAWINGS

FIG. 2 is a block diagram illustrating a configuration of a facsimile machine.

FIG. 14 is a list of a command code.

FIG. 27 is an illustration of data exchange between line memory.

FIGS. 31A and 31B are flowcharts of image output processing from an image bus/a system bus.

FIG. 39 is a view illustrating operation of an address pointer at expansion encoding.

FIG. 45 is an illustration of a data movement of code conversion from MH, MR and MMR code to QM code.

FIG. 47 is an illustration of a data movement of code conversion from QM code to MH, MR and MMR code.

DETAILED DESCRIPTION OF THE PREFERRED EMBODIMENTS

Figure 1A:
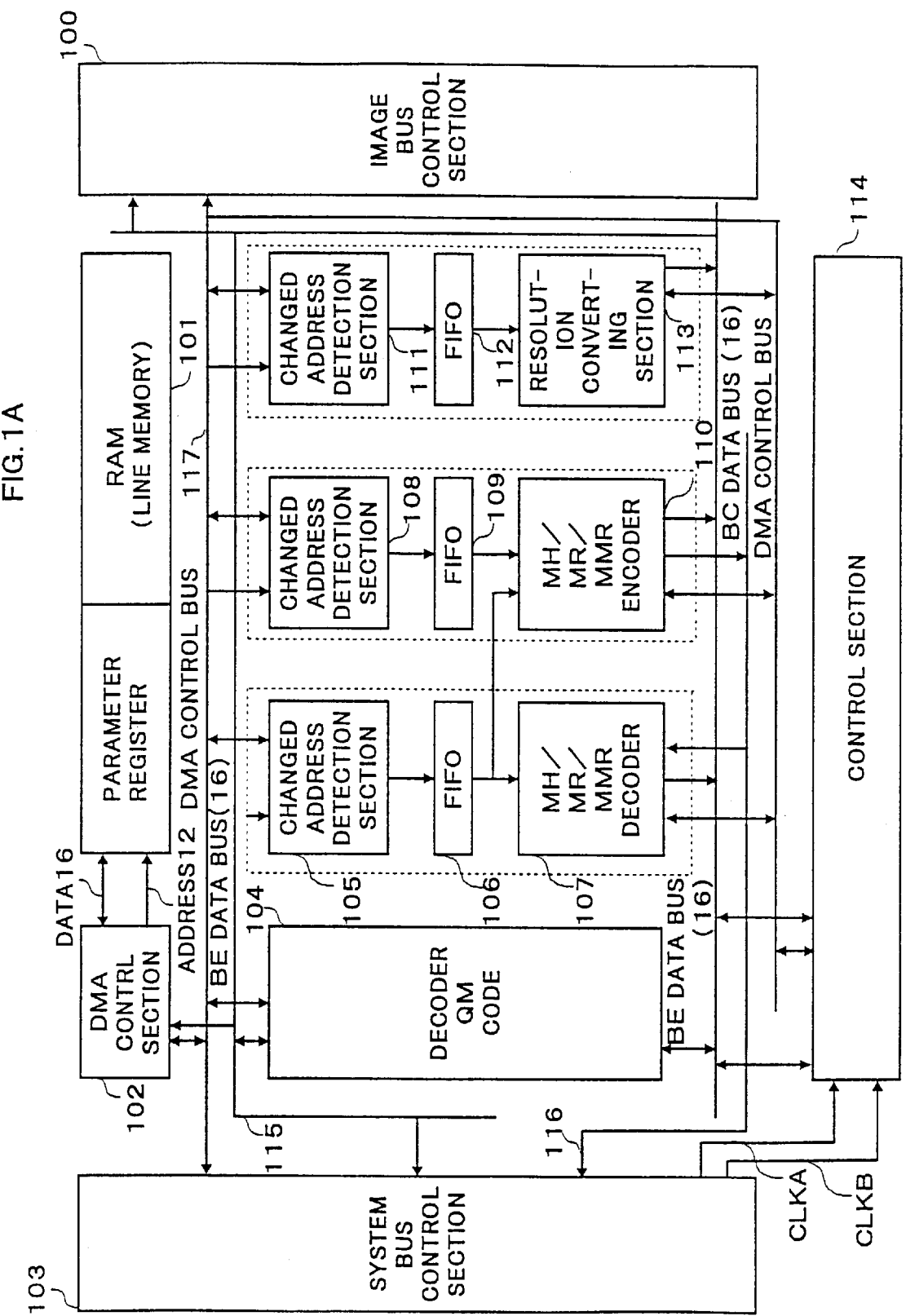
FIGS. 1A to 1D are block diagrams showing an example of an image processing apparatus according to an embodiment of the invention.

This embodiment comprises a plurality of processing block for encoding processing, a plurality of processing block for decoding processing, a processing block for image conversion processing of the horizontal scanning direction and the vertical scanning direction, internal memory for providing a plurality of line memory required in processing of these processing blocks, processing block for controlling an external bus for interface with the external bus, an internal bus for data transfer to the each block and the internal memory, a block for controlling DMA transfer for control of DMA transfer of line memory on the internal memory, input operation of the encoded data from the exterior bus to the processing block for decoding, input operation of image data from the exterior bus to line memory on said internal memory, operation of said image conversion processing, operation of said processing block for decoding, operation of the processing block for encoding; and a control processing block for allowing to perform a plurality of operations selected from output operations of image data from said line memory on said internal memory or said processing block for encoding to the exterior bus simultaneously by controlling said each block. Hereinafter, this embodiment is described definitely referring to the drawings.

Figure 1C:
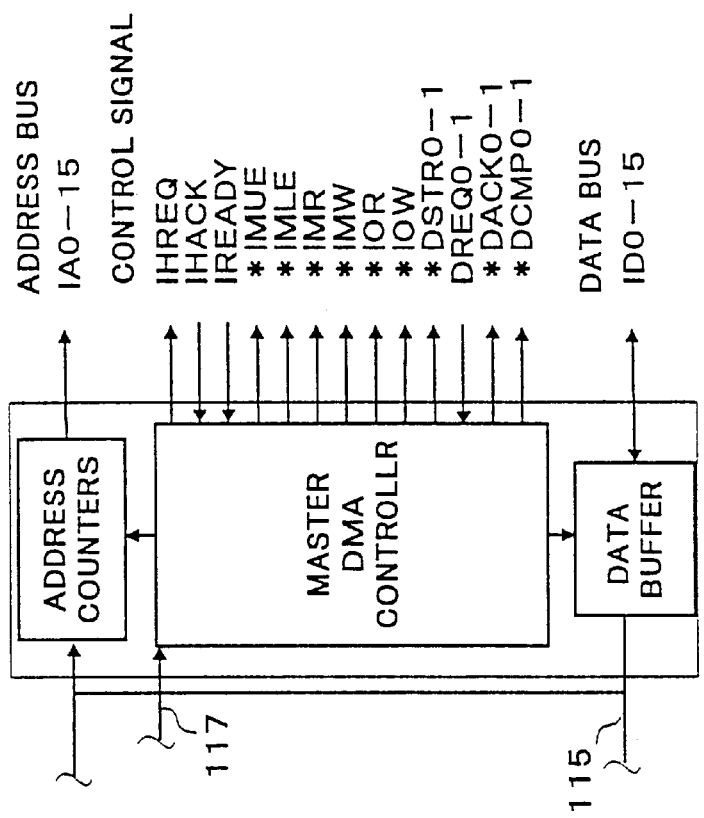
Figure 1B:
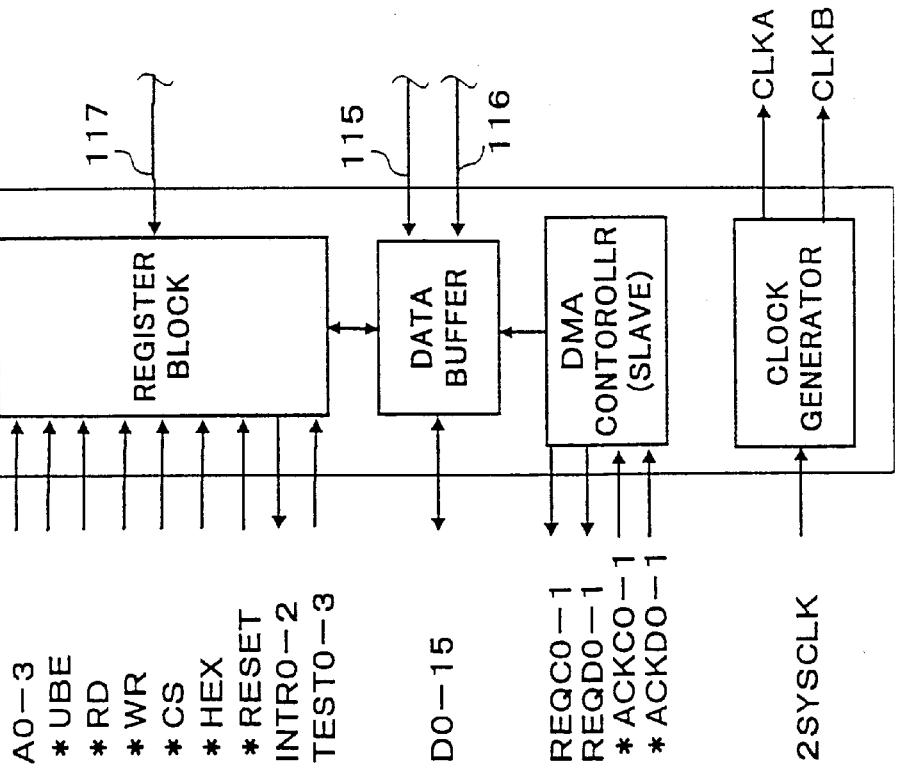
Figure 1D:
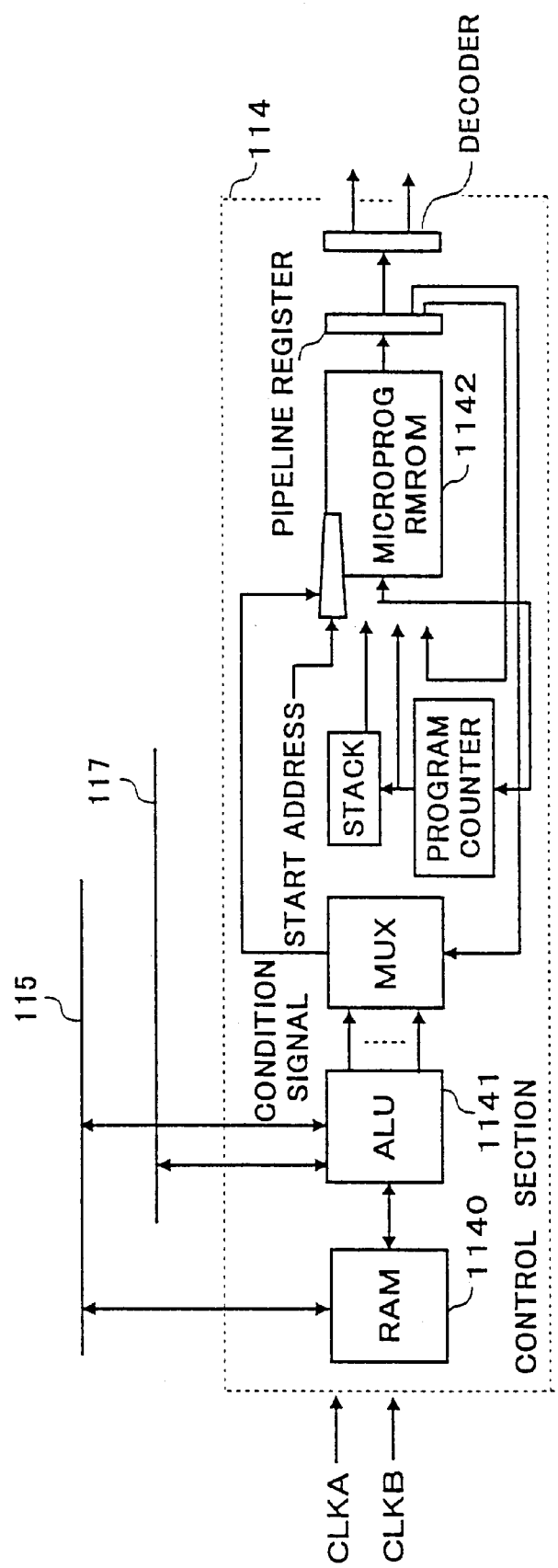

FIGS. 1a–1c are block diagrams showing schematic configuration of a example of reduction and expansion device according to the invention. These reduction and expansion device is an image processing apparatus that the functions of a plurality of reduction devices a plurality of expansion devices, an image conversion (scaling) device of the horizontal scanning direction and the vertical scanning direction and a code-conversion device are combined. [General Configuration of The Image Processing Apparatus]

In FIGS. 1A–1D, block 100 is an image bus control section to provide an interface with the image bus. The image bus control section 100 is a block which performs DMA transfer on the image bus to be connected to the image processor. Block 101 is a RAM, which are used as registers in which store the parameters for image processing and used as line memory for image data. This RAM 101 can be red and written from a microprocessor (MPU) also through a system bus control section 103. Block 102 is an internal bus DMA control section executing DMA transfer on the internal data bus 114. Data transfer between memory 101 and the processing blocks such as an encoder, a decoder is performed by this internal bus DMA control section 102. A system bus control section 103 is a block for interfacing with the MPU. A register block for specifying operation mode, a data buffer for input/output of encoded data and DMA controller controlling timing of DMA transfer are main components of the system bus control section 103.

Block 104 is the coding-decoding device for QM code performing coding-decoding processing for arithmetic coding. Upon encoding, image data and the parameters are read in from BE data bus 115 and the encoded data are sent to BC data bus 116. Decoding is reverse thereto. The block 105 to the block 107 are processing blocks for decoding MH, MR and MMR. Similarly, a block 108 to block 110 are processing blocks for encoding MH, MR and MMR. Since the encoding system of MH code, MR code are specified by ITU recommendation T.4, the encoder and the decoder performing the encoding system including MMR code are referred to as a T.4 encoder and a T.4 decoder hereinafter respectively. Block 105 and block 108 are detector for varying image having 16 bits width, and block 106 and block 109 are FIFO buffers for temporary storage of varying image address information. Block 111 to block 113 constitutes a resolution converting device for converting the number of pixels of the horizontal scanning direction and the number of lines of the vertical scanning direction. Block 111 and block 112 are detectors for the varying image and FIFO respectively as well as the encoder and the decoder.

These image processing blocks are connected to the BE data bus 115 and the BC data bus 116. BE data bus 115 is a 16 bits bus used in transfer of image data mainly and BC data bus 116 is a 16 bits bus used in transfer of the coding data mainly.

Block 114 is a control section for controlling entire operation of this image processing apparatus. Control section 114 includes RAM 1140 having work registers for calculation in order to control entire operation of this apparatus, arithmetic logic unit (ALU) 1141 and ROM 1142 stored the program performing sequential control.

[Configuration of T.4 Encoder]

Figure 3:
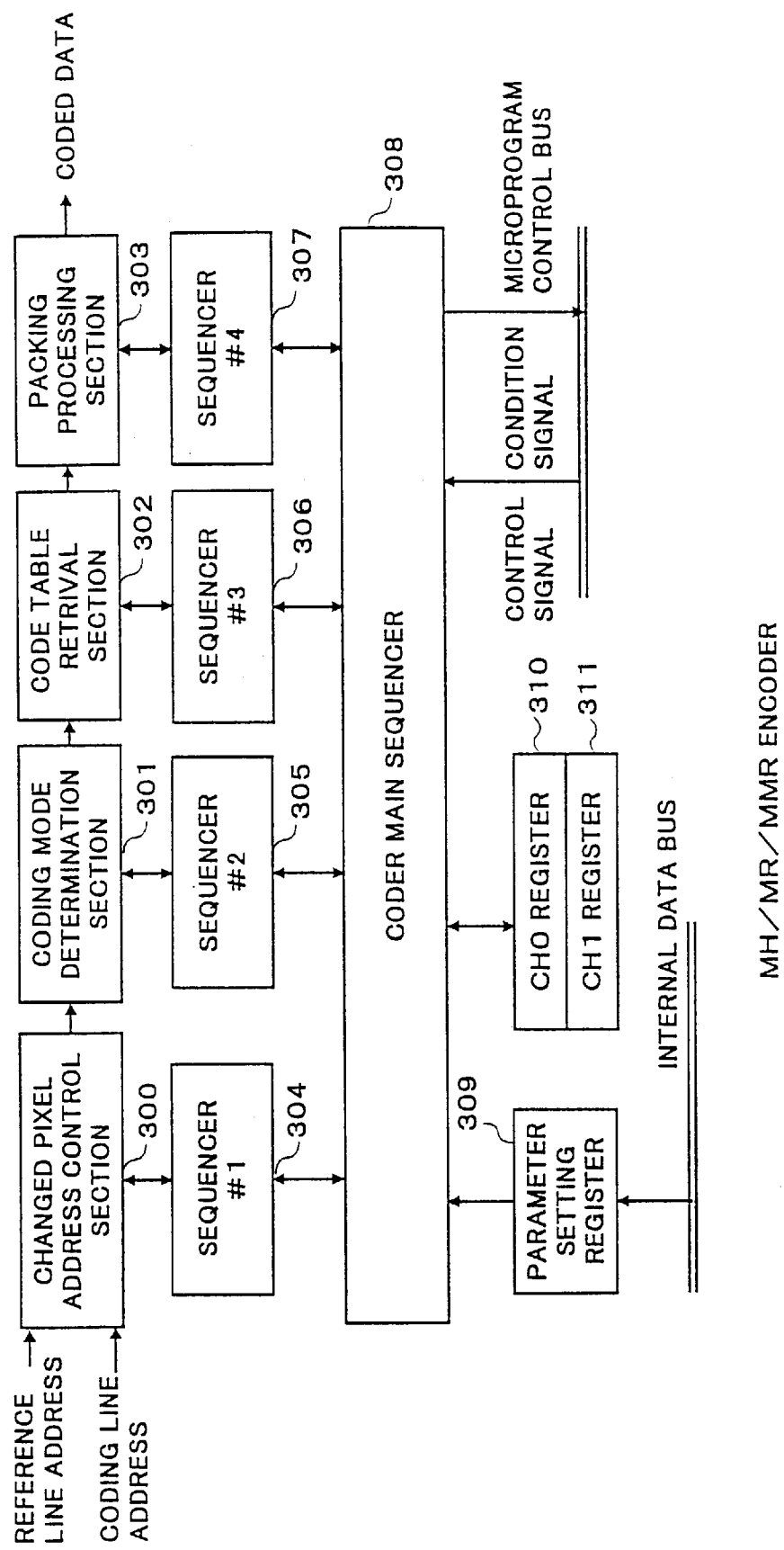
FIG. 3 is a block diagram of an example of a configuration of MH, MR and MMR encoder.

FIG. 3 is a block diagram of MH, MR and MMR encoder (T.4 encoder) 110. In FIG. 3, changed pixel address control section 300 fetches the changed pixel address of the reference line from FIFO buffers 109 and the changed pixel address of the encoding line from the FIFO buffers 106 to enter to encoding mode determination section 301.

This encoding mode determination section 301 performs determination of an encoding mode (a pass, a vertical and a horizontal modes) from the changed pixel address information entered. A code table retrieval section 302 retrieves an internal MH and MR codes table on the basis of the determined result of the encoding mode to assign the code corresponding to the encoding mode.

A packing processing section 303 connects a plurality of variable-length code out put from the code table retrieval section 302 to pack into a word size (16 bits) to out put to the internal data bus. Block 308 is a main sequencer controlling the entire encoding. Block 304 to 307 are sub sequencers controlling the corresponding processing section 300 to 303 under control of the main sequencer independently.

T.4 encoder 110 has the register 309 setting the parameter required in encoding processing such as the number of words of image data in one line and registers 310 and 311 for storing the encoded data less than the word size of a line end through the internal data bus 115. Block 310 is for a channel 0 and block 311 is for a channel 1. These blocks are for facilitating communication of the encoded data less than one word in every channel upon selecting the channel 0 or the channel 1 to perform time sharing processing of encoding at line unit or at a plurality of line unit. Control section 114 of the image processing apparatus be able to perform specifying of the encoding mode to the T.4 encoder 110 and control such as actuation through the micro program control bus, and to acquire the processing status of the T.4 encoder 110.

[Configuration of T.4 Decoder]

Figure 4:
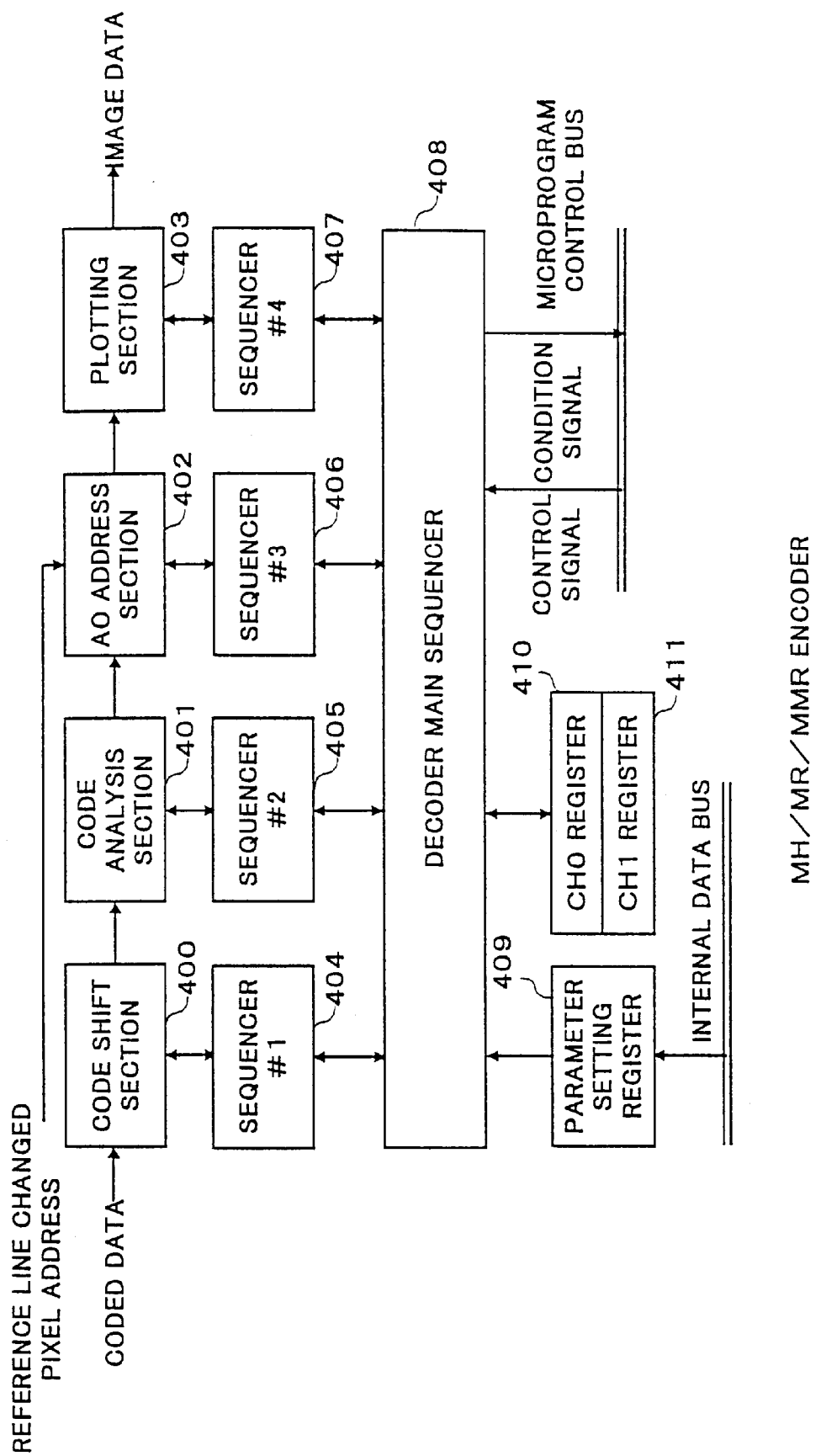
FIG. 4 is a block diagram of an example of a configuration of MH, MR and MMR decoder.

FIG. 4 is a block diagram of MH, MR and MMR decoder (T.4 decoder) 107. In FIG. 4, a code shifting section 400 shifts the encoded data fetched from the internal data bus (BC data bus) 116 by the code-length decoded completely to give the code data undecoded to a code analysis section 401 at all time. The code analysis section 401 performs retrieval of an internal decoding ROM by encoded data to send the decoded information to an a0 address calculation section.

The a0 address calculation section calculates a termination address of run length being referred at imaging using this decoded information and further by the changed pixel address of the reference line in case of MR and MMR codes. At this point of time, the subsequent origin address a0 is updated (refer to ITU recommendation T.4) Plotting section 403 regenerates white run and black run alternately by an address information from the a0 address arithmetic section 402 to obtain reconstituted images.

Block 408 is a main sequencer controlling the entire decoder. Block 404 to block 407 are sub sequencers controlling corresponding processing sections 400 to 403 under control of the main sequencer independently.

T.4 decoder 107 has the register 409 setting the parameter required in decoding processing such as the number of words of image data in one line and registers 410 and 411 for holding the decoded data less than the word size of a line end through the internal data bus 115. As in the case of encoding, block 410 is for a channel 0 and block 411 is for a channel 1. These are the registers for selecting the channel 0 or the channel 1 at line unit or at a plurality of line unit to perform time sharing processing of decoding. The control section 114 of the image processing apparatus be able to perform specifying of the decoding mode to the T.4 decoder 107 and control such as actuation through the micro program control bus, and to acquire the processing status of the T.4 decoder 107.

[Configuration of Resolution converting device]

Figure 5:
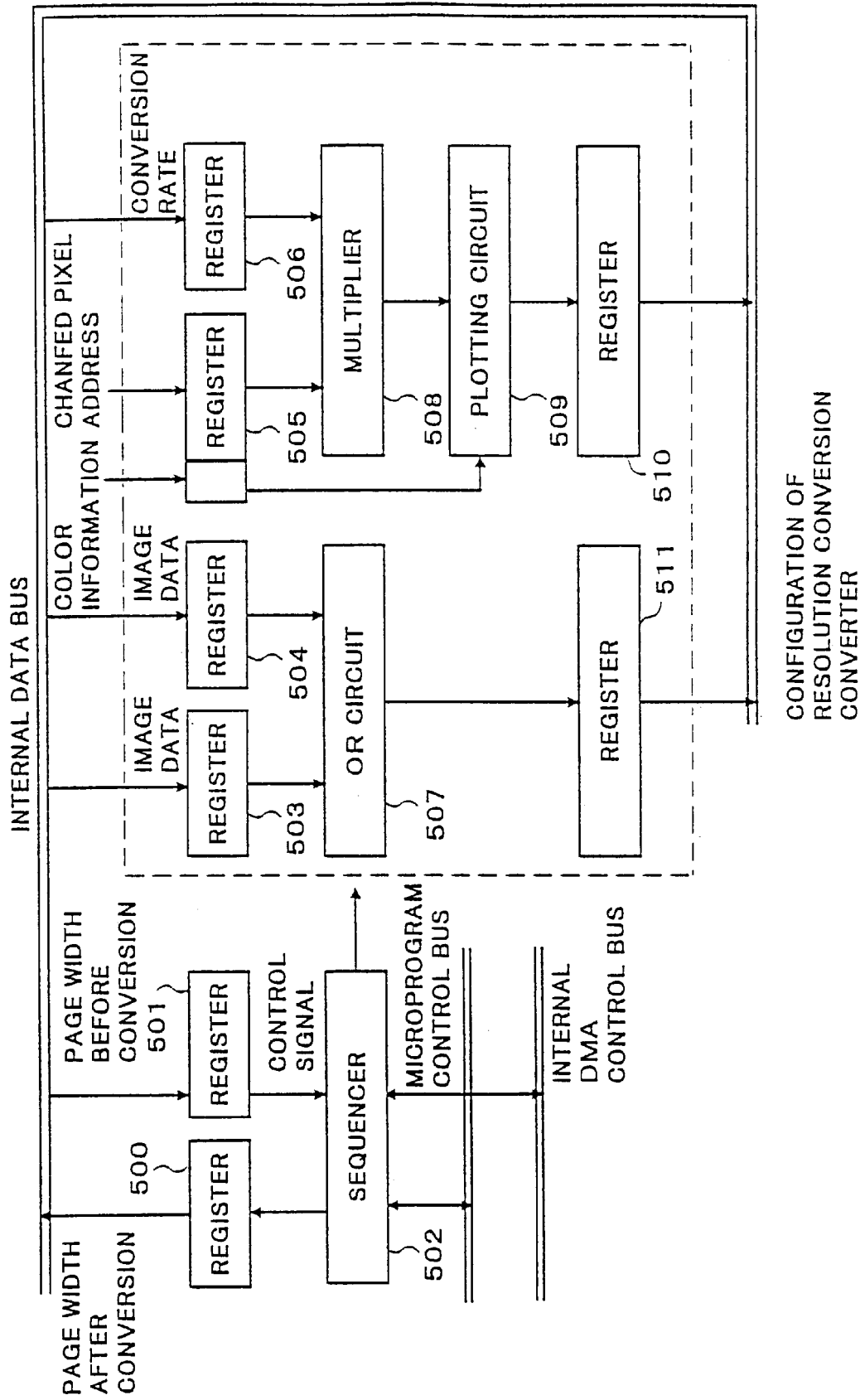
FIG. 5 is a block diagram of an example of a configuration of a resolution converting device.

FIG. 5 is a block diagram of a resolution converting device 113. Block 505, 506 and 508 to 510 constitute a resolution converting device of the horizontal scanning direction and block 503, 504 and 507 to 511 constitute a resolution converting device of the vertical scanning direction. Block 500 to 502 are sequential processing sections.

The resolution conversion of the horizontal scanning direction is a coding system comprising the steps of changing the changed pixel address of an origin image in response to scaling ratio, plotting with white pixels or black pixels from the changed pixel address information converted to generate a converted image. A register 505 holds the changed pixel address entered from the FIFO buffer 112 and a color information identifying the white pixels or the black pixels. A register 506 is set the scaling ratio through the internal data bus 115. A multiplier 508 obtains the changed pixel address after scaling processing by multiplying the changed pixel address and the scaling ratio to render a plotting section 509.

Plotting circuit 509 generates the image data after scaling processing on the basis of the given changed pixel address and the color information rendered from the register 505. This image data is sent to the internal data bus 115 in word unit through a register 510.

In the resolution converting processing of the vertical scanning direction, reduction processing is realized by thinning-out. The configuration is designed to be able to perform the logical OR operation with a subsequent line at this point of time to save thin lines of the horizontal scanning direction also. The expansion processing controls so that the same line is copied a plurality of times. This expansion processing is not included in FIG. 5 since being performed by program processing. A register 503 and a register 504 hold image data in order to perform the logical OR operation of the line data at every word. Block 507 is a OR circuit with 16 bits. The result is held in the register 511, and is written in RAM 101 through the internal data bus.

Block 501 is a register in which one line width before conversion is set through the internal data bus 115, block 500 is a register for counting one line width after conversion, and block 502 is a sequencer for controlling and monitoring operation of each circuit of the resolution converting device.
[Configuration of QM encoding-Decoding device]

Figure 6:
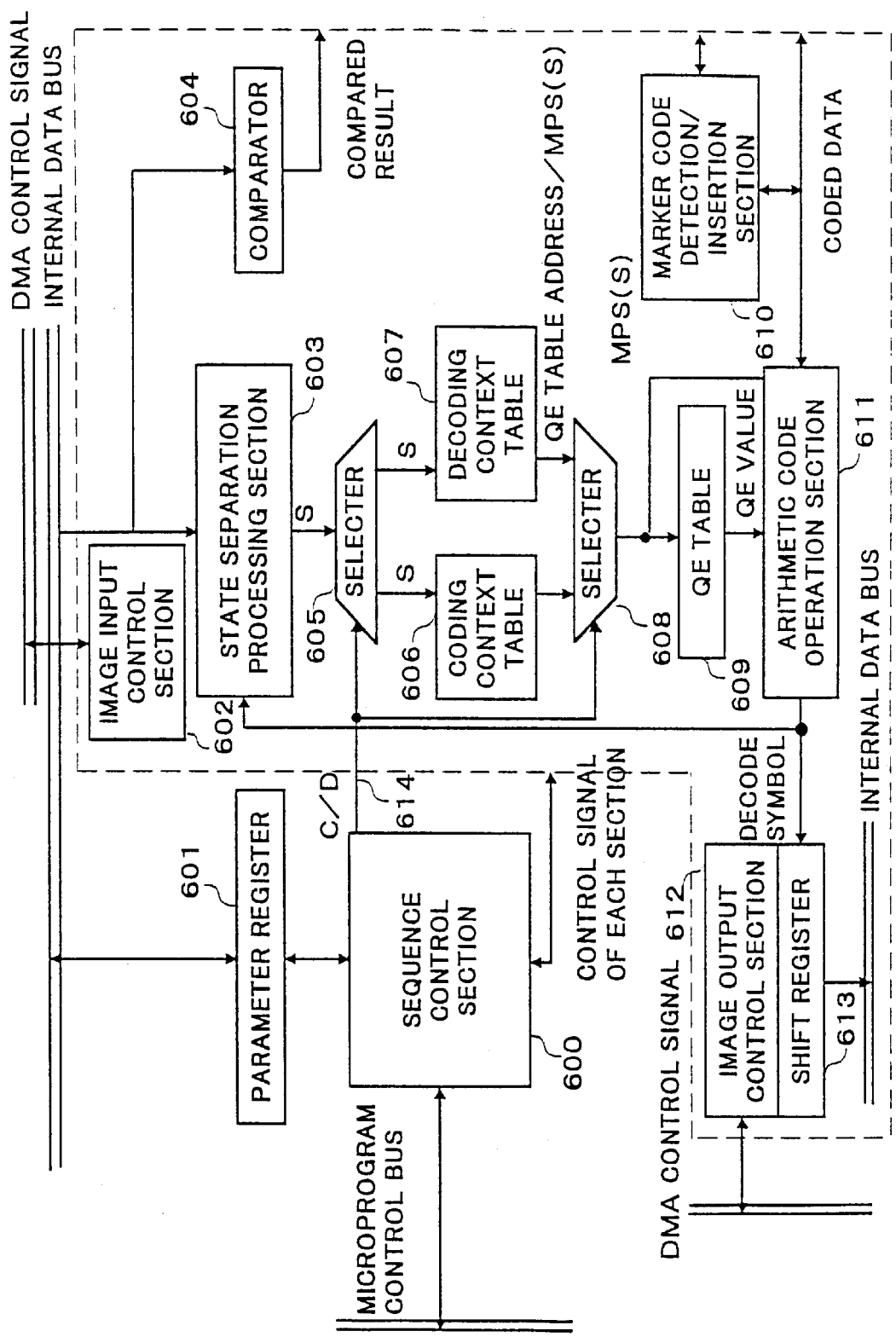
FIG. 6 is a block diagram of an example of a configuration f a QM encoder.
Figure 7:
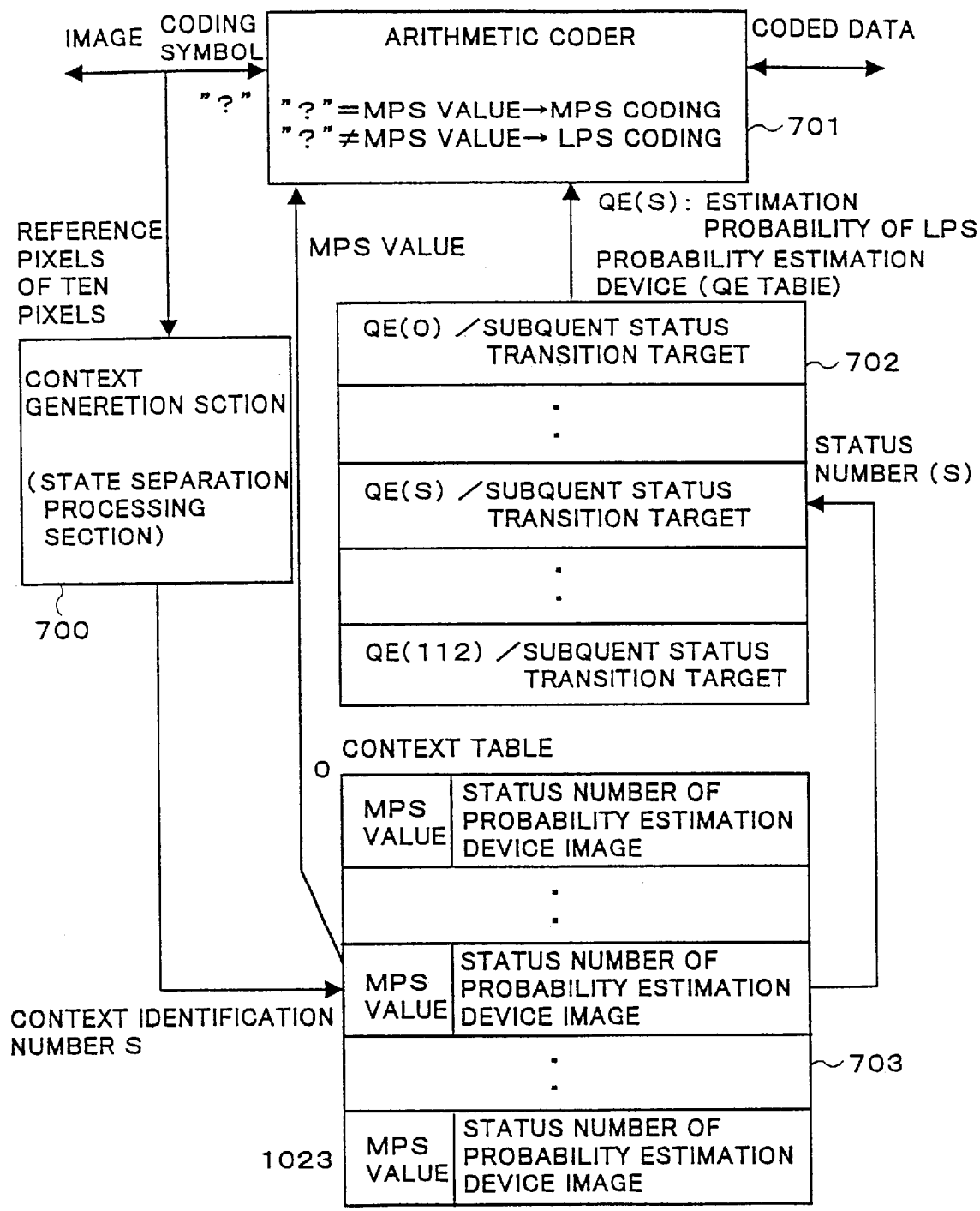
FIG. 7 is an illustration of a QM encoding.
Figure 8:
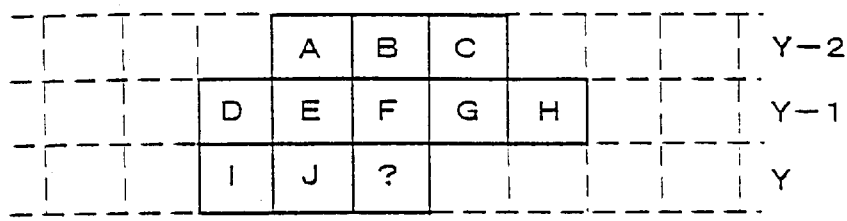
FIG. 8 is an illustration of a template.
Figure 9:
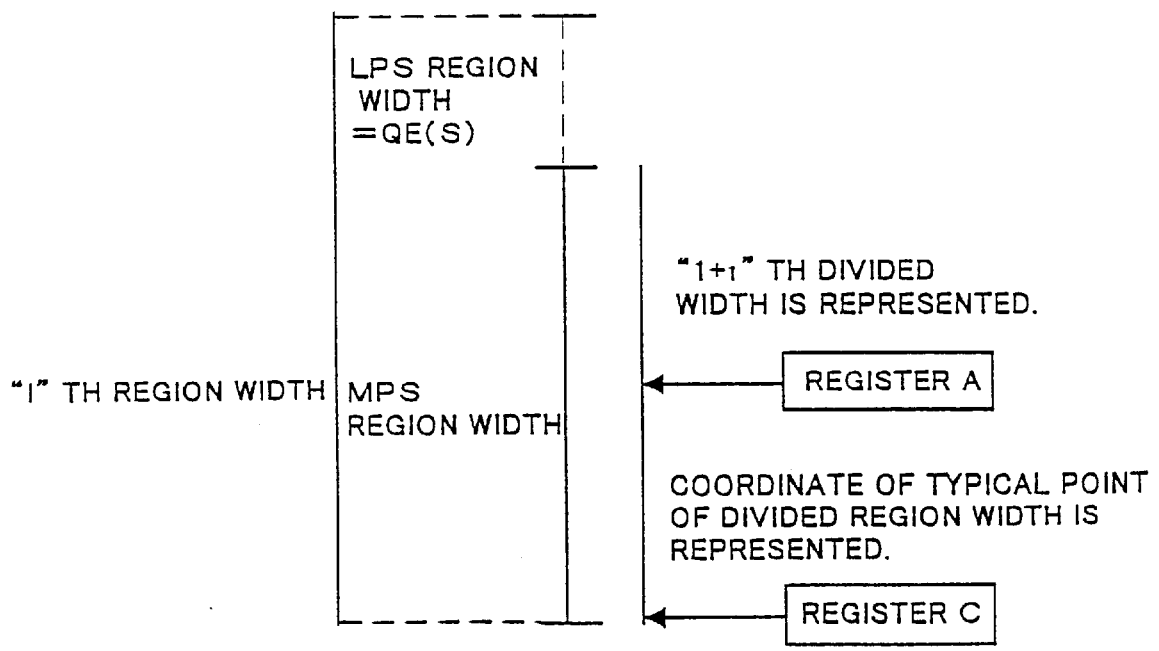
FIG. 9 is an illustration of a arithmetic encoding processing.

FIG. 6 is a block diagram of an arithmetic coding decoder (hereinafter referred to as QM encoding-decoding device) 104. Prior to describe the components in FIG. 6, a summary of the QM code referring to FIG. 7 to FIG. 9 is described. As shown in FIG. 7, the components of the QM encoding device comprises context generation section 700 judging the conditions (context) in which the encoded pixels are included by the conditions of the peripheral pixels of the encoded pixels, context table 703 for storing the predicative value (preference symbol value: hereinafter referred to as MPS value) of the encoded pixels and the status number of a probability estimation device in every context, probability estimation device (Qe table) 702 being a state machine of the 113 status, which estimates generation probability of the low preference symbol (LPS) in response to character of image such as characters and half tone, arithmetic coding device 701 generating the code using the encoded pixels, the MPS value, the probability estimation value of LPS value (Qe value).

FIG. 8 is a view showing an arrangement of reference pixels generating the context. For a character Y in FIG. 8, encoding and decoding lines Y-1 and Y-2 are the reference lines of one line before and two lines before respectively. Pixels A to J are the reference pixels with ten pixels and a "?" represents the encoded pixels (the encoded symbol). The context generation section 700 in FIG. 7 sends the state identification number with 1024 pixels (the context identification number) from this state of the.reference pixels with ten pixels.

FIG. 9 is a illustration of the arithmetic coding device 701. In arithmetic coding, a numeric line with the predetermined width is divided recurrently every time LPS or MPS generate and a typical point is set within the MPS area and a binary point showing the point is set as the code.

There are A register showing the MPS area width and C register showing the typical point in order to perform such calculation. The code is designed to represented with a row of bits discharged by left-handed shift of the C register to which the result of encoding arithmetic is reflected. As shown in FIG. 9, the "i" th area width is divided into the MPS area and the LSP area. When the status number of the probability estimation device is S, width of the LSP area is represented by Qe (S) stored in Qe table.

Returning to FIG. 6, an embodiments of QM encoding-decoding device 104 is described. Block 602 is control section for entering the encoded line and the reference line from the line memory. At this point, every time encoding of the image data with 16 bits words is completed, transfer demand is sent to the internal bus DMA control section 102 and new image data is entered. Block 603 is a status separation processing section generating the context. From this section, the context identification number S is sent. Block 605 and 608 switch input and output of a context table 606 for encoding and a context table 607 for decoding by a control signal 614 showing encoding and decoding using a selector, and perform time sharing processing of encoding and decoding in line unit efficiently.

In two context table 606 and 607, MPS value and the address of Qe table are stored every each status. On the basis of a scheme of arithmetic coding, these values are required to be rewritten as progress of processing, whereby being constituted by the RAM. Block 609 is the Qe table to be constituted by the ROM. Block 611 is an arithmetic code operation section performing arithmetic coding and arithmetic decoding by the encoded pixels (not shown), the Qe values and the MPS values.

Block 604 is a comparator comparing the encoded line and the reference line of one lines before every one word. When the encoded line is the same as preceding line, this the comparator 604 is used upon performing a function referred to as TP mode encoding a graph showing the same. Block 610, which is used at decoding, is a dedicated circuit for detecting control code (referred to as a marker code) embedded in the code sequence. Block 612 and 613 are used at decoding. Block 613 is a shift register for justifying a symbol decoded every one bit into the data with 16 bits, and block 612 is an image output control section for performing DMA transfer to the line memory 101, when image data with 16 bits is generated in the shift register 613.

Block 601 is a register for storing the parameter required in performing encoding and decoding. The control section 114 in FIG. 1, and the control information such as the mode selection information of encoding and the parameter are exchanged through this register. Block 600 is a sequence control section for controlling the entire QM encoding-decoding device. The control section 114 in FIG. 1 actuates the sequence control section 600 to perform entering of the image and output of the code while performing monitor of the status to control operation of the entire image processor.
[Configuration of Line Memory]

Figure 10:
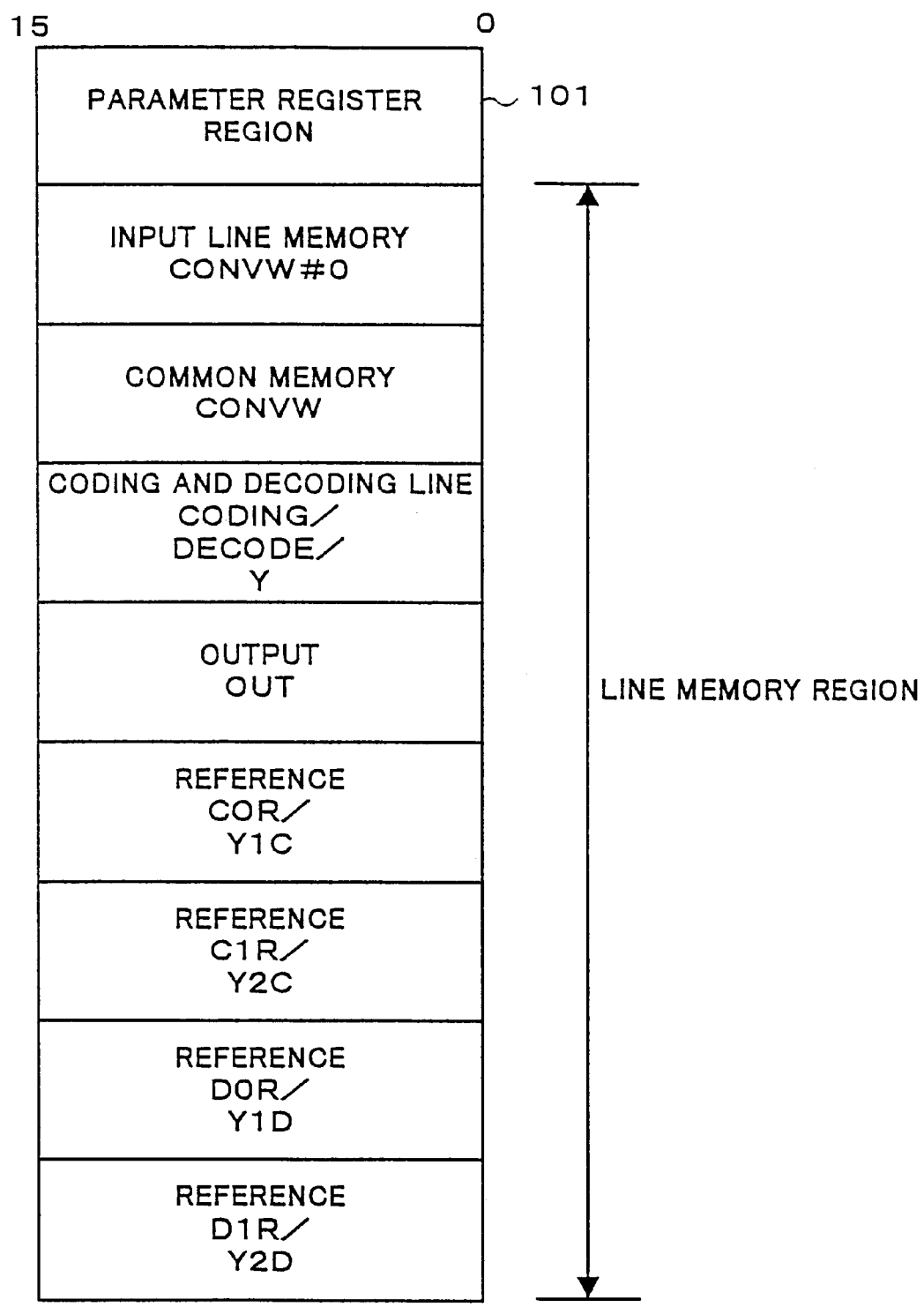
FIG. 10 is a block diagram of a parameter register.

A address space in the RAM 101 in FIG. 1 is separated into a parameter register area and a line memory area. As shown in FIG. 10, eight line memory are defined in RAM 101. Each function is as follows:

CONVW#0: This is used as line memory upon entering the image from the image bus.

CONVW: This is used commonly as memory in data transfer among encoding, decoding and the bus. The line data converted by horizontal scanning are stored in this memory without exception, and are processed by common processing to be passed to processing of subsequent step such as encoding and data output.

CODING/DECODE/Y: Being designated by a plurality of names, these are memory for storing processing lines of encoding and decoding.

OUT: This is memory for storing the image data to be sent to the image bus and system bus.

C0R/Y1C: This is memory for storing the reference line for the channel 0 of MR, MMR coding or (Y-1) reference line of QM encoding.

C1R/Y2C: This is memory for storing the reference line for the channel 1 of MR, MMR coding or (Y-2) reference line of QM encoding.

D0R/Y1D: This is memory for storing the reference line for the channel 0 of MR, MMR decoding or (Y-1) reference line of QM decoding.

D1R/Y2D: This is memory for storing the reference line for the channel 1 of MR, MMR decoding or (Y-2) reference line of QM decoding.

Figure 11:
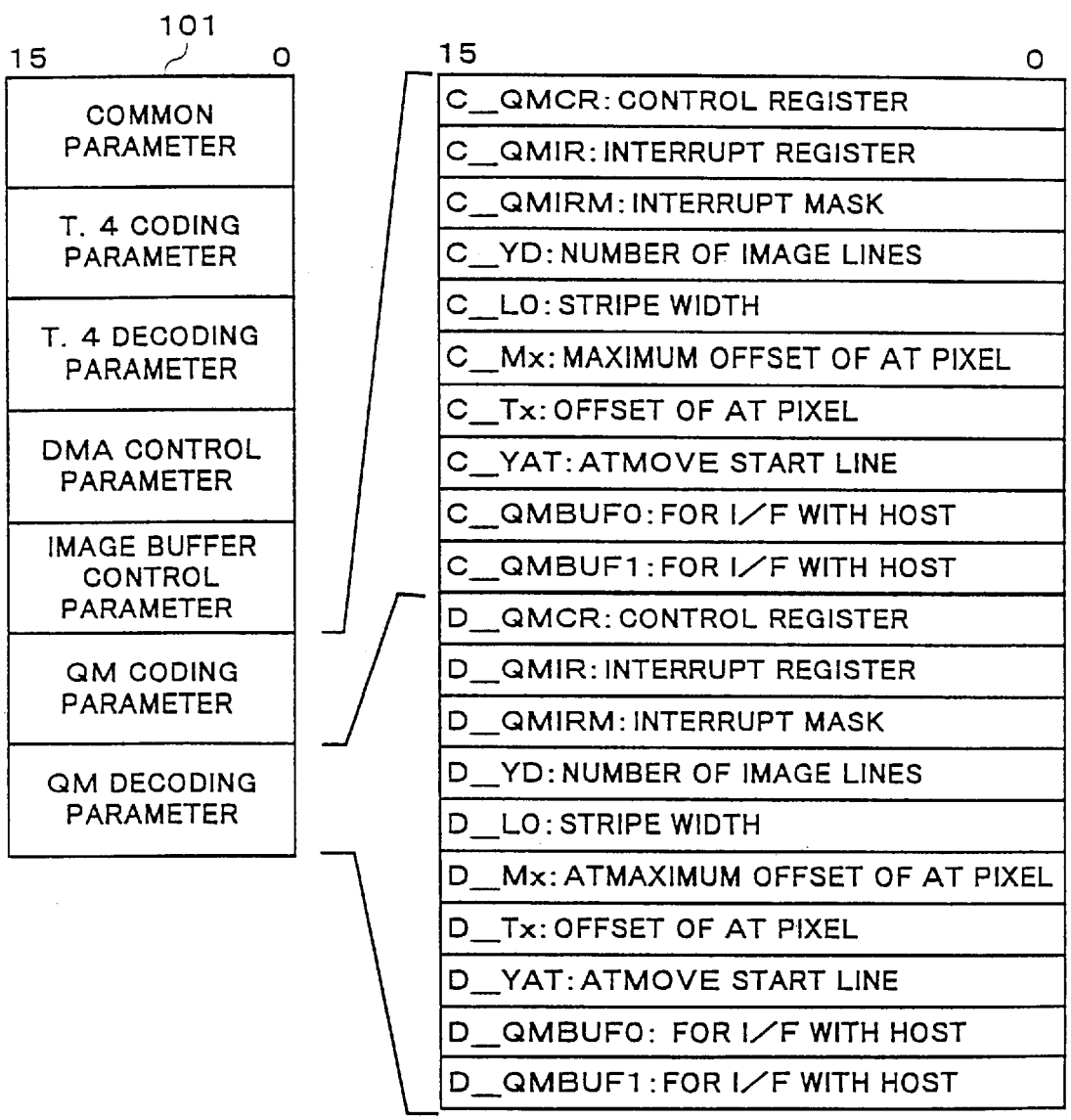
FIG. 11 is a block diagram of a parameter register.

FIG. 11 shows the configuration of a parameter area. This area is separated into some areas. This area is separated into a common parameter area defining parameter registers common to each processing, T.4 encoding parameter area, T.4 decoder parameter area, DMA control parameter area on the image bus, control parameter area of image buffer on the image bus similarly, QM encoding parameter area and QM decoding parameter area, and exchange of the parameters is designed to be not required when switching processing. In QM encoding and QM decoding parameter areas, the registers such as shown in drawings are defined. These are referred in the description as required hereafter.

[Description of Line Memory Control System]

Figure 12:
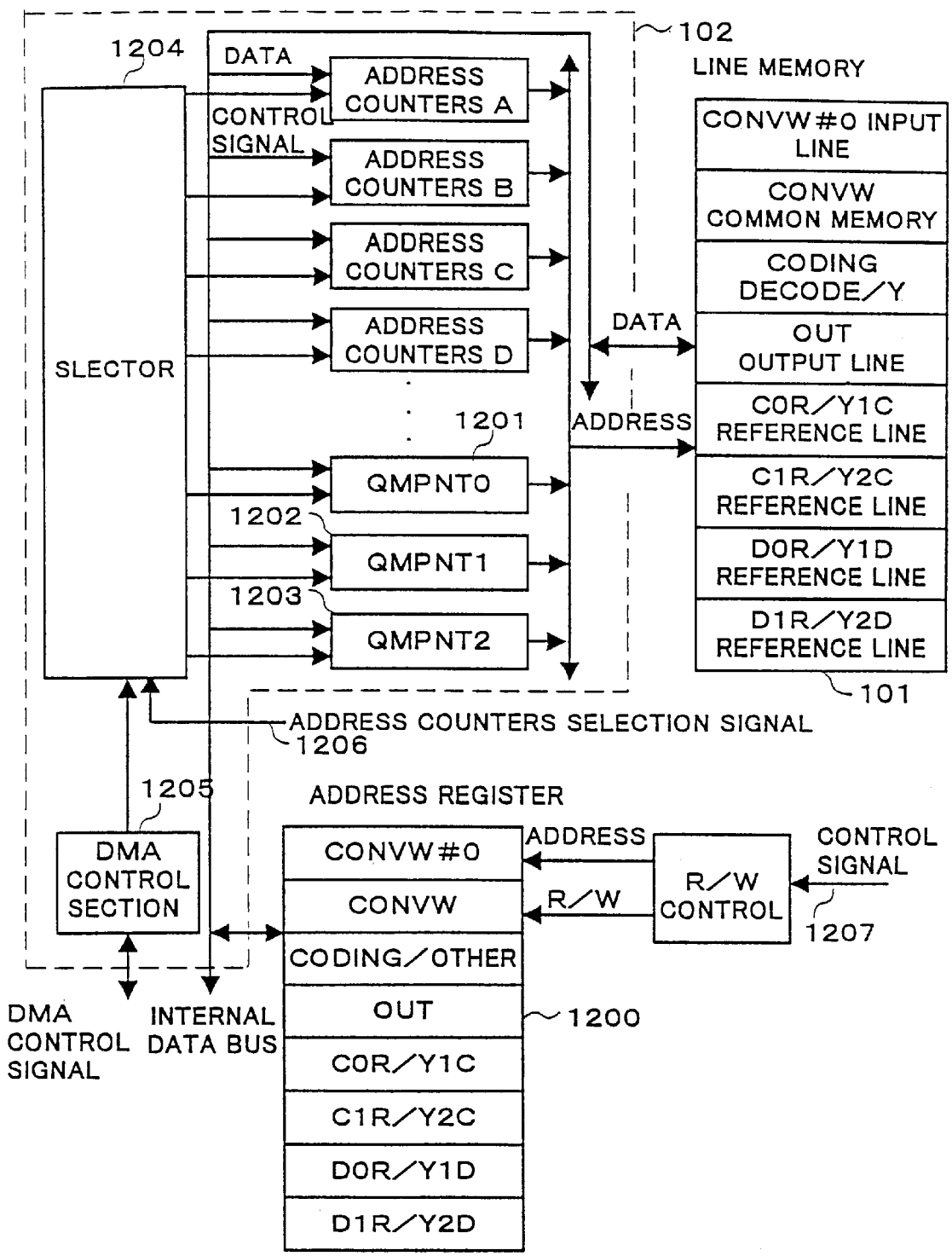
FIG. 12 is an illustration of a line memory, an address counters and an address counters.

FIG. 12 is a illustration relating to control of the line memory. In the internal bus DMA control section 102, there are address counters corresponding to the number of the line memory. QMPNT0 to QMPNT2 (1201 to 1203) are the address counters used in QM encoding and QM decoding. In these counters the leading address of each line memory is set as initial values by an address counters selection signal 1206 and a selector 1204 and is incremented hereafter every time DMA transfer of one word is completed. Address counters selection signal 1206 is sent from the control section 114 in FIG. 1. Block 1200 is a register for storing the leading address of the line memory being set as the initial value of the address counters. This register also, corresponding to the line memory, stores the information concomitant with memory, for example, whether memory is assigned or not, in addition to the leading address of the line memory. Address register 1200 is defined in RAM 1140 in FIG. 1, and can be red/written by the control section 114. The leading address of the line memory is written by the control section 114 in the address register 1200 upon entire initialization processing of the image processing apparatus.

[Description of Main Program]

Subsequently, in the image processing apparatus constituted as described above, how is processing such as encoding and decoding performed is described.

Figure 13:
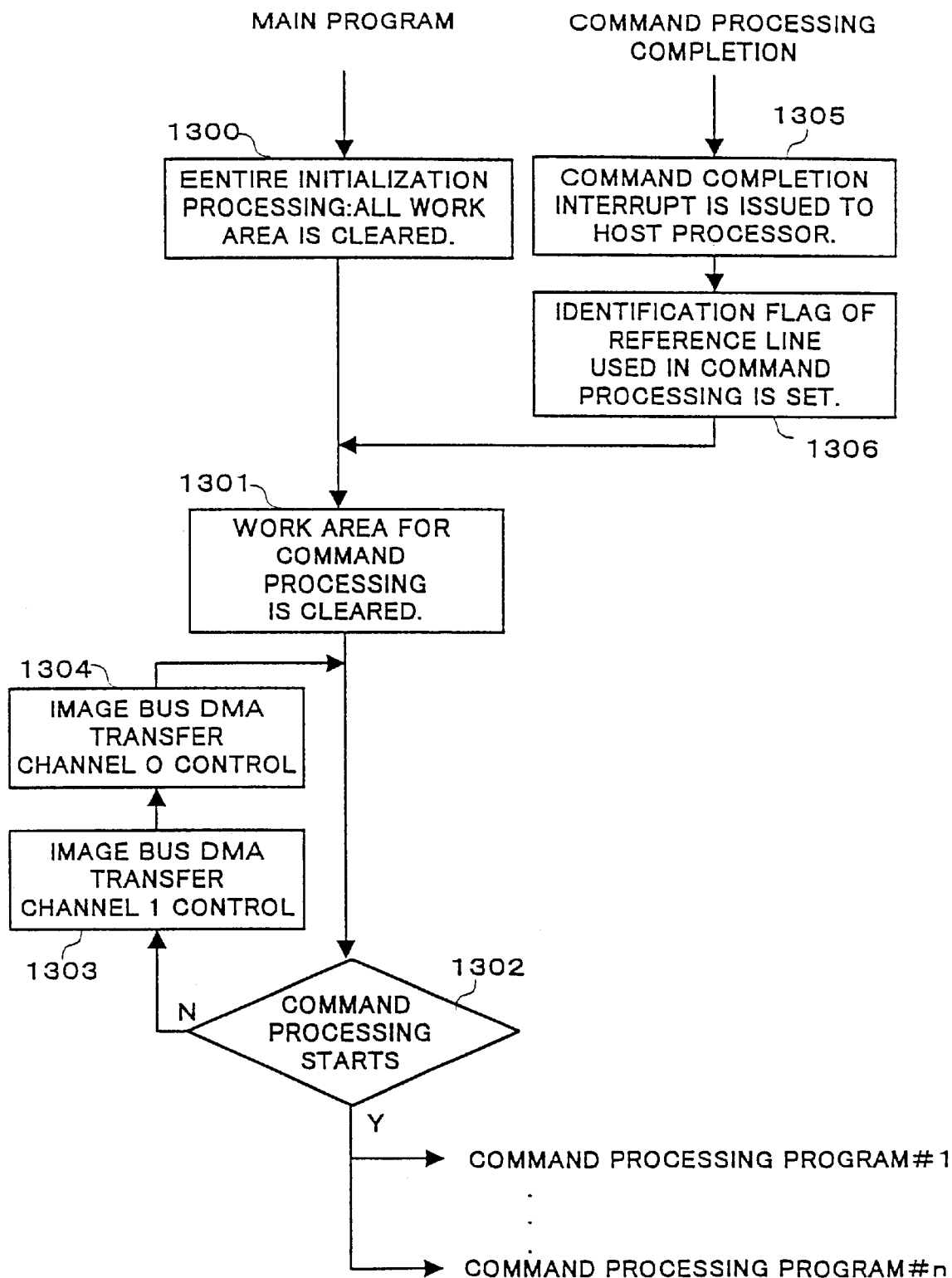
FIG. 13 is a flowchart of a main program of a microprogram.

FIG. 13 is a schematic flow of a main routine of the program stored in ROM 1142 inside the control section 114 in FIG. 1. In processing 1300, initialization of memory and a work area common to entire processing is execute. By this processing, a parameter register inside of RAM 101 in FIG. 1 is cleared or default values are written therein, and RAM 1140 for work are cleared.

In processing 1301, initialization of a control flag or the like used in command processing such as encoding is execute. Whether a processing initiation signal turns on or not is judged by a condition signal from the system bus control section 103 by processing 1302. This signal turns on, when MPU writes the code relevant to encoding processing and decoding processing or the like in a command register of the system bus control section. If a command processing signal is off, DMA transfer on the image bus is performed by processing 1303 and processing 1304.

Processing 1303 is DMA transfer from memory on the image bus to a printer and processing 1304 is DMA transfer from a scanner to memory. This DMA transfer is actuated by turning on the predetermined bit of DMA control register defined inside the system bus control section 103 from MPU. The loop of processing 1302 to processing 1304 is in latency until command processing is initiated. After command processing is initiated by judgment of processing 1302, jump to leading address of the program relevant to the command is performed to initiate processing.

FIG. 14 is a list of command processing implemented in the embodiments. Some of the commands are is described in detail hereafter. Here, a summary of each command is described.

The code 0x00 command a global initialization of the entire image processing apparatus, for example, devises line memory area of the RAM 101 to perform processing such as to set the leading address in the address register 1200 in FIG. 12. The code 0x01 and 0x02 commands initialization of T.4 encoding and T.4 decoding respectively. The code 0x03 commands initialization of data transfer processing composed of four combinations between the image bus and the system bus. The code 0x04 and the code 0x05 are the DMA transfer command from the system bus to the parameter register area. The code 0x06 to the code 0x08 are the command of MH, MR and MMR encoding processing of the number of predetermined line respectively. The code 0x09 is the RTC code sending processing command for MR MMR code, and the code 0x0A is the RTC code sending processing command for MH code. The code 0x0B to 0x0D are the command of MH, MR and MMR decoding processing of the number of predetermined line respectively. The code 0x0E to 0x16 are the command of code conversion from T.4 code to T.4 code of the number of predetermined line respectively. The code 0x17 is the command of four kinds of data transfer processing between the image bus and the system bus.

The code 0x18 is the initialization command of QM encoding. In this processing, the attribute information of the image which is the object of encoding, which information is set in the parameter register 101, and the parameter of QM encoding, for example, the number of the pixels of one line and stripe width or the like are sent in advance as a header of the encoded data being sent later. The code 0x19 is the initialization command of QM decoding. In this processing, in contrast with initialization of QM encoding, the aforementioned header information is analyzed and the attribute information of the reconstituted image is extended to the parameter register 101. QM decoding is execute using the information and the values set in the parameter register by MPU perform QM decoding by.

The code 0x1A and 0x1B are QM encoding and decoding processing of the number of predetermined line respectively. The code 0x1C and 0x1E are command for conversion processing from QM code to MH, MR and MMR codes respectively. The code 0x1F to 0x21 are command for conversion of the reverse direction thereof. The code 0x22 is command for conversion processing from QM code to QM codes.

The code 0x23 is the sending command of NEWLEN marker being the control code. This control code is defined in ITU recommendation T.81. The parameter concomitant with this code is the number of line of the encoded image. In this Embodiments, when the sending conditions of NEWLEN marker are satisfied, NEWLEN marker is sent during processing of QM encoding command. The code 0x23 is used, when sending of NEWLEN marker code is required by any situation intentionally. This is similar to RTC sending processing of the code 0x09 and the code 0x0A.

At completion of command processing, interrupt is issued and completion of command processing is noticed to the MPU, jumping from each command processing program to processing 1305. In processing 1306, in case of encoding or decoding command processing, an identification flag is set in order to store what the reference line used was. This is for the judgment whether there are the required reference lines on the line memory of the RAM 101 or not, when the command is issued the next time. The above description is processing of initiation and completion sections of the command.

[Description of T.4 Encoding Operation]

Figure 15:
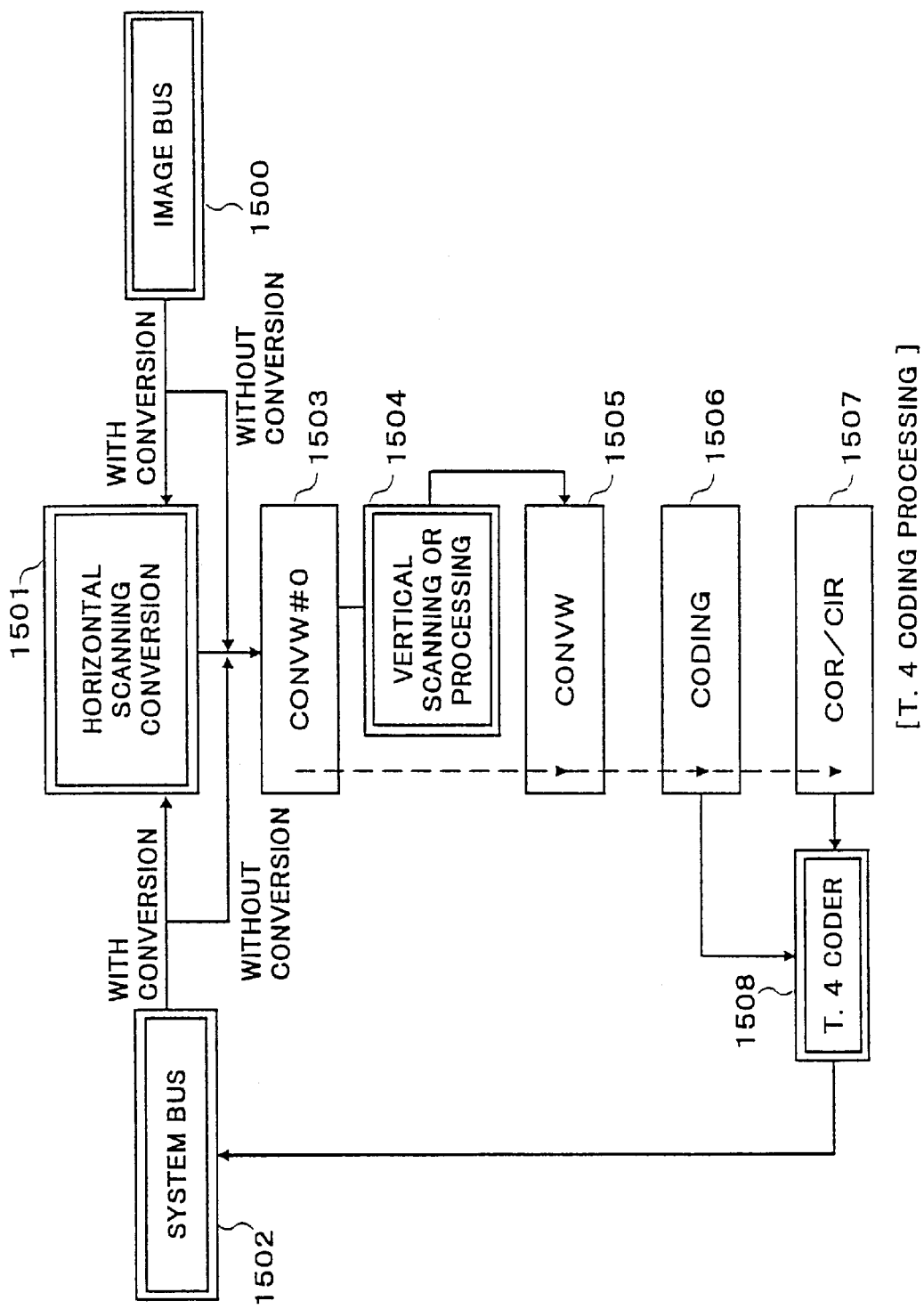
FIG. 15 is an illustration of a data movement between line memory of MH, MR and MMR encoding processing.

FIG. 15 is an illustration of the data sift between the line memory in T.4 encoding processing. The image data to be encoded is red from image bus 1502 or system bus 1502. When being attended with the resolution conversion of the horizontal scanning direction, the converted image data is written in the line memory CONVW#0 1501 after performing the horizontal scanning conversion 1501. When being not attended with the horizontal scanning conversion, the converted image data is written from an image bus or system bus in the line memory CONVW#0.

After completion of input of the image data to the line memory CONVW#0, calculation is performed for conversion processing of the vertical scanning direction as described below. In accordance with the result, the judgment whether the line memory CONVW#0 is the object of conversion or not is performed.

When not being the object line of conversion or there is no designation of conversion of the vertical scanning direction, the data of CONVW#0 is transfer to the line memory CONVW. By this transmission, the line memory CONVW#0 is unassigned, whereby the subsequent image data can be entered therein.

When CONVW#0 is the object line of conversion and reduction mode by the logical OR operation with the subsequent line is selected by the MPU, after waiting for the subsequent line to be entered in CONVW#0, the logical OR operation of the line memory CONVW#0 and the line memory CONVW is performed, and the result is written in CONVW again.

The data passed to the line memory CONVW is passed to line memory CODING for encoding subsequently. When encoding of this line is completed by T.4 encoder 1508 the data of line memory CODING is transmit to the reference line memory COR or CIR by channels of encoding, and becomes reference line upon encoding the subsequent line. By repetition of the above processing, encoding of the image data of one page is completed.

Figure 16:
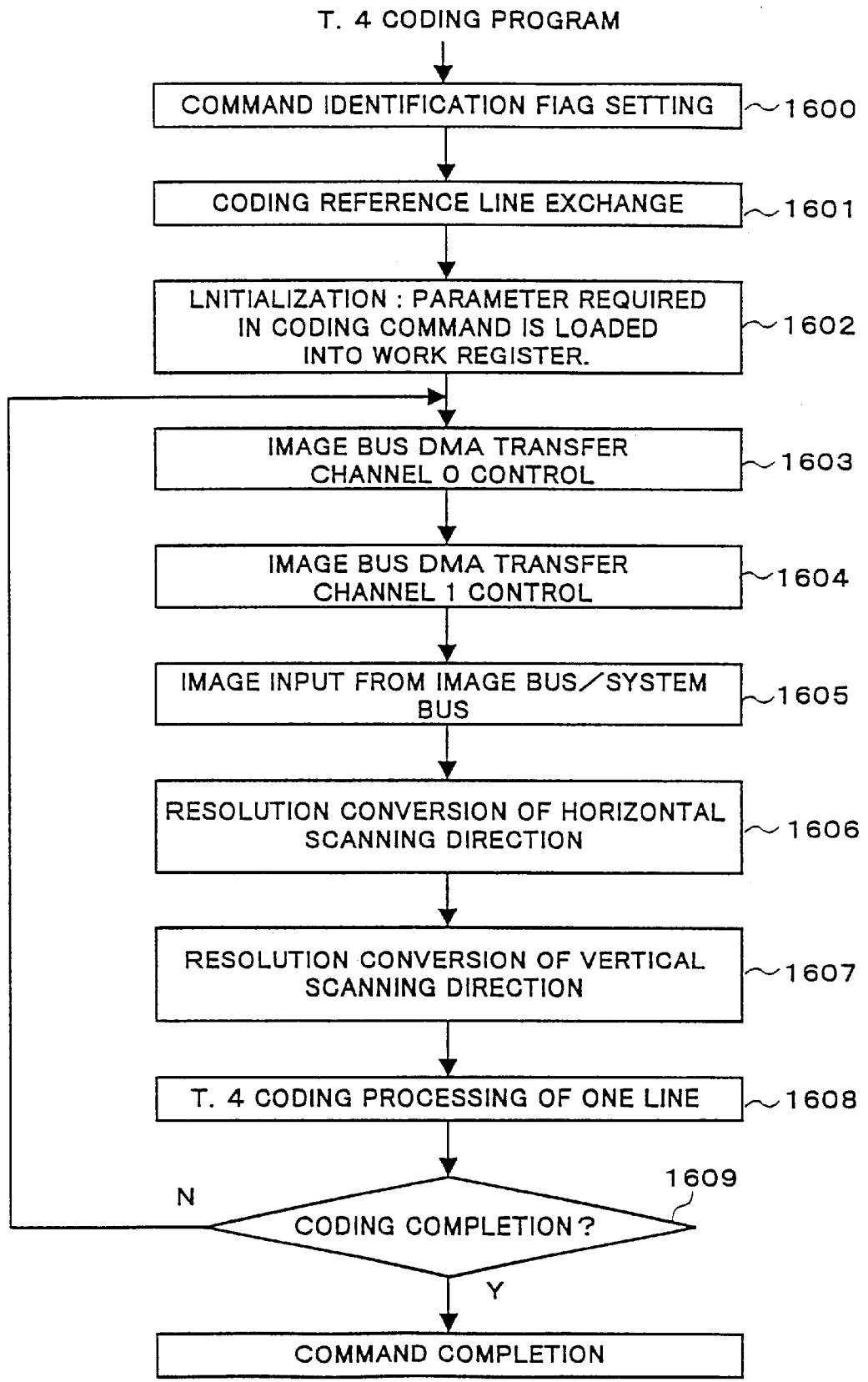
FIG. 16 is a flowchart of MH, MR and MMR encoding processing

FIG. 16 is a main flowchart of T.4 encoding processing. In the command code in FIG. 14, it corresponds to the code 0x06 to 0x08.

In processing 1600, various flag bits are set in the register. This register is relevant to the RAM 1140 in FIG. 1. Setting content is the flag showing encoding processing and the flag identifying coding type such as MH, MR and MMR. In Embodiments, processing 1600 is separated every one command, but is summarized into one flow because of situation of expression.

Processing 1601 judges whether there are the reference lines required upon MR and MMR coding on the line memory area. For example, as understood from FIG. 10, reference line COR for channel 0 of MR, MMR and reference line Y1C for QM encoding are assigned to the same address in order to reduce memory capacity. In this processing, when the encoder requires COR, whether the area of COR/Y1C is COR or not is judged, and, if not, exchange of the encoding reference line Y1C to the exterior and entering COR is performed. Detailed description is performed hereafter.

Processing 1602 loads the parameters required in encoding command processing in the RAM 1140 in FIG. 1 from the parameter register 101 through BE data bus 115. For example, the parameters are length of one line, the number of line encoded consecutively by one command, K parameter, the address of image memory on the image bus and DMA transfer parameters on the image bus or the like. As required, the parameters required for high speed processing are used after transferring into the RAM 1140 by one operation, although the parameter register 101 may be red.

Processing 1603 and processing 1604 are DMA transfer routine on the image bus. DMA controllers inside the image bus control section 100 in FIG. 1 are actuated and monitored, when instruction of transfer demand from the MPU is performed. These are the same as processing 1304 and processing 1030 in FIG. 13 respectively.

Processing 1605 is input processing of the image data from the image bus or the system bus. Any bus is actuated in order to enter the data through the path selected in advance.

Processing 1606 is the resolution converting device of the horizontal scanning direction. In this processing, the resolution converting device is actuated and monitored. Processing 1607 is the resolution conversion processing of the vertical scanning direction. The data resolution in vertical scanning direction is convert by thinned-out processing between the lines and the logical OR operation with preceding line.

Processing 1608 performs T.4 encoding of one line. Encoding processing of the predetermined number of lines is repeated by judgment of processing 1609. After completion, jump to processing 1305 in FIG. 13 is performed.

Figure 17:
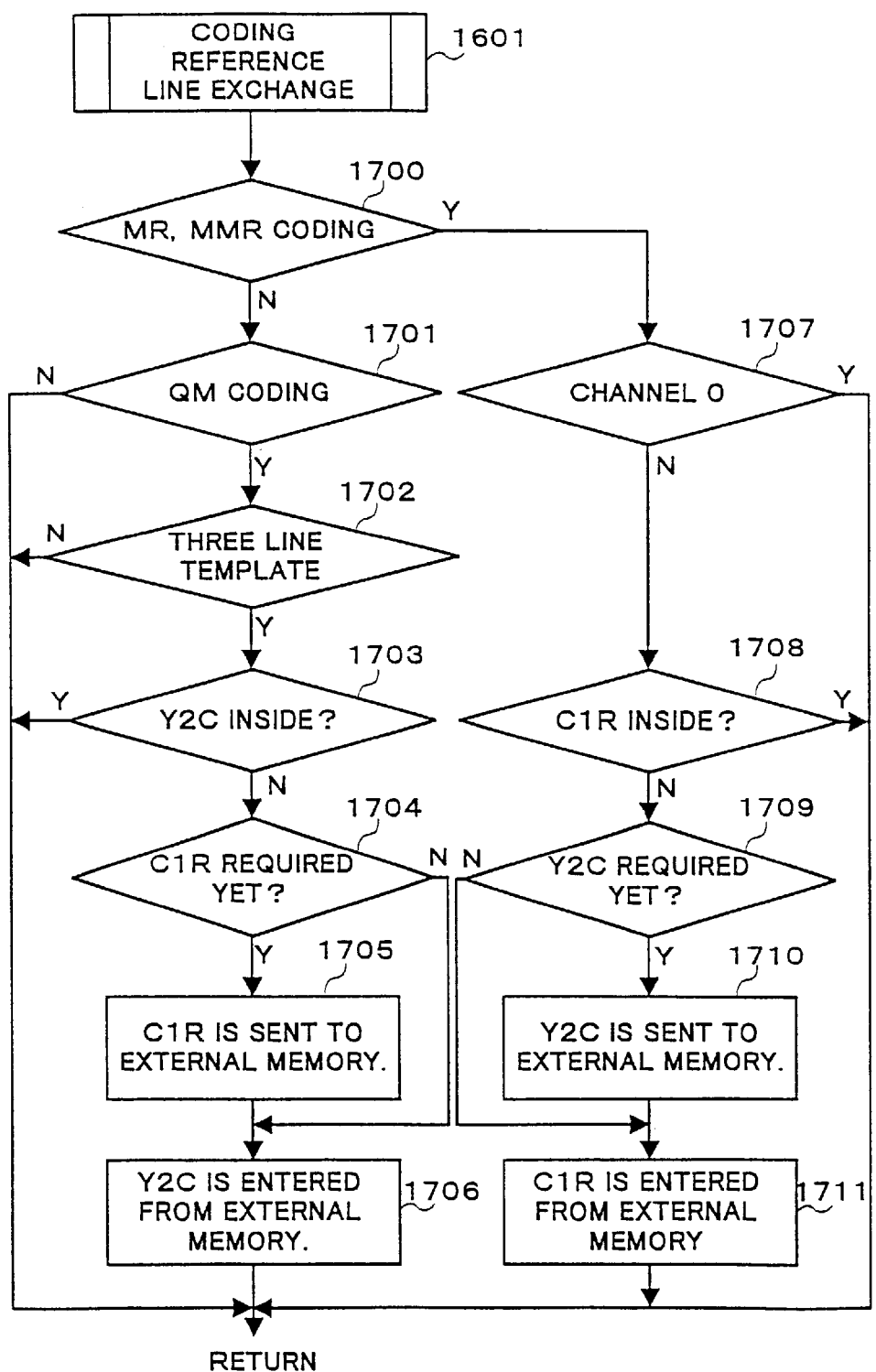
FIG. 17 is a flowchart of an encoding reference line exchange.

FIG. 17 is a flowchart of message exchange of encoded reference line 1601. Processing 1700 judges whether the encoding system is MR or MMR, referring to flag set by processing 1600 in FIG. 16. Processing 1701 judges whether the encoding system is QM encoding or not similarly and to exit from this processing is performed, if not, since the reference line is not required.

In processing 1702, whether parameter designation of QM encoding is the mode(two lines template)using the reference line of one line or the mode (three lines template) using the reference line of two lines is judged. This parameter is set in the control register C_QMCR inside QM encoding parameter in FIG. 11.

In processing 1702, to exit from this processing is performed, when not being the operation mode of three lines template. In embodiments, QM encoding and QM decoding are assigned to the channel 0 only. Therefore, in FIG. 10, although the MR, MMR coding reference line COR of channel 0 and Y1C of QM encoding are assigned commonly, these can not compete during encoding processing since only any one is used.

Processing 1703 judges whether C1R/Y2C=Y2C or not in case of three lines template, since the required reference line Y2C is in common area with C1R. The flag for identification is set in processing 1306 in FIG. 13 at completion of the command. In processing 1703,to exit from this processing is performed to go to encoding processing, when the reference line Y2C is in the interior thereof.

Processing 1704 judges whether C1R is required or not from now when C1R/Y2C=C1R. When C1R is required to be stored, output to the external memory is performed in processing 1705 and Y2C is entered from the external memory in processing 1706. According to this processing, the reference line required in QM encoding is prepared in an internal line memory.

Although processing from processing 1707 is the reference line message exchange on the occasion of channel 1 encoding of MR, MMR, the description is omitted because of similar processing.

Figure 18:
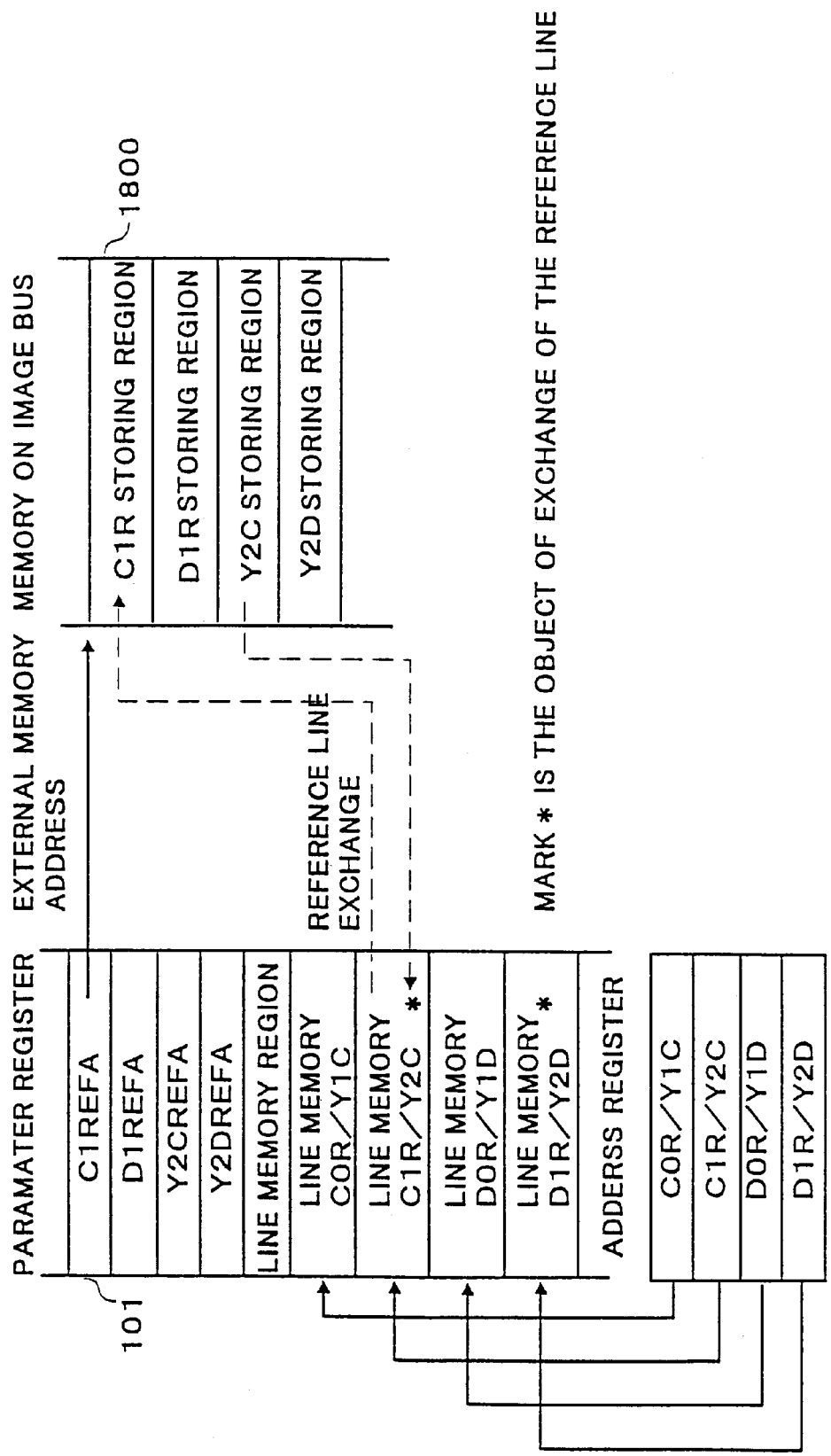
FIG. 18 is an illustration of a reference line exchange.

Processing 1705 and processing 1706 are shown in FIG. 18. The save area of CIR is assigned to RAM 1800, and the address is designated by register C1 REFA defined in the parameter register 101. C1R of the internal line memory is saved in the address of C1 REFA, and the reference line Y2C is entered from Y2 CREFA to the internal line memory in the same manner. Message exchange of decoding reference line D1R/Y2D is similar thereto also.

Figure 19:
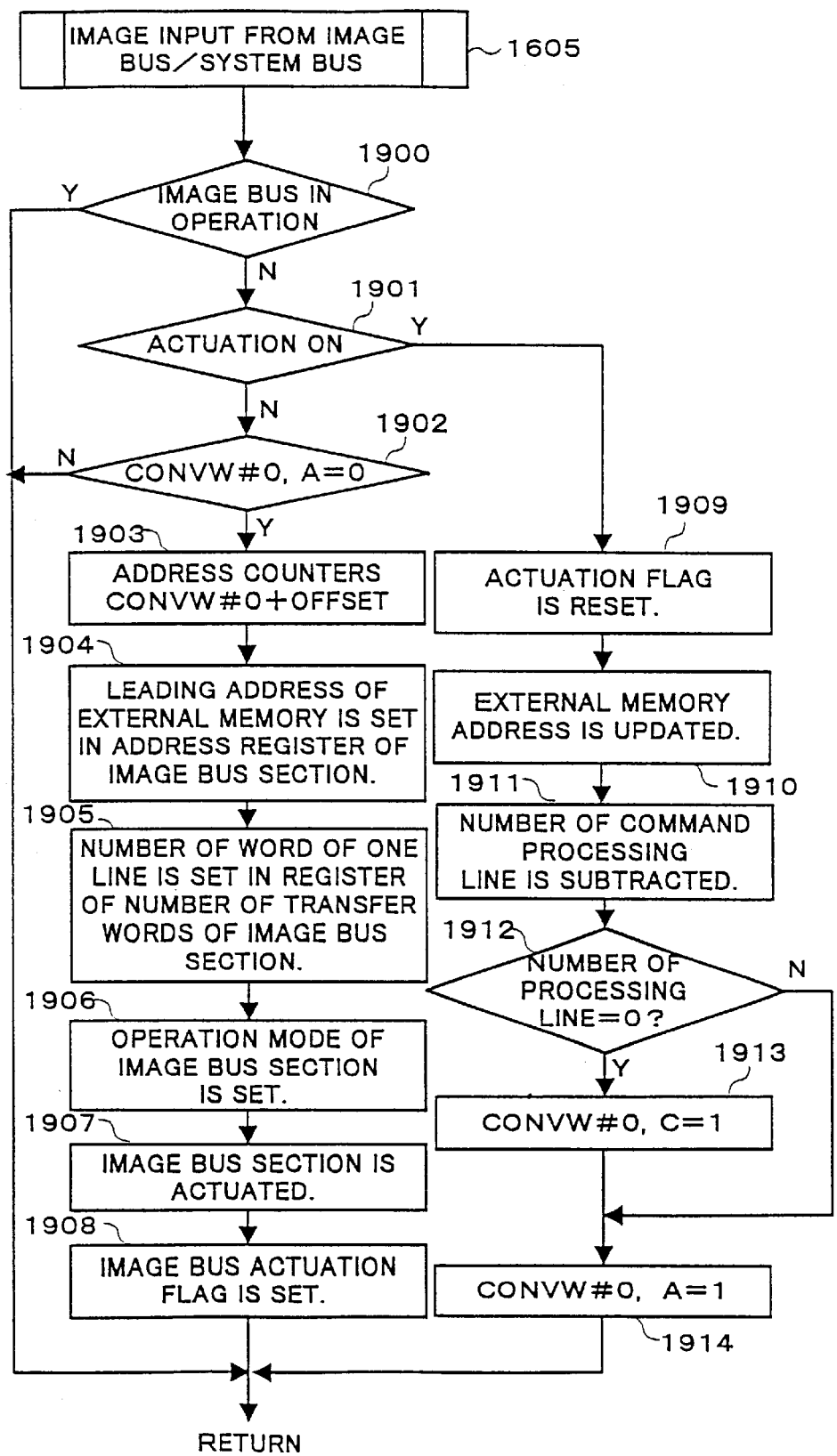
FIG. 19 is a flowchart of image input processing from an image bus/a system bus.

FIG. 19 is a flowchart of image input processing 1605 from the image bus/the system bus. Processing 1900 monitors the status signal from the image bus control section 100 to judge whether the image bus section is actuated already and is in operation or not. When being not in operation, the flag bits for control are checked in processing 1901 to examine whether the image bus section is actuated or not.

When the flag turns on, the line end processing from processing 1909 is performed and, if not, the line head processing from processing 1902 is performed.

Processing 1902 checks that line memory CONVW#0 is unassigned by the flag of the address register CONVW#0 described below.

Processing 1903 sets the leading address of the line memory in which the image is entered in the predetermined address counters of the internal bus DMA control section 102. As shown in FIG. 10, since the input line memory is CONVW#0, the value to which the offset value is added is set in the leading address of CONVW#0 set by processing of the global initialization command. The register for the offset value is defined in the parameter register 101 by processing such as for image input, for image output, for encoding and for decoding.

Figure 25:
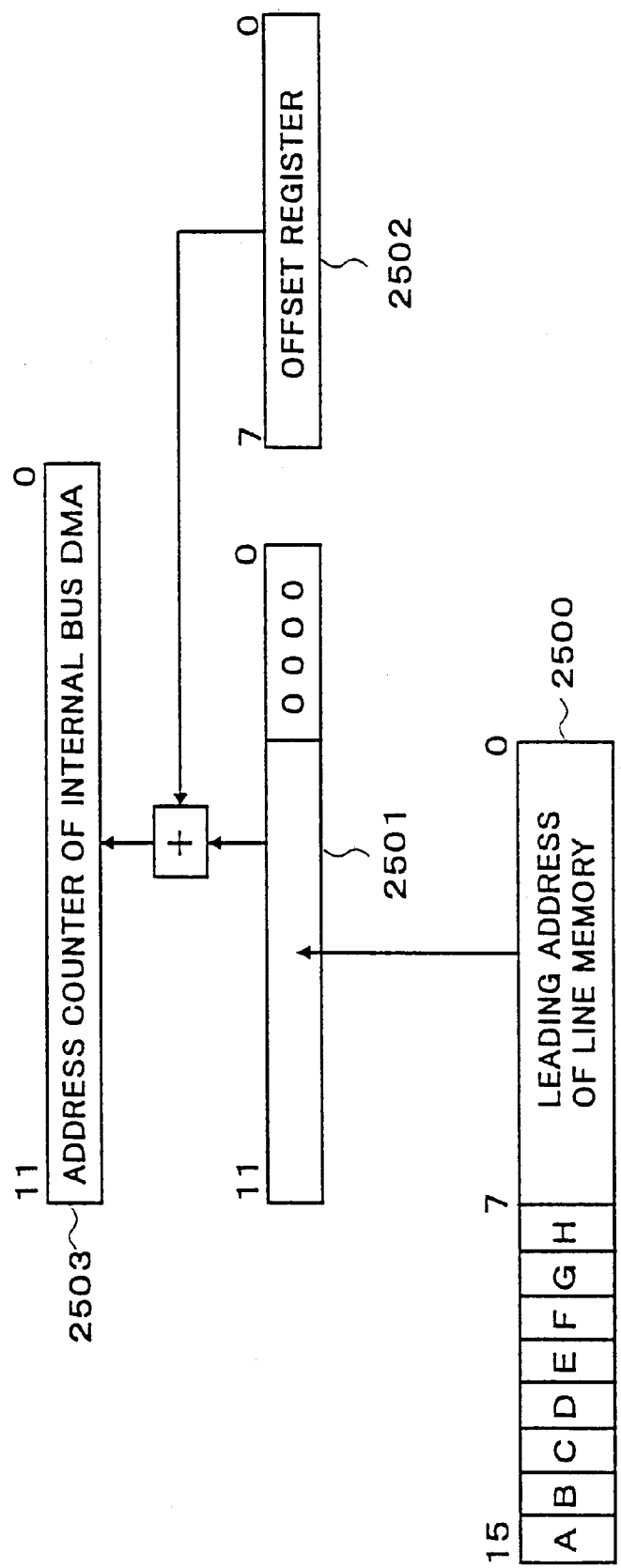
FIG. 25 is an illustration of a initialization to an address counters.

FIG. 25 is a view showing this situation. The leading address of line memory CONVW#0 is set in register CONVW#0 of the address register 1200 in FIG. 12. All the address registers are constituted as block 2500 in FIG. 25. The high order bit of eight bits is the flags showing the control information concomitant with the relevant line memory, and the low order bit of eight bits is the high order bit of eight bits in the memory address of twelve bits. In the address counters 1503 of the internal bus DMA, the value constituted by adding "0" of four bits in low order of the leading address of eight bits of the line memory and by adding the value of 2502 of the offset register of eight bits thereto is the actual leading address. As described below, the image can be moved to both sides within a page by changing the offset value where writing in memory and where reading out from memory. Treatment of the address register expect CONVW#0 is similar thereto.

In processing 1904 to 1906, the leading address of the image stored in the external image memory, the number of one word and operation mode are set in the register inside the image bus control section (block 100 in FIG. 1) respectively. The image bus section is actuated by processing 1907, and the flag showing that actuation is completed is set by processing 1908. This flag is checked by processing 1901. Although data input processing from the system bus is not illustrated in FIG. 19, the processing is substantially similar to the image bus side.

After completion of input of one line, actuation flag is reset in processing 1909. In processing 1909, one line of the external memory address in which the image is stored is updated. In processing 1911, the number of lines to be encoded consecutively, which the number of lines becomes unit of command processing, is subtracted. In processing 1912, whether the number of lines becomes zero is judged, and, if being zero, the flag showing the final line is set in the control bit of CONVW#0 in order to complete the command processing in processing 1913. Bit C in FIG. 25 has this meanings. In processing 1914, the flag showing that there are the significant data in CONVW#0 is set. Bit A has this meanings. It is shown by A=1 that the data reside on the line memory, and A=0 shows that the line memory is unassigned.

Figure 20:
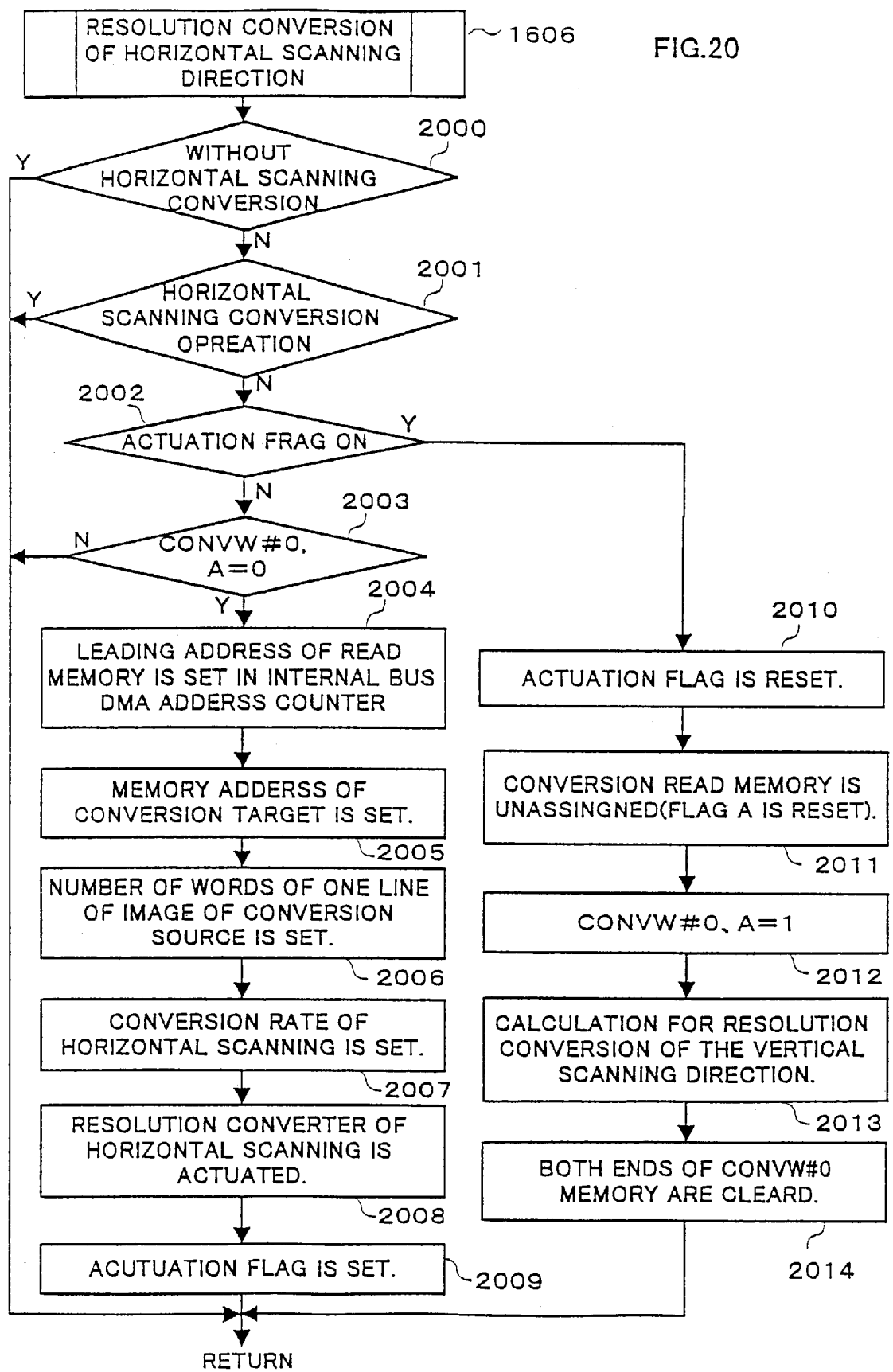
FIG. 20 is a flowchart of resolution conversion of the horizontal scanning direction.

FIG. 20 is a flowchart of resolution conversion processing 1606 of the horizontal scanning direction. It is the configuration similar to FIG. 19, and processing 2003 to processing 2009 are actuation of the line processing and processing 2010 to processing 2014 are the line end processing.

Since the data of which resolution is converted in the horizontal scanning direction is written, processing 2003 checks whether CONVW#0 is assigned or not. Processing 2004 sets the address of the line memory of the conversion source in the address counters of the internal bus DMA, or selects the input path for horizontal scanning converter such as an input to be entered from the image bus or an input to be entered from the system bus. Resolution conversion processing 1606 is the common processing such as encoding and decoding. The input path is selected at encoding in processing 2004.

Processing 2005 is the same as processing 1903 in FIG. 19. Processing 2006 sets the page width of one line of the original image in the register 501 in FIG. 5. Processing 2007 sets a conversion ratio in the register 506. The horizontal scanning resolution converting device is actuated in processing 2008, and the flag showing actuation of the horizontal scanning resolution converting device is set in processing 2009.

After processing of one line is completed by judgment of processing 2001 and processing 2002, the actuation flag is reset in processing 2010. Processing 2011 turns bit A of read memory off and unassigned the read memory, when the image before conversion is entered in the line memory 101, for example, decoding or the like. Since the image is entered from the bus section at encoding, this processing is not required.

In processing 2012, since data of one line is entered in the line memory CONVW#0, it is shown that the significant data resides by setting A=1. In processing 2013, the calculation for performing resolution conversion of the vertical scanning direction is performed (described below).

Figure 26:
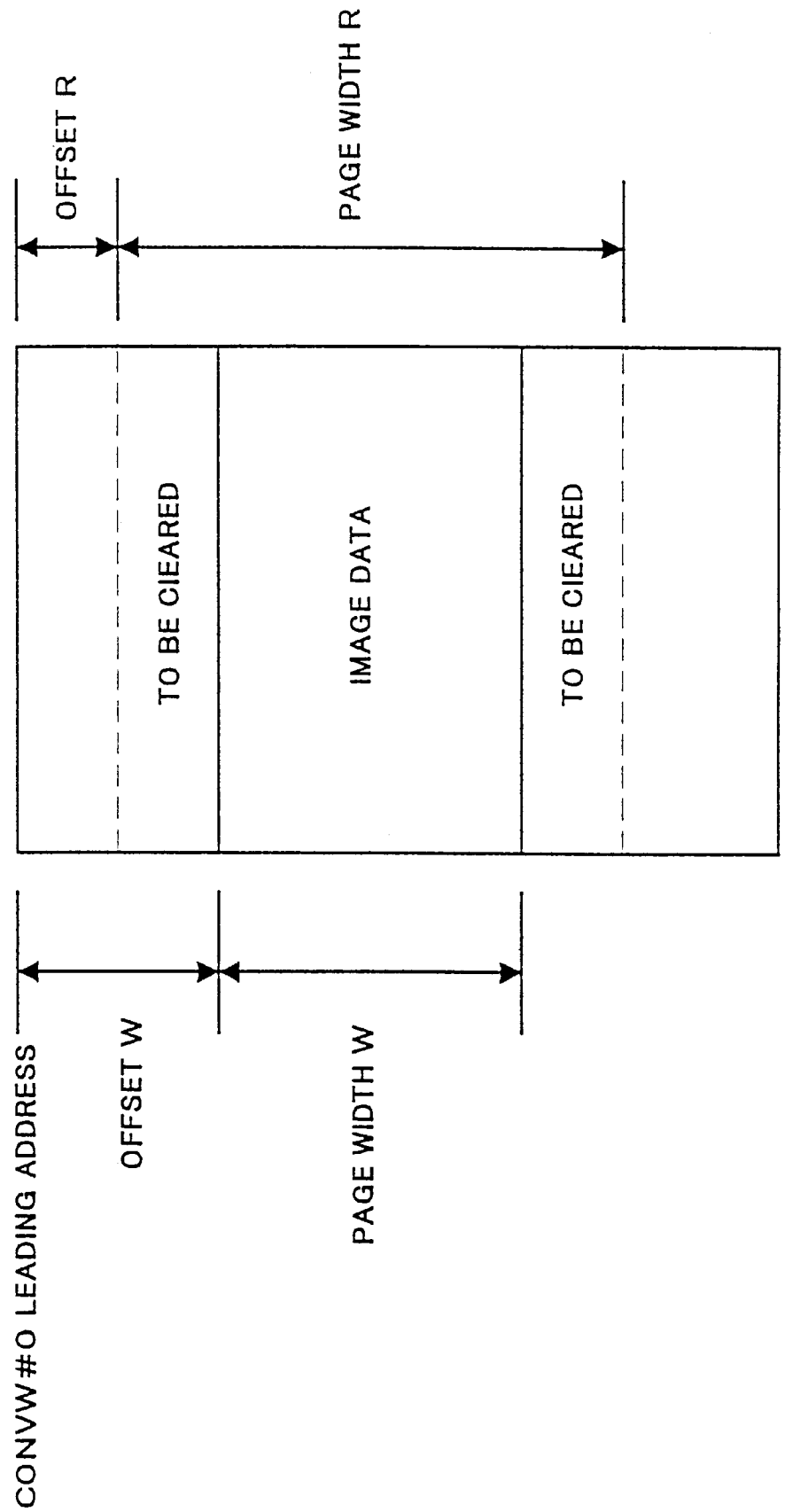
FIG. 26 is an illustration of an offset.

Processing 2014 clears the disused area in the line memory, since the data of the line memory CONVW#0 becomes the object of the subsequent processing, encoding in this example. FIG. 26 is a view showing this situation. As shown in the drawings, the image data of one line of the original image or after conversion is written in the memory, defining the offset and page width where being written in the line memory CONVW#0 as offset W and page width W respectively. Similarly, insignificant data is added head and behind the image data, defining the offset and page width where being red as offset R and page width R respectively and reading out therefrom as it is. Processing 2014 clears this background area.

Figure 21:
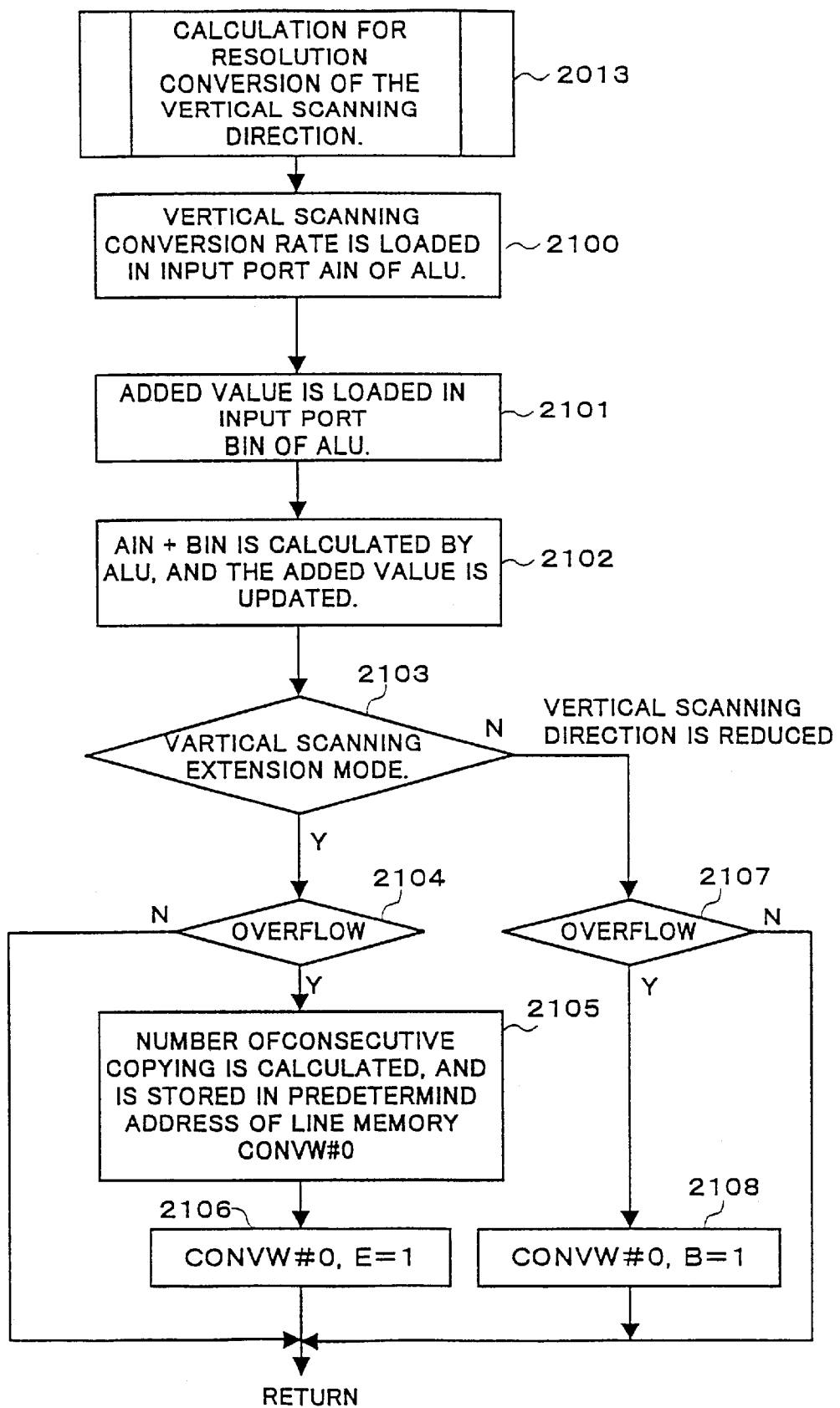
FIG. 21 is a flowchart of calculation of for resolution conversion of a horizontal scanning direction.

FIG. 21 is a flowchart of processing 2013 in FIG. 20 (calculation for resolution conversion of the vertical scanning direction). For the conversion of the vertical scanning direction, conversion ratio of the vertical scanning direction set in the predetermined register of the parameter register 101 are added up every time input of the image data of one line is completed, and the line in which overflow is occurred is directed to conversion. The conversion ratio of the vertical scanning direction is designated by 16 bits and adding up is performed by ALU 1141 of 16 bits (FIG. 1). For example, when being condensed to 0.5 times, the vertical scanning reduction conversion ratio is set at 0x8000. The line becomes the object of reduction processing since overflow is occurred on alternate times, adding up this value. At expansion, the inverse of an expansion ratio is set as the conversion ratio. The line to be expand is defined by similar calculation and the line is designed to be processed a plurality of times in accordance with the expansion ratio. For example, in case of encoding, the encoded data by which the line may be reconstituted is sent when being reconstituted.

Processing 2100 and processing 2101 enter the vertical scanning conversion ratio and the added value up thereto in two ports of ALU 1141 (FIG. 1), and the added value is updated in processing 2102.

Processing 2103 judges whether the vertical scanning conversion is reduction or expansion. Designation of expansion or reduction of the vertical scanning direction is judged by setting the predetermined bit of the register of the parameter register 101.

In case of reduction, when the overflow of addition processing 2102 is detected in processing 2107, the flag showing the detection is set in the bit B of address register CONVW#0 (block 2500 in FIG. 25) in processing 2108. The bit B is checked in the subsequent processing and reduction processing is performed.

In case of expansion, when the overflow of addition processing 2102 is detected in processing 2104, the number of copying consecutively in processing 2105 is calculated from the added result of processing 2102 and the value corresponding to conversion ratio 1 and the number is written in the predetermined address in the line memory CONVW#0. In processing 2106, bit E is set as the flag showing being the expansion object line by the image data of the line memory CONVW#0. In processing 2105, the value stored in the memory area and the flag set in processing 2106 are referred in the subsequent processing as in the case of reduction processing and at this point, expansion processing in response to the command processing is performed.

Figure 22:
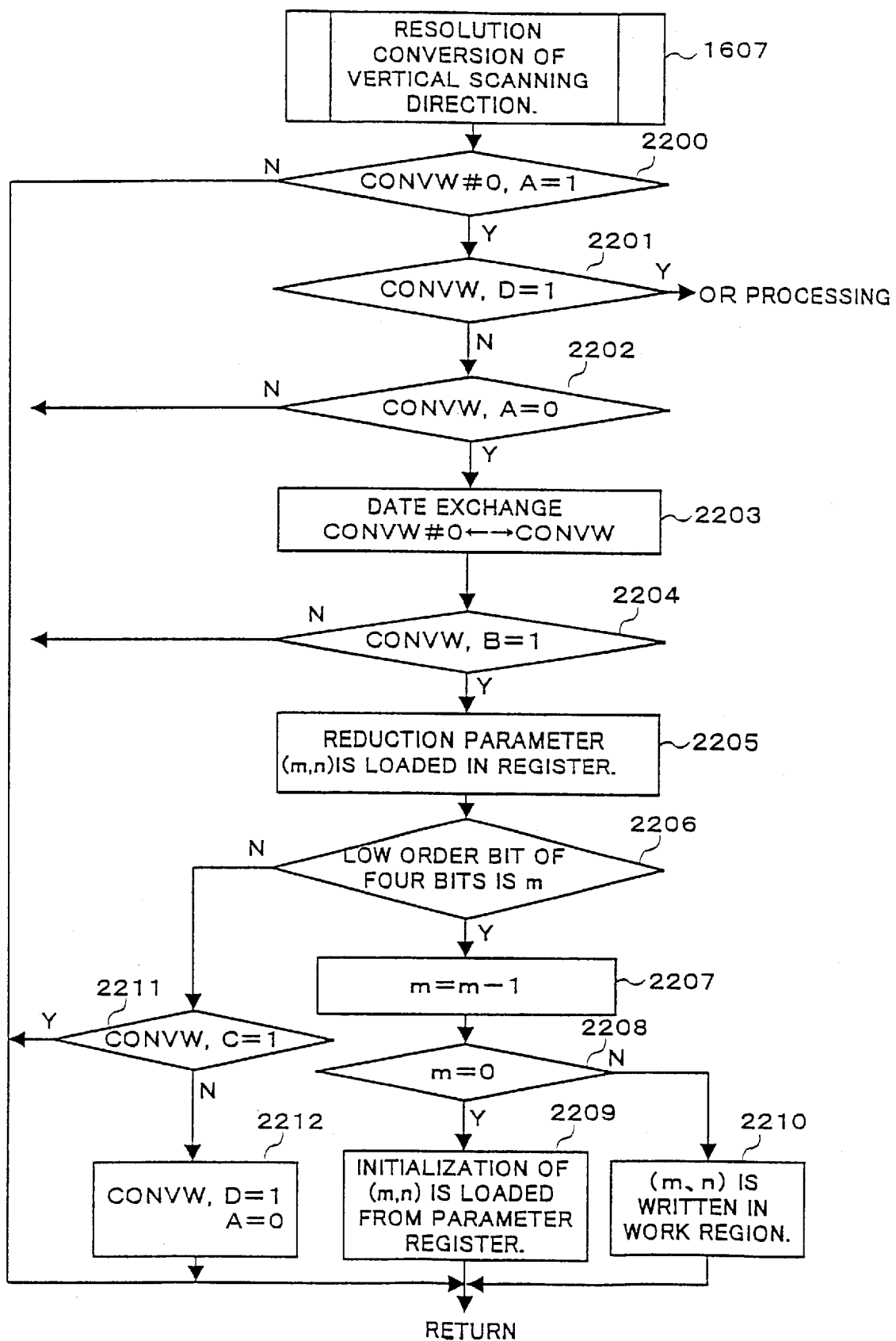
FIG. 22 is a flowchart of calculation of for resolution conversion of a vertical scanning direction.

FIG. 22 is a flowchart of resolution conversion 1607 of the vertical scanning direction in FIG. 16. At this point, expansion processing is not performed. Reduction of the vertical scanning direction is a combination of a thinned-out processing between lines and the thinned-out processing (hereinafter referred to as the OR thinned-out operation) that is performed after performing the logical OR operation of the thinned-out line and the subsequent line. The advantage of the OR thinned-out operation is that the thin line of one bit of the horizontal scanning direction is stored. However, it has tendency to go dark as a whole and image quality deteriorates, as the reduction ratio is enlarged (as the screen is made small).

Figure 24:
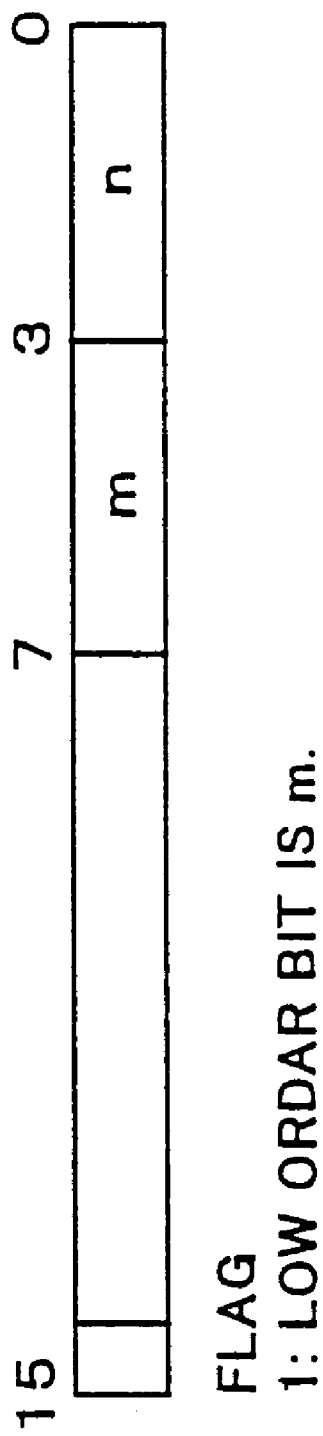
FIG. 24 is a block diagram of a parameter (m, n).

FIG. 24 shows the configuration of the parameters setting how to combine the thinned-out processing and the OR thinned-out operation. These parameters are represented as (m, n). Both m and n are integers represented by four bits, and m shows the consecutive number of the thinned-out processing and n shows the consecutive number of the OR thinned-out operation. For example, (1, 1) is setting performing the thinned-out processing and the OR thinned-out operation alternately, (1, 0) is setting of the thinned-out processing, and (0, 1) is setting of the OR thinned-out operation. After completion of the OR thinned-out operation of n times, this register is shifted to the right side by four bits, and the low order bit of four bits shows m. What shows this situation is the flag of the most significant bit (MSB). Thus, flexibility of vertical scanning conversion is improved by representing reduction conversion mode with the combination of the number of two.

Returning to FIG. 22, resolution conversion processing of the vertical scanning direction is described. Processing 2200 judges whether the significant data is entered or not in the memory CONVW#0. Processing 2201 judges whether the data of CONVW becomes the object of the OR operation or not. This identification is performed with bit D of the address register (block 2500 in FIG. 25). Processing 2202 judges whether the line memory CONVW#0 is assigned or not. In processing 2203, since the data resides in CONVW#0 and memory CONVW is unassigned, data exchange between memory CONVW#0 and memory CONVW is performed.

Exchange of the line memory is realized by swapping the content of two address registers which become the object. FIG. 27 is a view showing this situation. Other exchange of the line memory is performed similarly.

Since data of CONVW#0 is shifted to CONVW in processing 2203, processing 2204 checks bit B of CONVW to judge whether the data of CONVW line memory is the object of reduction or not. Since it is not reduction processing line if not B=1, resolution conversion processing of the vertical scanning direction is completed. Reduction parameter (m, n) is loaded in the register for work, if B=1. The reduction parameter (m, n) in FIG. 24 are prepared every command for encoding for decoding and for data transfer and are defined in the parameter register 101. In processing 2206, MSB of the parameter (m, n) is checked and whether the low order bit of four bits is m or not. When the low order bit of four bits is m, the simple thinned-out processing is performed m times. In the simple thinned-out processing, the data is designed to be ejected, passing to the subsequent processing under the condition that the data of CONVW remains B=1. If subtracting m therefrom in processing 2207, the initialization value (m, n) are loaded to the work register, if the result being zero, or the updated (m, n) is written in the work register, if not zero. After passing through this processing m times, the simple thinned-out processing is performed m times in the subsequent processing.

If the low order bit of four bits is n by judgment of processing 2206, C=1 is checked in processing 2211, and whether being the final line in the command or not is judged. For simplification in this embodiment, the OR operation is not performed for the final line as an exception processing. If being not the final line, D=1 and A=0 are set in processing 2212. D=1 is the flag showing the data for wait of the OR operation. Moreover, the data is designed to be not passed to the subsequent processing by setting A=0.

Figure 23:
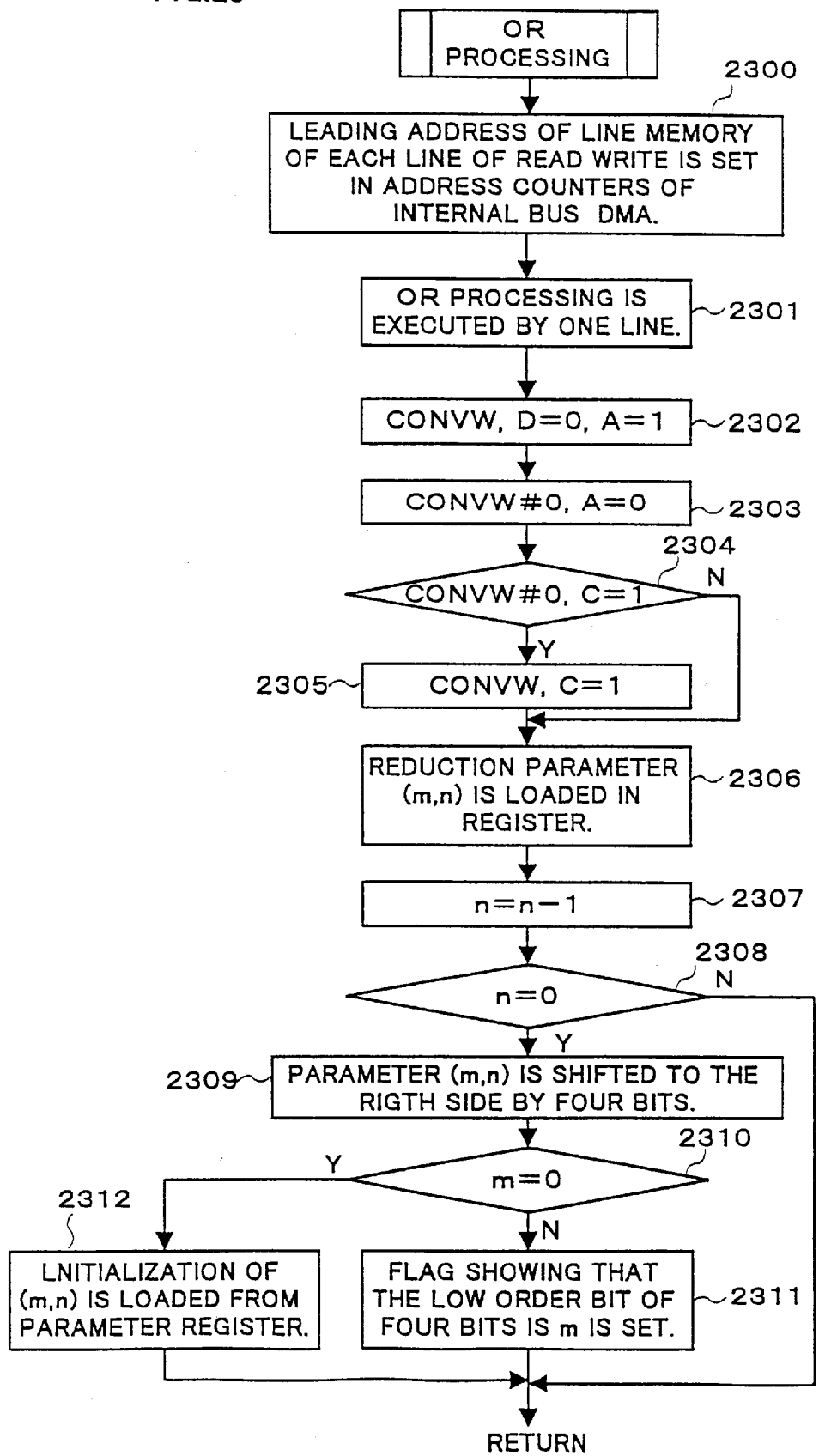
FIG. 23 is a flowchart of a logical OR operation of vertical scanning.

It is supposed that the subsequent line is entered to CONVW#0 to enter processing 1607 again. Then, since CONVW and D=1 are set in processing 2201, jump to the OR operation in FIG. 23 is performed. The OR operation is performed by reading the data of CONVW and the data of CONVW#O using block 503, block 504, block 507 and block 511 in FIG. 5 every one word to perform the OR operation, and repeating the processing writing in the line memory CONVW by the number of word of one line.

Processing 2300 in FIG. 23 sets the leading address of the line memory CONVW#0 and CONVW in the address counters of the internal DMA. In processing 2301, the OR operation circuit is actuated, and the OR operation of one line are performed. In processing 2302, it is shown by setting D=0 and A=1 that the significant data resides in CONVW. In processing 2303, since the data of CONVW#0 is not required now, the data of CONVW#0 is ejected by setting A=0. In processing 2304, whether the latest input line CONVW#0 is the final line or not is judged. If being the final line, the final line flag is passed by setting C=0 in CONVW.

In processing 2306, the reduction parameter (m, n) is loaded in the work register. The number of n of the OR operation is subtracted, and processing is completed, if the result is not zero. When n=0, m is be designed to be set in the low order bit of four bits by shifting the work register by four bits to the right side in processing 2309. The initialization value is loaded in processing 2312, if m is zero, and the flag is set in MSB in processing 2311 to complete the OR operation, if not zero. With this, the description of T.4 encoding processing operation is completed.

[Description of T.4 Decoding Operation]

Figure 28:
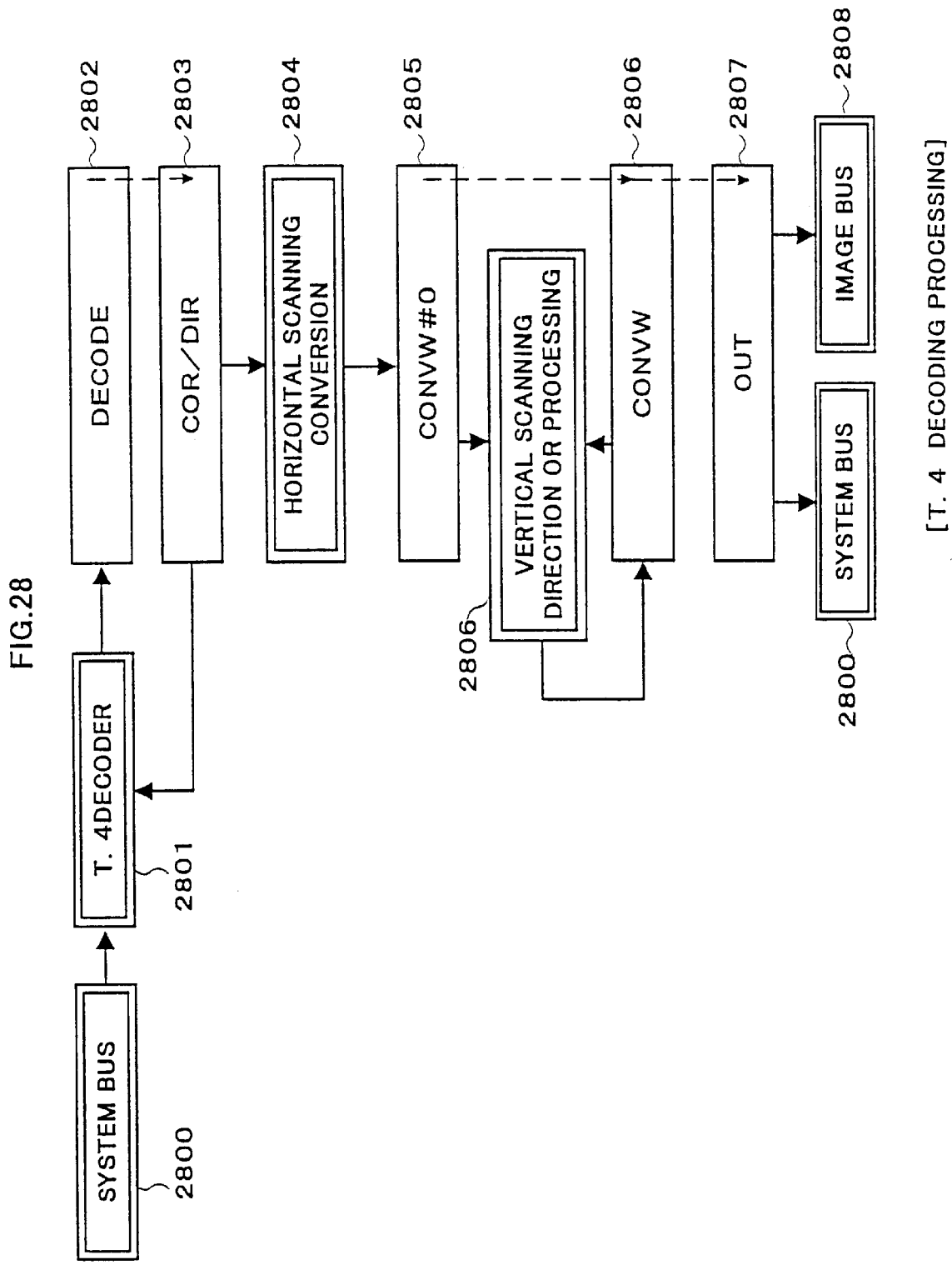
FIG. 28 is an illustration of a data movement between line memory of MH, MR and MMR decoding processing.

FIG. 28 is an illustration of the data sift between the line memory in T.4 decoding processing. The encoded data to be decoded is red from a system bus 2800. T.4 decoder 2801 writes the reconstituted image in line memory DECODE 2802, referring to the reference line DOR/D1R (2803) in accordance with the channel of decoding. The horizontal scanning conversion from line memory D0R/D1R to line memory CONVW#0 (2805) is performed in parallel with this decoding operation. Resolution conversion of the vertical scanning direction is common with encoding processing, and is performed by the OR operation of CONVW#0 and each line memory of CONVW or the simple thinned-out processing. This processing result is passed to the line memory CONVW. Then, the content of memory CONVW is transferred into memory OUT to be sent from the system bus 2800 or the image bus 2808. By repetition of the above processing, decoding processing is completed.

Figure 29:
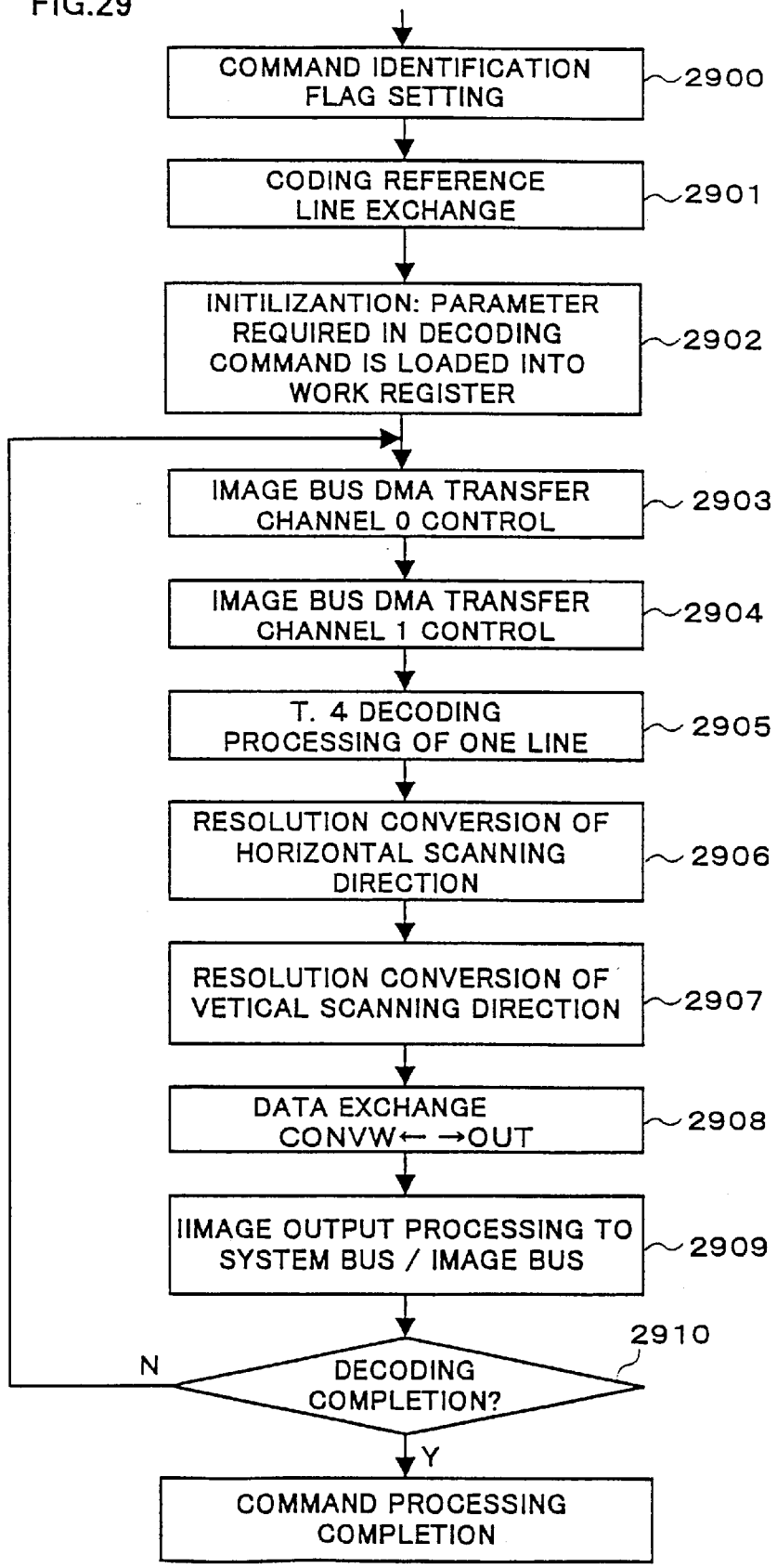
FIG. 29 is a flowchart of MH, MR and MMR encoding processing

FIG. 29 is a main flowchart of T.4 decoding processing. In the command code in FIG. 14, it corresponds to the code 0x0B to the code 0x0D. In processing 2900, various flag bits are set in the register. This register resides in the RAM 1140 in FIG. 1. Setting content is the flag showing decoding processing and the flag identifying decoding system such as MH, MR and MMR. In Embodiments, processing 2900 is separated every one command, but is summarized into one flow because of situation of expression.

Figure 30:
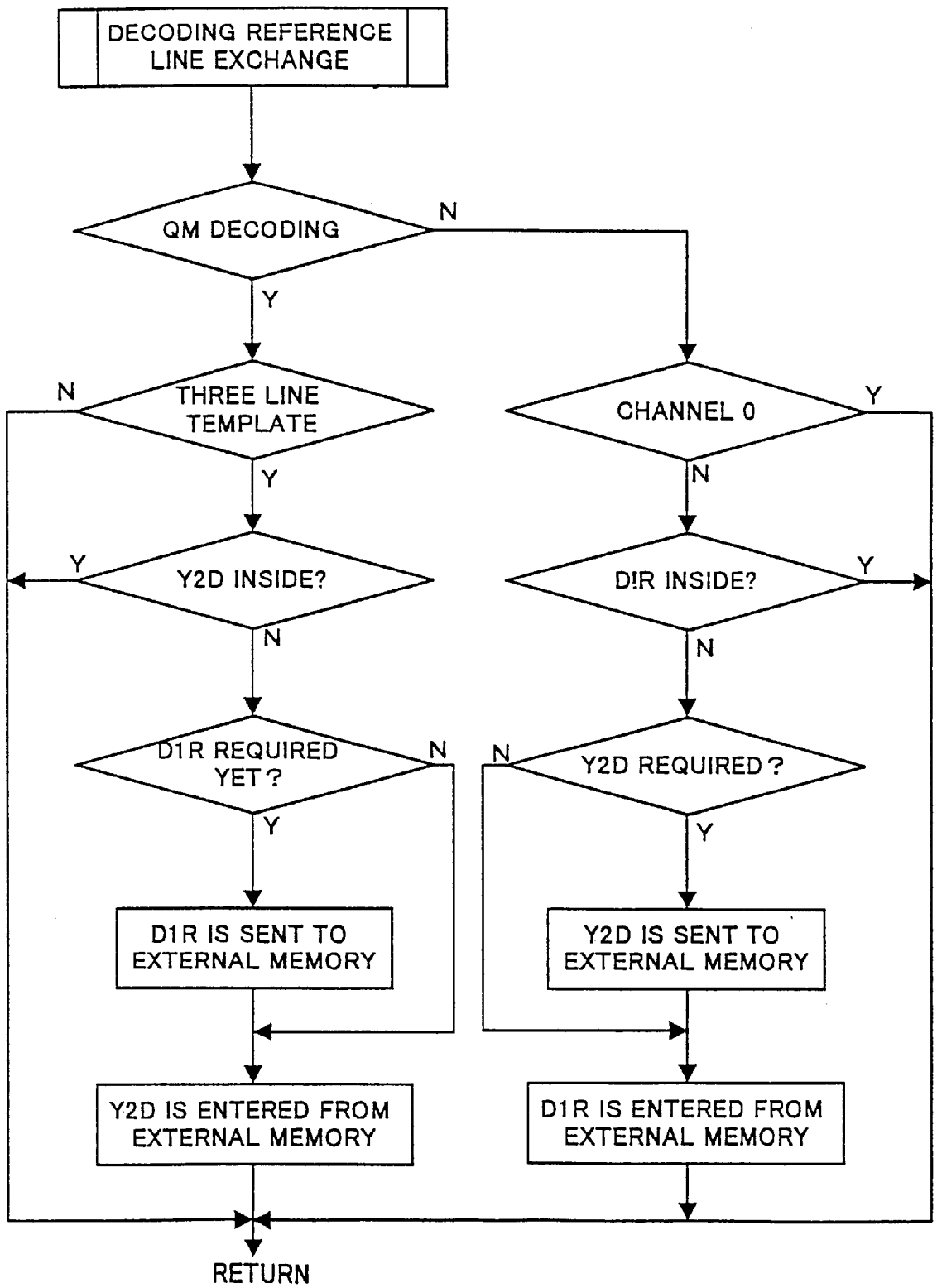
FIG. 30 is a flowchart of an encoding reference line exchange.

Processing 2901 judges whether there are the reference lines required upon MR and MMR decoding on the line memory area. For example, as understood from FIG. 10, reference line D0R for channel 0 of MR, MMR and reference line Y1D for QM decoding are assigned to the same address in order to reduce memory capacity. In this processing, when the decoder requires D0R, whether the area of D0R/Y1D is D0R or not is judged, and, if not, exchange of decoder reference line sift Y1D to the exterior and entering D0R is performed. Detailed description of processing 2901 is shown in FIG. 30. is performed hereafter. The description is omitted since the content is similar to FIG. 17 expect the difference of encoding and decoding.

Processing 2902 loads the parameters required in decoding command processing in the RAM 1140 in FIG. 1 from the parameter register 101 through BE data bus 115. For example, the parameters are length of one line, the number of line decoded by one command, the address of image memory on the image bus and DMA transfer parameters on the image bus or the like. The parameters required for high speed processing are used after transferring into the RAM 1140 by one operation, although the parameter register 101 may be red as required individually.

Processing 2903 and processing 2904 are DMA transfer routine on the image bus. DMA controllers inside the image bus control section 100 in FIG. 1 are actuated and monitored, when instruction of transfer demand from the MPU is performed. These are the same as processing 1304 and processing 1303 in FIG. 13 respectively.

Processing 2905 performs T.4 decoding of one line. Processing 2906 is the resolution conversion of the horizontal scanning direction. In this processing, the resolution converting device is actuated and monitored. These are the same content as described in T.4 encoder processing. Processing 2907 is the resolution conversion processing of the vertical scanning direction. The vertical scanning direction is converted by thinned-out processing between the lines and the logical OR operation with preceding line. These are same with T.4 encoder processing also.

Processing 2908 is data exchange processing between line memory CONVW and line memory OUT. Processing 2909 is output processing of the image data from the line memory OUT to the image bus or the system bus. Either bus is actuated for data output through the predetermined path. Decoding processing of the predetermined number of lines is repeated by judgment of processing 2910. After completion, jump to processing 1305 in FIG. 13 is performed.

Figure 31A:
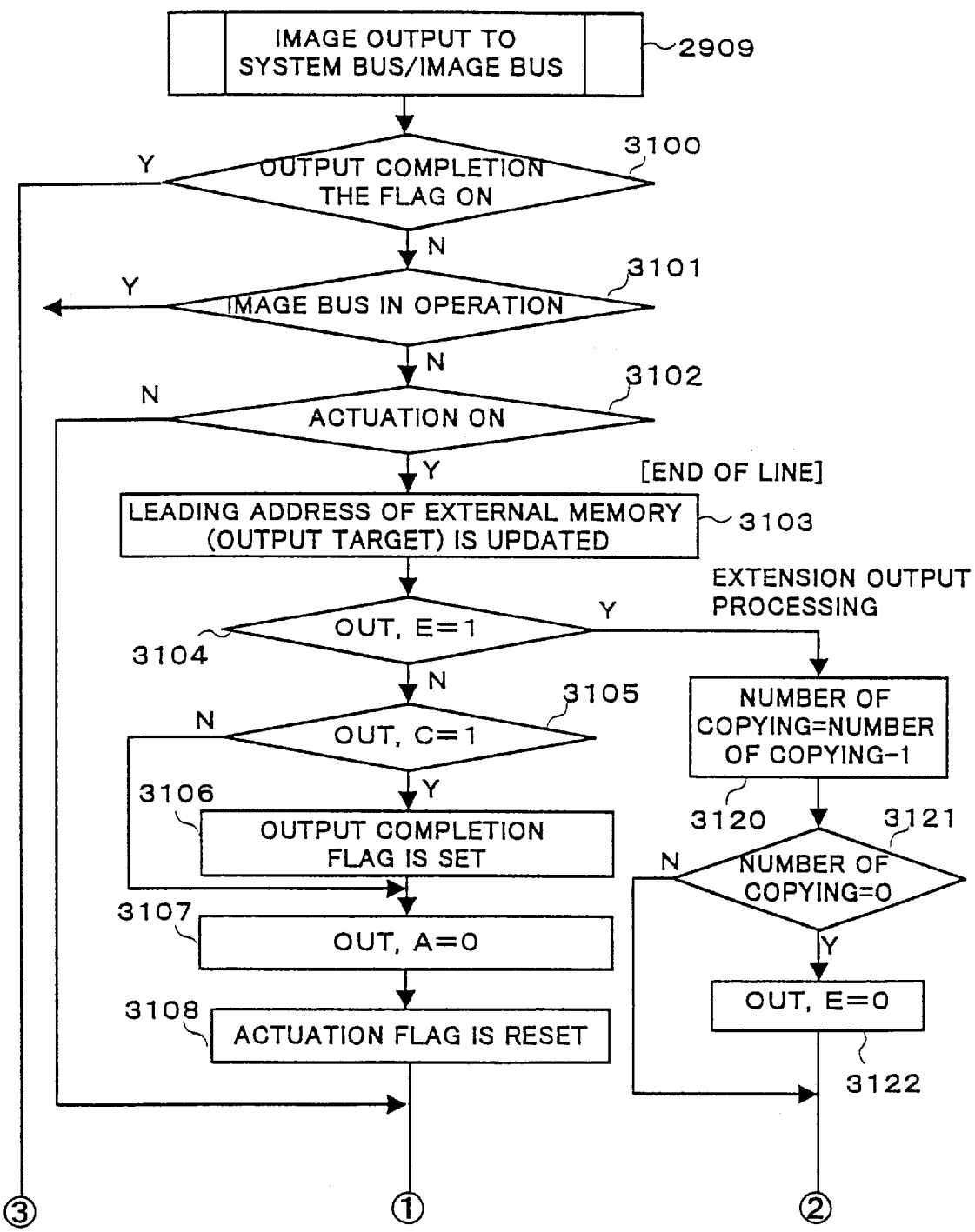

FIGS. 31A and 31B are flowcharts of the image data output processing 2909. In this flowchart, the case of sending to the image bus is described. Processing 3100 judges whether the output processing is completed or not. Processing 3101 judges whether the image bus is in operation or not and processing 3102 judges whether the image bus is actuated or not. If the image bus section is in the idle condition and the actuation flag turns on in processing 3101 and 3102, the output processing of one line is completed, whereby one line of the leading address of the external memory writing the data is updated in processing 3103.

Processing 3104 checks whether the expansion flag (E bit) turns on or not, and shifts to the processing from processing 3120, if E=1. Whether being the final line in the command or not is judged in processing 3105 by C bit of the address register OUT. Since the output processing of the predetermined line is completed, if being the final line, the output completion flag is set in processing 3106. This flag is checked in processing 3100. The line memory OUT is unassigned by setting A=0 in the address register OUT in processing 3107. Processing 3108 resets the image bus actuation flag. With this, the line end processing is completed.

Processing from processing 3109 is the line head processing. Whether the output data resides in the line memory OUT or not is judged in processing 3109. Whether the data of the line memory OUT is the thinned-out line or not is checked in processing 3110. Ejection processing is performed in processing from processing 3117, if being the object of the thinned-out processing.

In processing 3111, the leading address to be red is set of the line memory in the address counters of the internal bus DMA from the line memory OUT. Processing 3112 sets the leading address of the external memory in the image bus section. In processing 3113, the width of the output line in the image bus section is set. In processing 3114 and processing 3115, the image bus is set at the output mode to be actuated. In processing 3116, the flag showing that the image bus is actuated in output processing is set. This flag is checked in processing 3102.

In processing 3117, bit A and bit B are reset in order to thin-out the line data. In processing 3118 and processing 3119, if the thinned-out line is the final line, the output completion flag is set as well as processing 3106.

Processing from processing 3120 is the processing that expansion is performed by read out the same line a plurality of times. Processing 3120 subtracts the number of copying written in the predetermined position of the line memory OUT. The number of copying is the number which is written in the predetermined address in the line memory CONVW#0 in processing 2105 in FIG. 21, and is passed to the line memory OUT after repeating the data exchange processing between the line memory. After subtracting, if the number of copying is not zero, sending processing of the same line is repeated. If the number of copying becomes zero, E bit of the address memory OUT is reset to send the data of one line to complete.

[Description of QM Encoding Operation]

Figure 32:
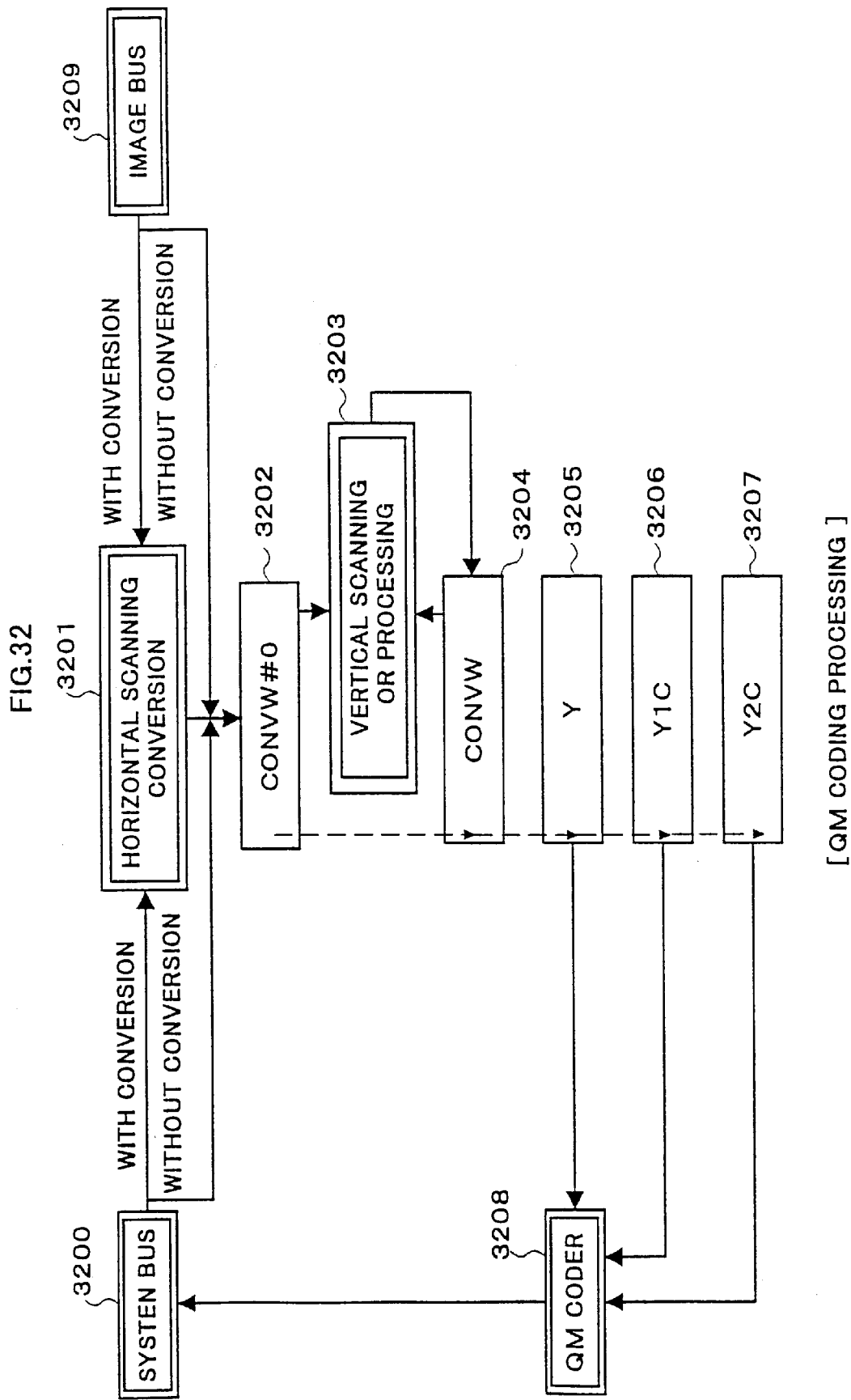
FIG. 32 is an illustration of a data movement between line memory of QM encoding processing.

FIG. 32 is an illustration of the data sift between the line memory in QM encoding processing. It is the same configuration as T.4 encoding processing expect QM encoding processing shown in FIG. 15. QM encoding device 3208 codes the image data of the processing line Y(3205) referring to the reference line Y1C (3206) and Y2C (3207). The reference line of two lines is used in case of three lines template, and only Y1C is used in case of two lines template.

Figure 33:
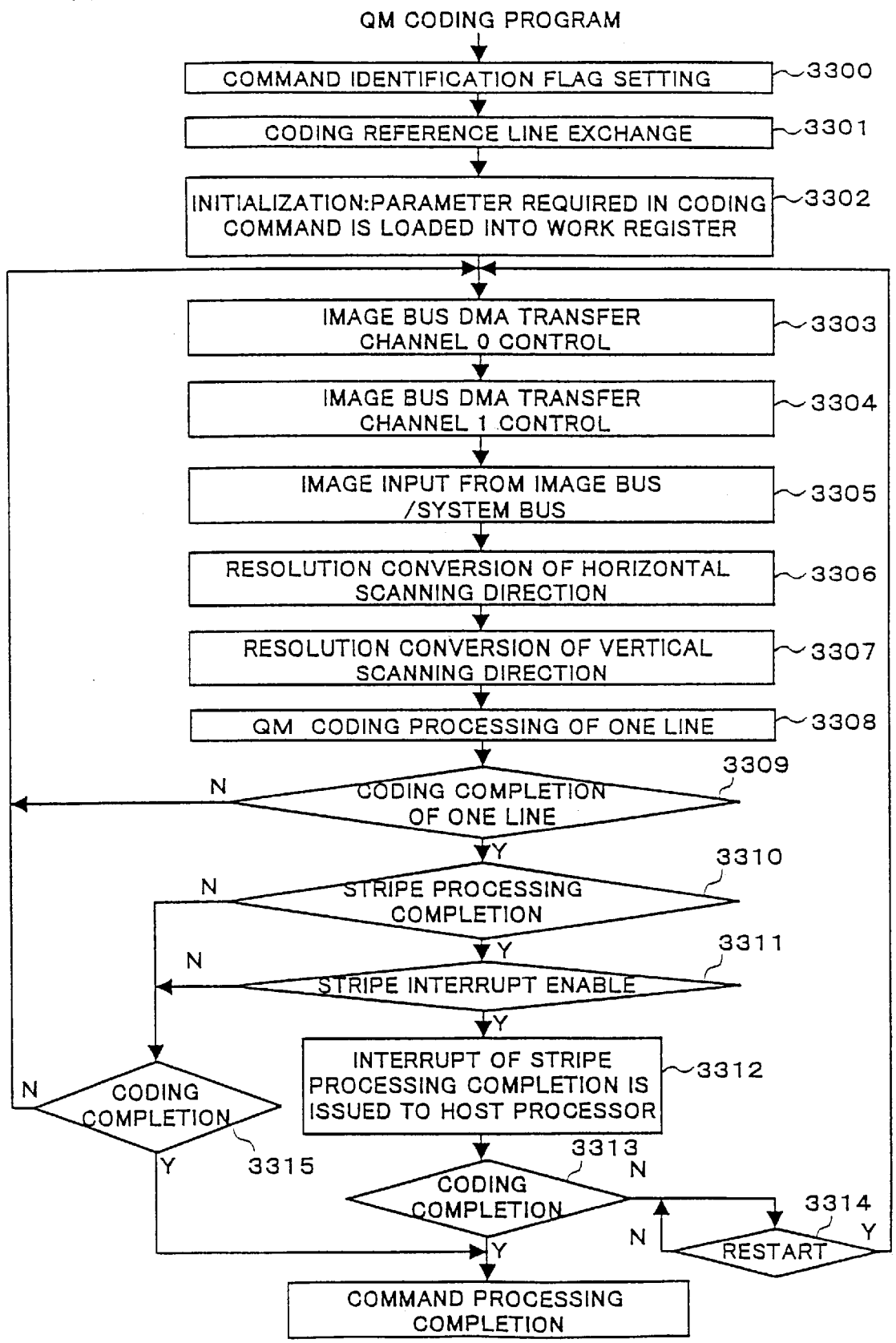
FIG. 33 is a flowchart of QM encoding processing.

FIG. 33 is a main flowchart of QM encoding processing. In the command code in FIG. 14, it corresponds to the code 0x1A. In processing 3300, various flag bits are set in the register. This register resides in the RAM 1140 in FIG. 1. Setting content is the flag showing encoding processing and the flag identifying QM encoding system. Processing 3301 and processing 3302 are the same as T.4 encoding processing 1601 and 1602 in FIG. 16. Since processing 3303 to processing 3307 are the same as the considerable section of FIG. 16, the description is omitted. Processing 3308 is QM encoding processing of one line.

If encoding of one line is not completed by judgment of processing 3309, processing 3303 to processing 3308 is repeated. After completion of QM encoding of one line, whether encoding of the number of line corresponding to stripe width is completed or not is checked in processing 3310. A stripe is a processing unit specified in QM encoding, and is the predetermined number of the line. If encoding of one stripe is not completed, whether encoding of the number of line of the encoding command is completed or not is judged in processing 3315, thereby the aforementioned processing being repeated or completed.

After stripe processing is completed in processing 3310, interrupt showing that encoding of one stripe is completed is issued to the MPU by judgment of processing 3311 and processing 3312. If encoding of the number of the command line is not completed after issuing interrupt, the movement to line processing of the subsequent stripe is performed, waiting restart from the MUP in processing 3314. Control is passed to the MPU there between, and, as required, control of stripe unit such as the movement of AT pixel can be performed. MPU is designed to be able to restart this image processor by turning on the bit defined in the register of the system bus control section 103. The conditions that control is returned to the MPU by the QM encoding command are the following two items:

1) completion of processing of the predetermined number of the command line,
2) completion of stripe.

Figure 34:
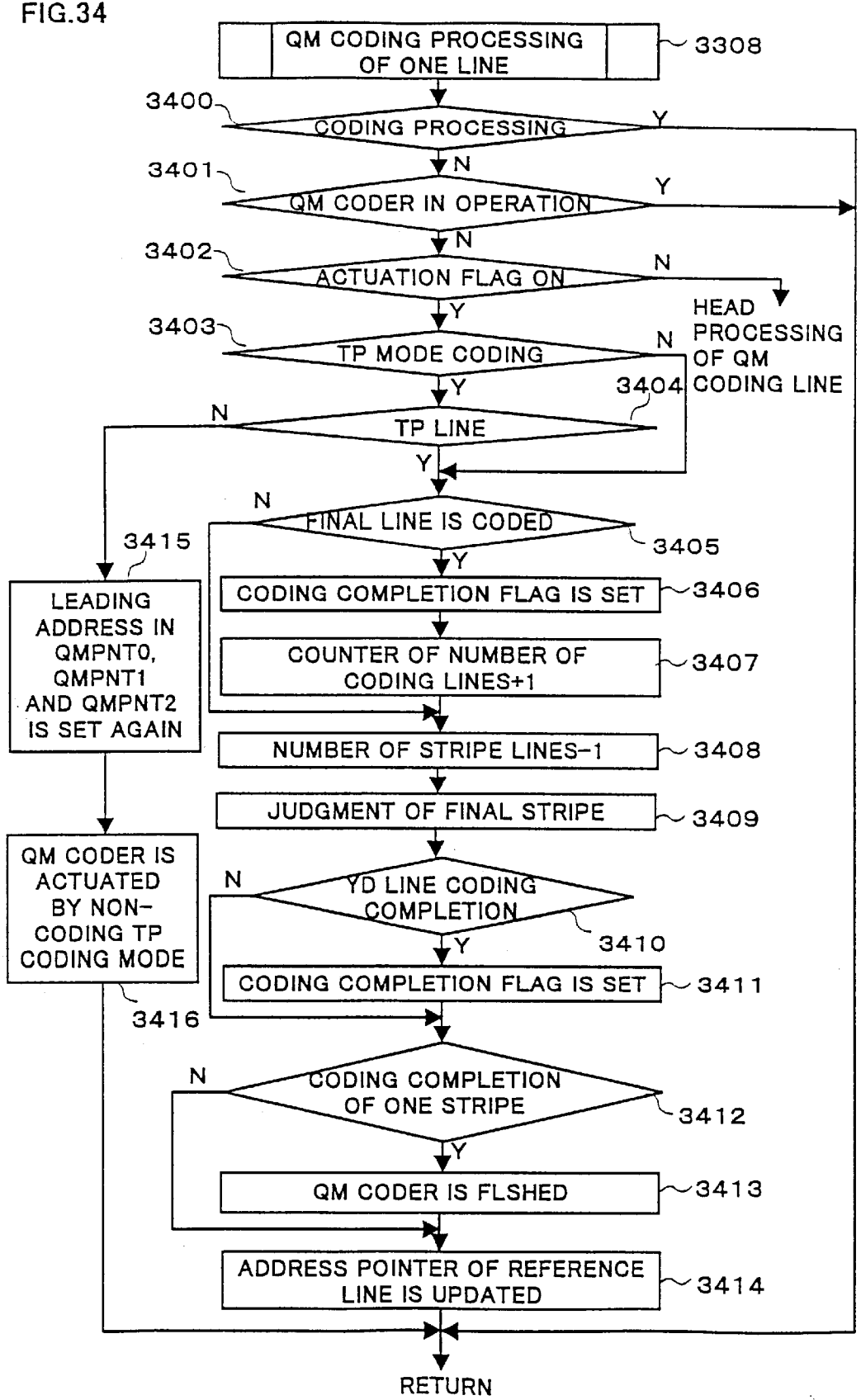
FIG. 34 is a flowchart of QM encoding processing of one line.
Figure 35:
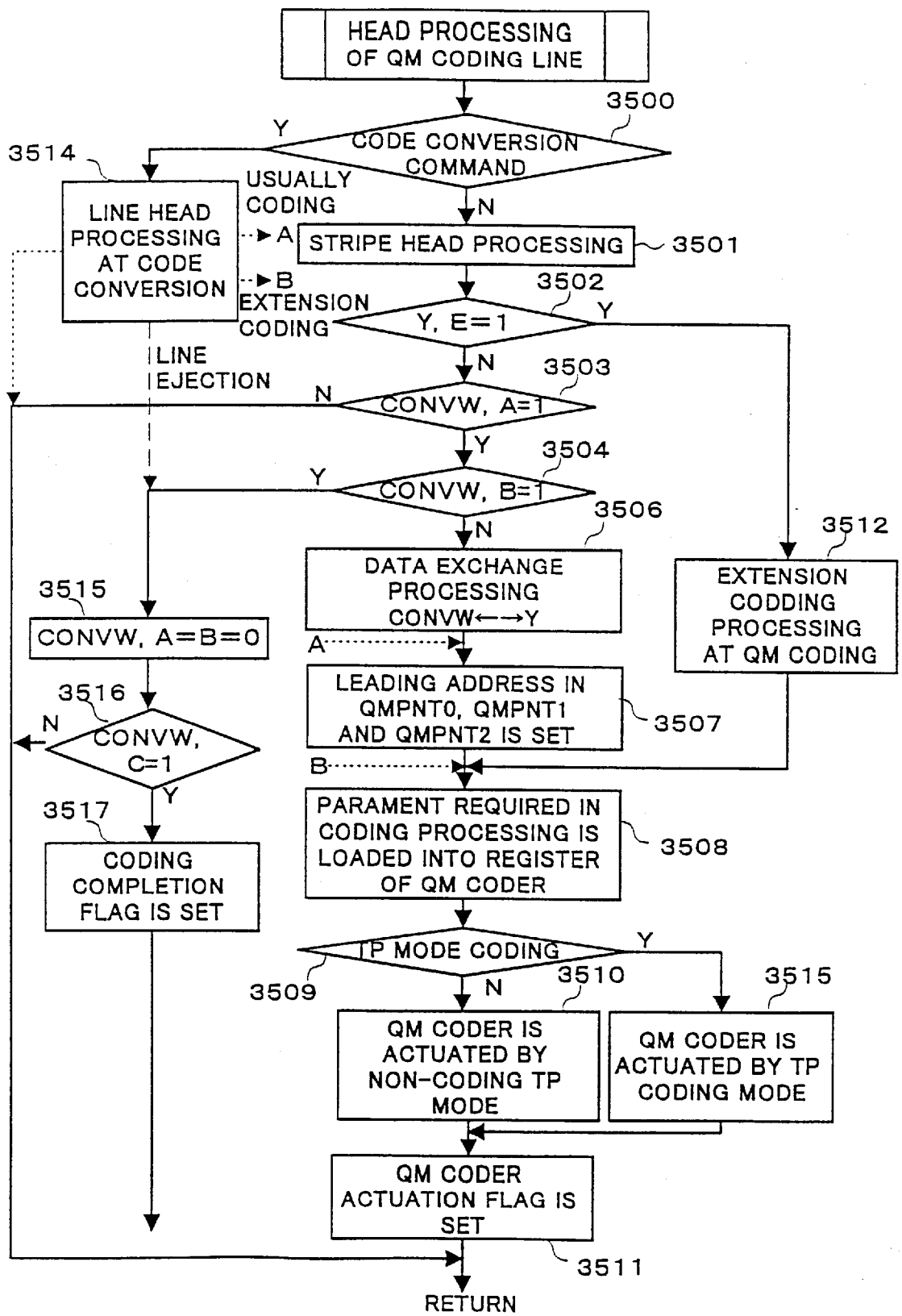
FIG. 35 is a flowchart of a line head processing of QM encoding.
Figure 36:
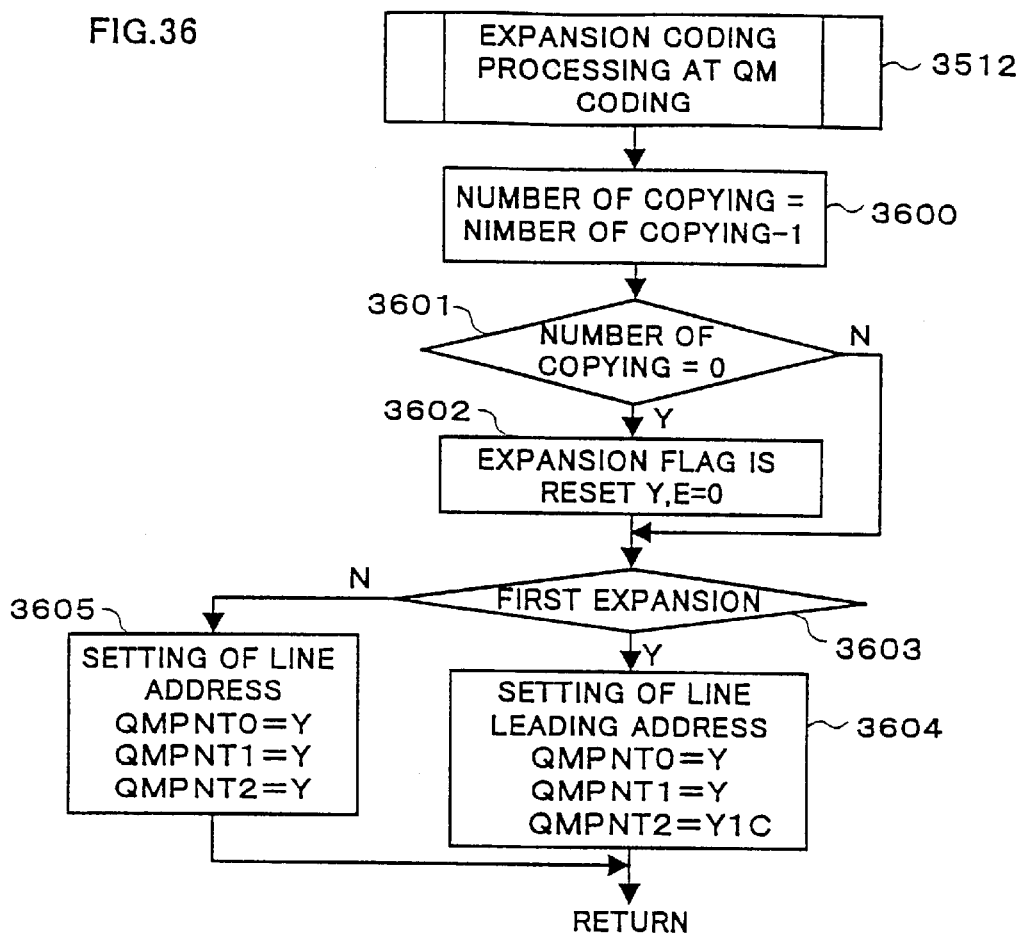
FIG. 36 is a flowchart of an encoding processing for expansion at QM encoding.

FIG. 34 to FIG. 36 are the main flows of one line QM encoding processing 3308. Processing 3400 judges whether encoding of the number of the command line is completed or not. A branch to the line head processing (FIG. 35) or the line end processing from processing 3403 is performed by judgment of processing 3401 and processing 3402.

Processing 3403 judges whether the QM encoder is actuated or not by the encoding mode designated as TP mode. A TP mode compares the encoding line and the immediate preceding reference line to code the flag showing the same, if being the same. It is the system that the encoded data of one line is designed to be added after encoding the flag showing the same, if not being the same. Comparison of the reference line and the encoding line is performed by the QM encoder 104.

As a result of the comparison, processing 3404 judges whether two lines are the same by the status signal from QM code decoding. A branch to processing 3405, if being the same (hereinafter referred to as TP line), or to processing 3415, if not being the same is performed. Processing from processing 3405 is common with the TP mode encoding, which is conventional encoding. Processing 3405 determine whether bit C of address register Y corresponding to the encoding line is "1" or not to judge whether encoding of the final line in the command is completion or not. When the final line is encoded, the flag showing completion of encoding is set in processing 3406. This flag is referred in processing 3400.

Processing 3407 and processing 3408 perform addition of the number of lines encoded and subtraction of the number of the stripe respectively. The number of the stripe lines shows the number of lines required to complete one stripe processing. Processing 3409 judges whether the stripe in processing is the final stripe of one page or not. In QM encoding, the number of lines of one page (hereinafter referred to as YD) is designed to be noticed to receiving terminals using the header information and the control code of encoding data (hereinafter referred to as NEWLEN marker code). Processing 3409 judges whether YD line counter (CO_LCONT) and the number of lines (CO_LOWORK) meet the following conditions or not.

$$CO\_LCONT \leq C\_YD \leq CO\_LCONT+CO\_LOWORK \quad \text{(Formula 1).}$$

The left side expresses the position processing at present and the right side expresses the position where encoding of the stripe being processed at present is completed. If C_YD meets this condition, the current stripe becomes the final stripe. If being the final stripe, the flag showing the situation is set. In ITU recommendation T.82, NEWLEN marker code is arranged to be inserted before the encoded data of the final stripe as required. Heretofore, such control code have been inserted by the MPU. However, in this image processing apparatus, judgment of the final stripe and insertion of the control code are arranged to be performed automatically due to the high speed processing.

Processing 3410 judges whether encoding of YD line is completed or not and sets the encoding completion flag in processing 3411, if being completed. Processing 3411 is the same as processing 3406. As understood from this, final judgment of completion QM encoding is performed in two processing of processing 3405 and processing 3410.

Processing 3412 judges whether encoding of the one stripe is completed or not. This processing checks whether the number of stripe line CO_LOWORK is zero or not. After encoding of one stripe is completed, the processing (flush) discharging the code inside QM encoder in processing 3413 is performed. Processing 3414 updates the address pointer of the reference line for encoding of the subsequent line, setting Y->Y1C, Y1C->Y2C->Y2C, Y2C->Y.

Figure 38:
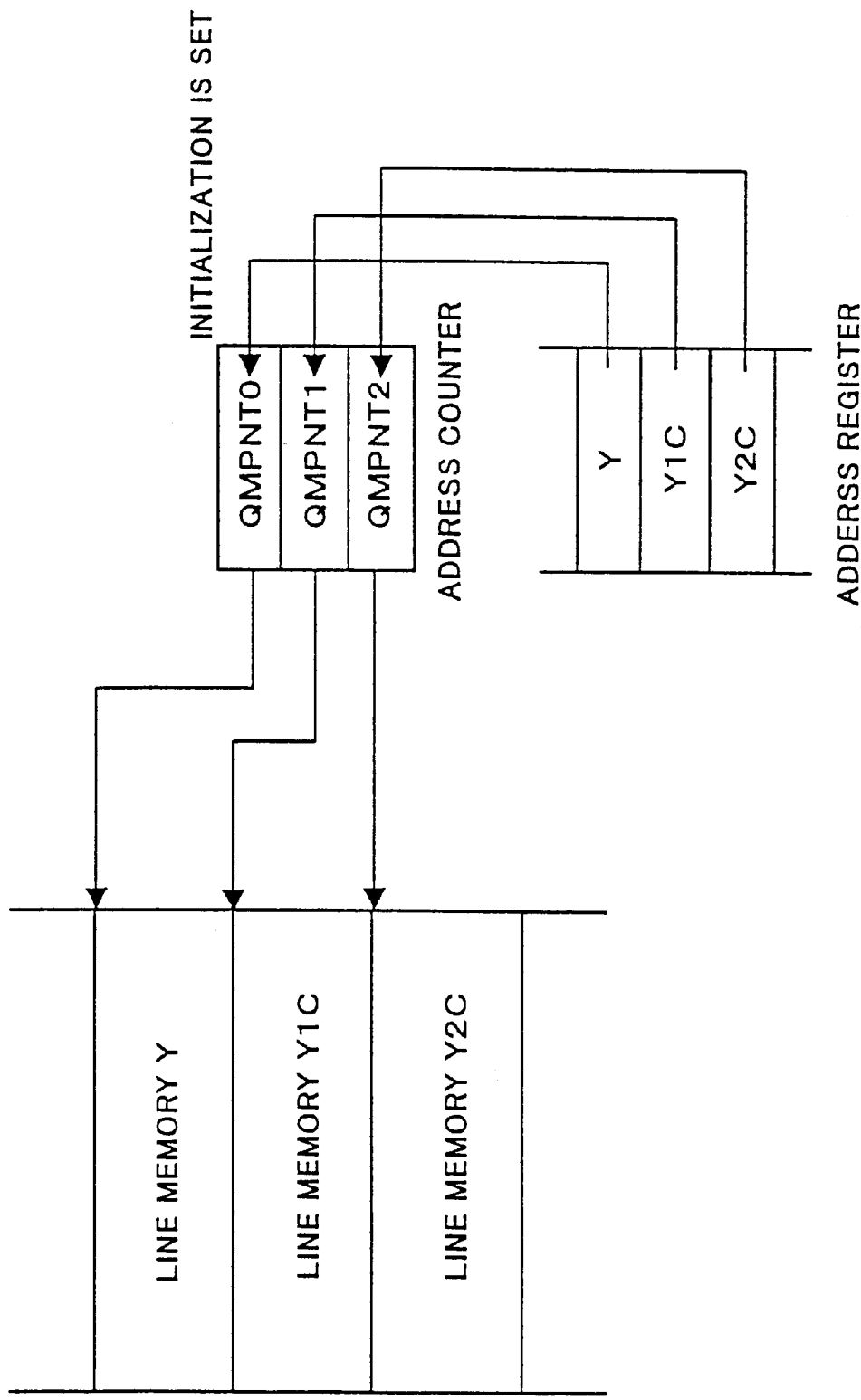
FIG. 38 is an illustration of an address counters and a line memory used in QM encoding.

Processing 3415 and processing 3416 set the leading address in the address counters of QMPNT0, QMPNT1 to actuate QM encoder by encoding of the conventional mode when being judged to be not TP line in TP mode encoding. The relationship between the line memory and the address counter is as shown in FIG. 38.

FIG. 35 shows the line head processing of QM encoding. Processing 3500 identifies whether being encoding during the code conversion command or the mere encoding command. Encoding including QM encoding is described below. Processing 3501 performs the stripe head processing such as sending of the control code to be added, initialization of the parameter and the flag used in stripe processing at the stripe head such as ATMOVE and NEWLEN and initialization of the reference line, as required. Processing 3502 judges if the flag showing expansion processing is set in the address register Y. As a result, if E=1, expansion encoding is performed in processing 3512.

Processing 3503 judges whether the significant data resides in the line memory CONVW or not. If A=0, encoding is not performed. Processing 3504 judges whether the data is reduction line or not, even though being CONVW, A=1. If B=1 showing reduction, the line is not encoded and the data is ejected in processing from processing 3515.

In processing 3506, since being CONVW, A=1 and B=0, data exchange of CONVW and Y is performed. From this point, the address register Y shows the encoding object line. If being expansion processing, that is to say, CONVW, E=1, it becomes CONVW,Y, E=1 by processing 3506. Processing 3502 checks this bit after completion of encoding of one line.

Processing 3507 sets each leading address of encoding line Y, the reference line Y1C and Y2C in the address counters of the internal bus DMA so as to be QMPNT0<-Y, QMPNT1<-Y1C, QMPNT2<-Y2C, as shown in FIG. 38. Processing 3508 transfers the parameter required in QM encoding (FIG. 11) in the parameter register 601 of QM encoding (FIG. 6). Processing 3509, processing 3510 and processing 3513 actuates the QM encoder as TP mode encoding or encoding of the conventional mode (non-TP encoding). In processing 3511, the flag showing that the QM encoder is actuated is set. This flag is referred in processing 3402 in FIG. 34.

Processing 3515 to processing 3517 the processing ejecting the data. Processing 3515 clears A and B bits of CONVW, and releases the line memory CONVW. In processing 3517, the final flag CONVW, C=1 are checked and the encoding completion flag is set in processing 3517 as well as Processing 3404 and processing 3406, if C=1. The above is the typically QM encoding processing.

Subsequently, expansion encoding processing 3512 and 3514 are described. A expansion encoding is processing generating the encoded data by which the image of the designated magnification is designed to be obtained, when the encoded data is reconstituted. The extended encoding data is obtained readily by preparing once the extended image on memory and encoding the extended image. However, since large memory capacity is required and high speed processing is suppressed by constituting the extended image on memory, in this embodiment, as already described in FIG. 20, expansion encoding is carried out by generating the extended image by the resolution converting device for expansion of the horizontal scanning direction and operating the address pointer of the encoding line and the reference line for the vertical scanning direction.

FIG. 36 shows expansion encoding processing 3512 at QM encoding. Processing 3600 subtracts the number of copying written in the predetermined position of the line memory Y. If the number of copying becomes zero in processing 3601 and 3602, the expansion flag E is reset. In processing 3603, whether being the first time of expansion encoding or not is judged. The address pointer is set so that the processing line and the reference line preceding by one line is pointed to be the same at first time, and all the same lines are pointed after the second time. FIG. 39 is a view showing the situation of the address pointer at this expansion. This drawing is shown such that the case that line C is expanded to line C1 and line C2 after the line C is expanded and is decoded can be correspond to each line processing in encoding and decoding. In encoding side, the encoding line and the reference line should be selected so that the address pointer can point the same line at decoding.

Figure 37:
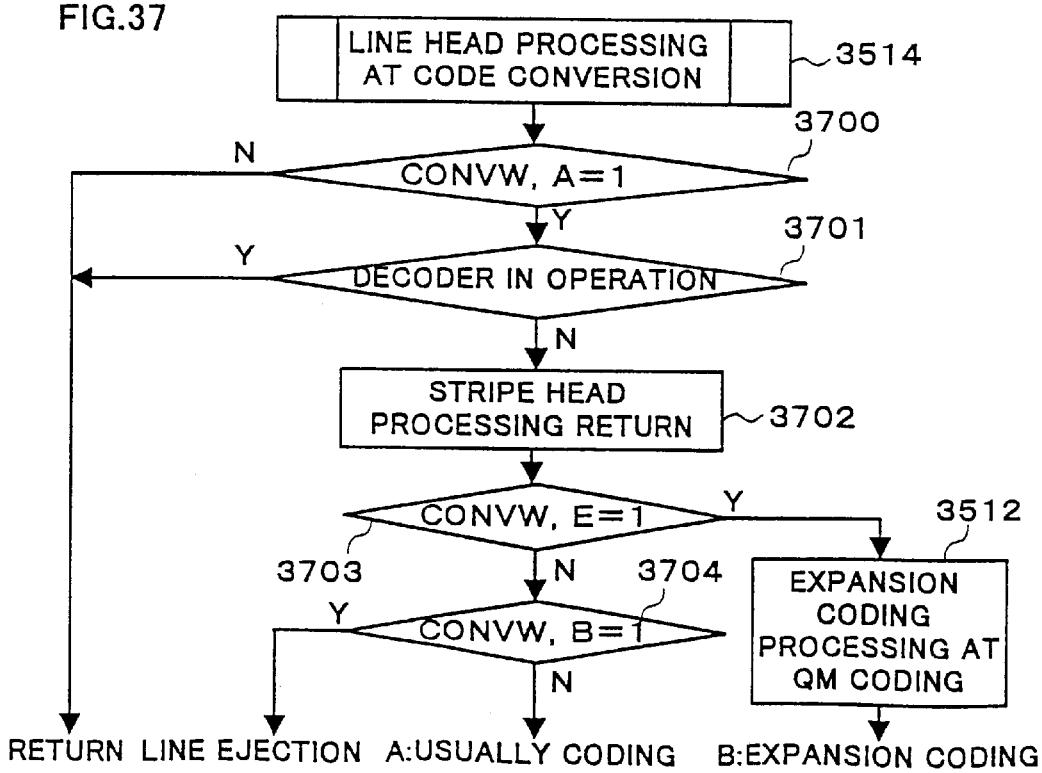
FIG. 37 is a flowchart of a line head processing of code conversion including QM encoding

FIG. 37 shows expansion encoding processing at code conversion. This is connected to FIG. 35 by the arrow of the dotted lines. In this embodiment, code conversion is controlled so that the encoder and the decoder are not actuated simultaneously (processing 3701). It is a combination of the processing described previously expect processing 3701.

[Description of QM Decoding Operation]

Figure 40:
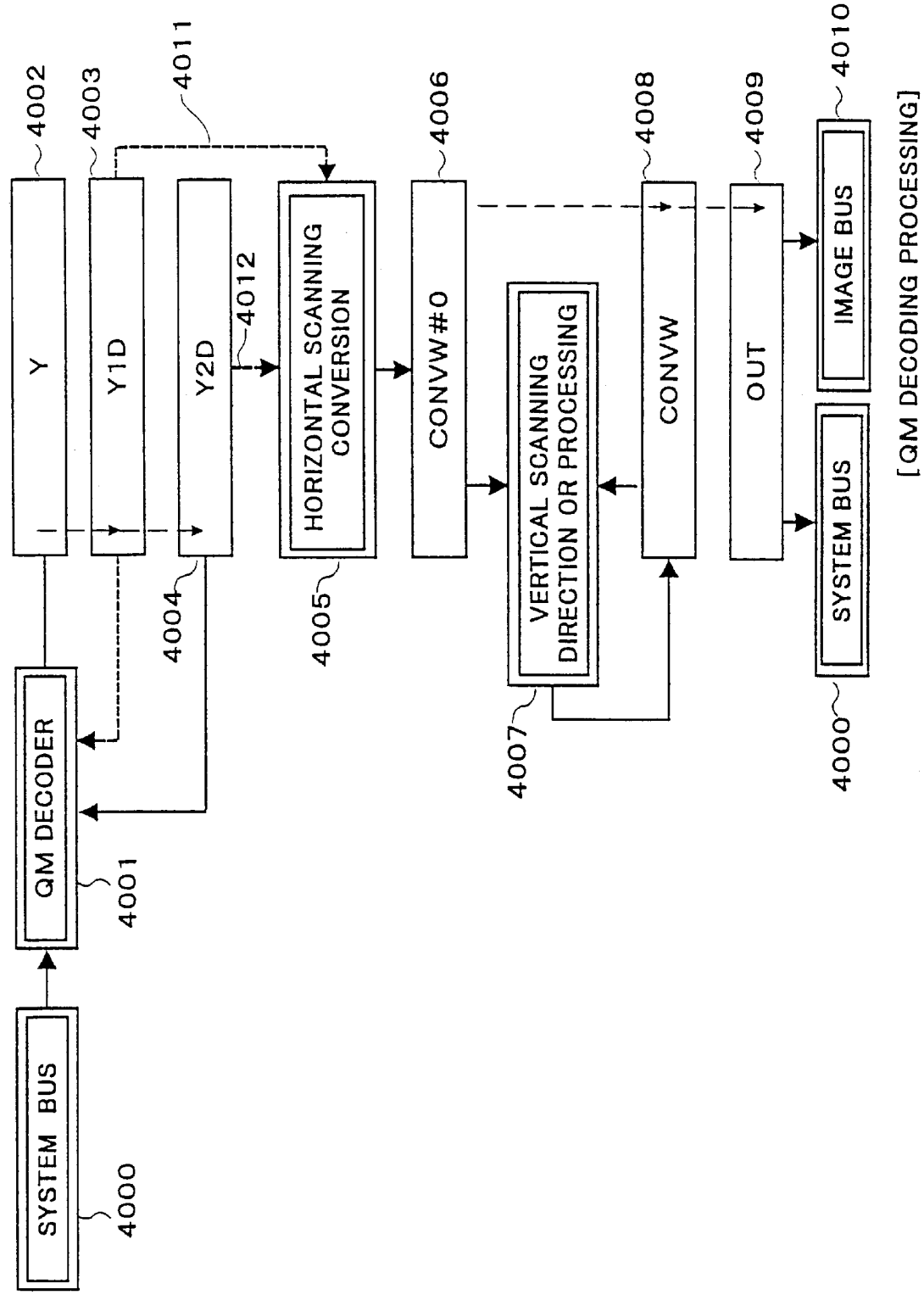
FIG. 40 is an illustration of a data movement between line memory of QM decoding processing.

FIG. 40 is an illustration of the data sift between the line memory in QM decoding processing. The code data to be decoded is red from a system bus 4000. QM decoder 4001 writes the reconstituted image in Y line memory 4002, referring to the reference line D1R/Y2D (4003/4004). The horizontal scanning conversion (4005) from line memory Y1D/Y2D to line memory CONVW#0 (4006) is performed in parallel with this decoding operation. The data of Y2D is entered the horizontal scanning converter in case of three lines template (4012), and the data of Y1D is entered to the horizontal scanning converter (4005) in case of two lines template (4011). The processing after the point where the converted data is written in CONVW#0 is the same as T.4 decoding processing described in FIG. 28.

Figure 41:
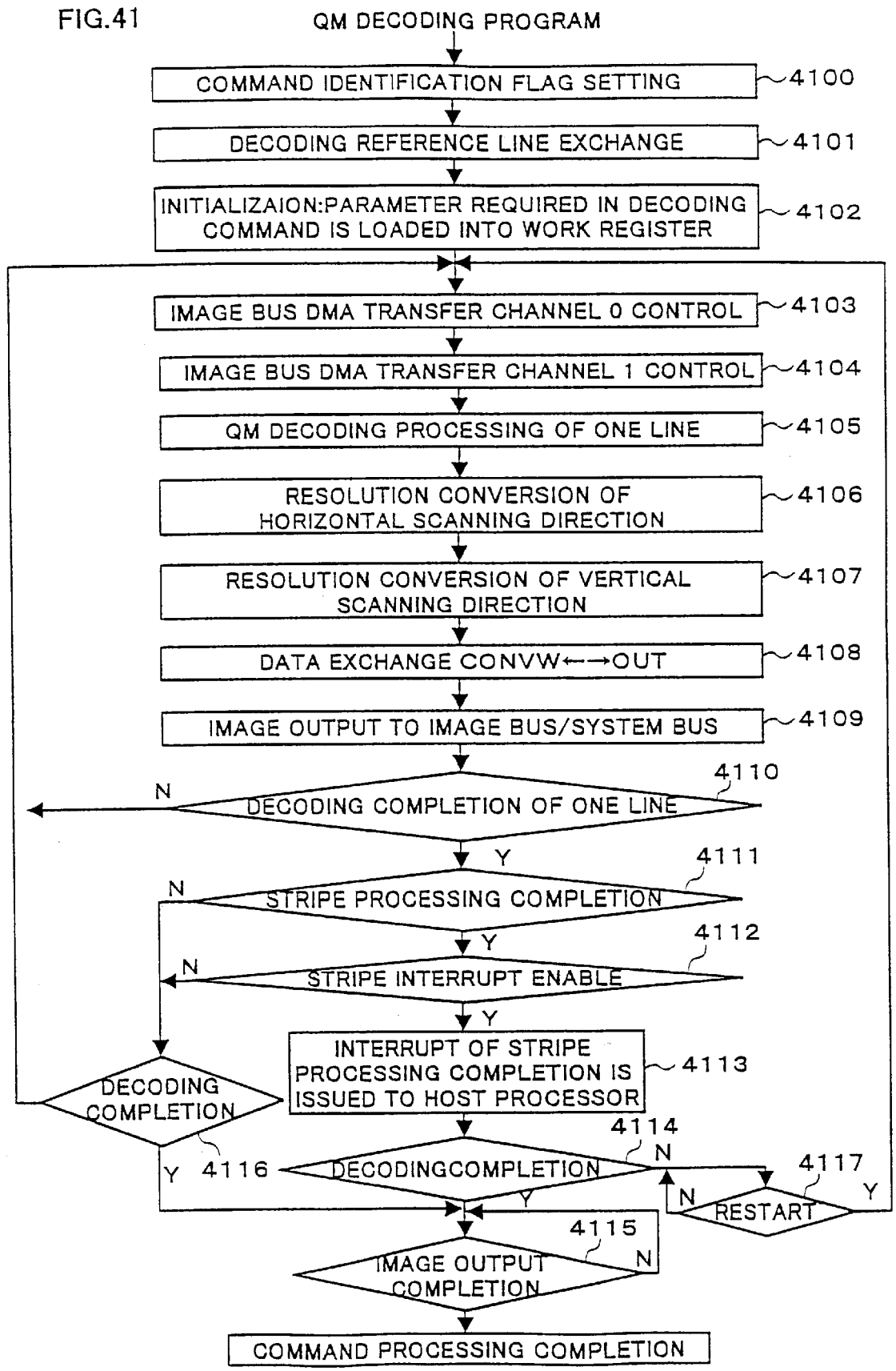
FIG. 41 is a flowchart of QM decoding processing.

FIG. 41 is a main flowchart of QM decoding processing. In the command code in FIG. 14, it corresponds to the code 0x1B. In processing 4100, various flag bits are set in the register. This register resides in the RAM 1140 in FIG. 1. Setting content is the flag showing decoding processing and the flag identifying QM decoding system. Processing 4103 and processing 4104 are the same as QM decoding processing 2903 and 2904 in FIG. 29. Processing 4105 is QM decoding processing of one line. Processing 4106 to processing 4109 are the same as processing 2906 to processing 2909 of FIG. 29 respectively.

If decoding of one line is not completed by judgment of processing 4110, processing 4103 to processing 4109 is repeated. After completion of QM decoding of one line, whether decoding of the number of line corresponding to stripe width is completed or not is checked in processing 4111. If decoding of one stripe is not completed, whether encoding of the number of line of the decoding command is completed or not is judged in processing 4116, thereby the aforementioned processing being repeated or completed.

After stripe processing is completed in processing 4111, interrupt showing that decoding of one stripe is completed is issued to the MPU by judgment of processing 4112 and processing 4113. If decoding of the number of the command line is not completed after issuing interrupt, the sift to line processing of the subsequent stripe is performed, waiting restart from the MUP in processing 4117.

As the same as QM encoding processing, the MPU can restart this image processing apparatus by turning on the bit defined in the register of the system bus control section 103. The conditions that control is returned to the MPU by the QM decoding command are the following:

1) completion of processing of the predetermined number of the command line,
2) completion of stripe.

Figure 42A:
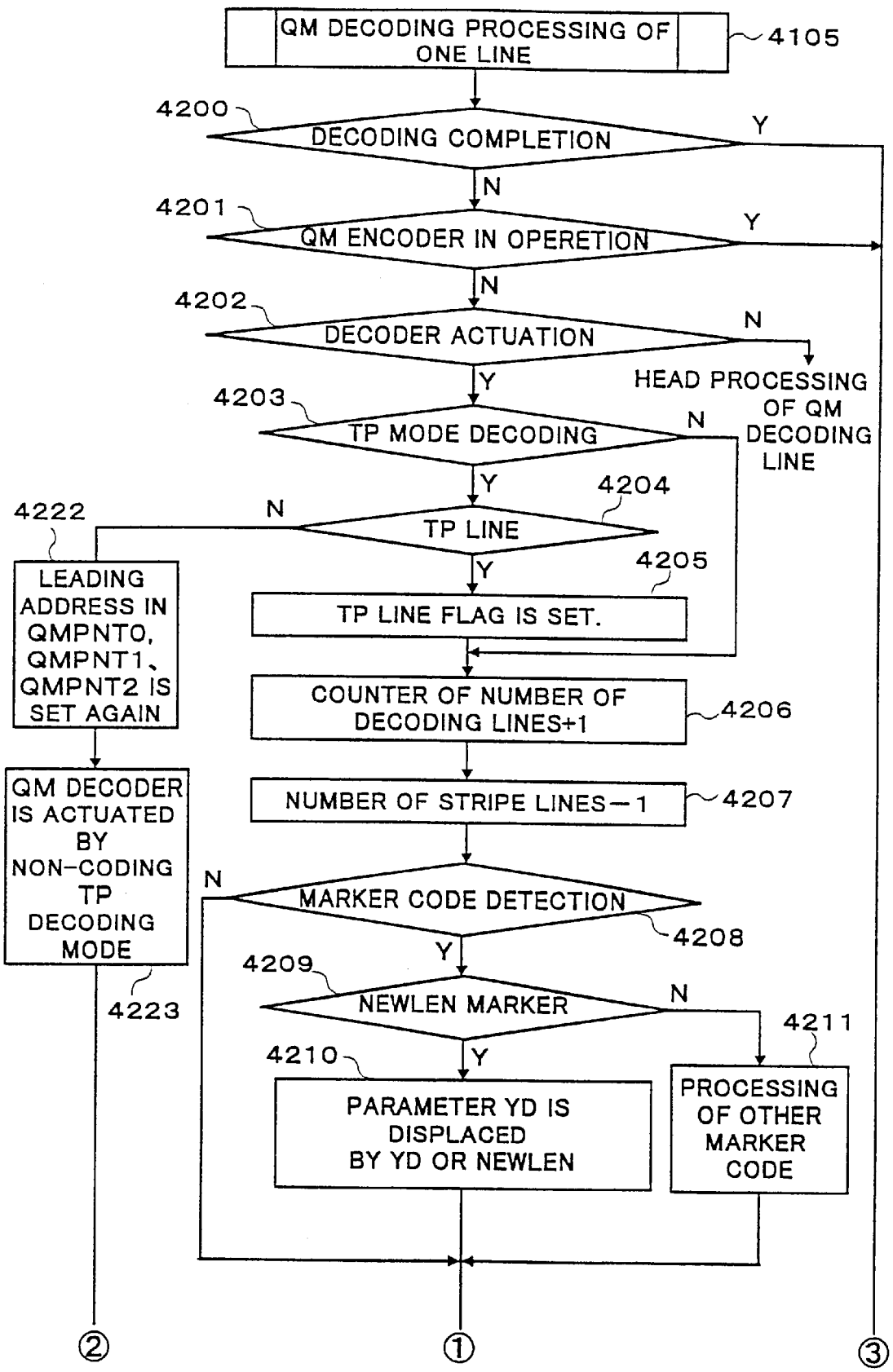
FIGS. 42A and 42B are flowcharts of QM decoding processing of one line.
Figure 42B:
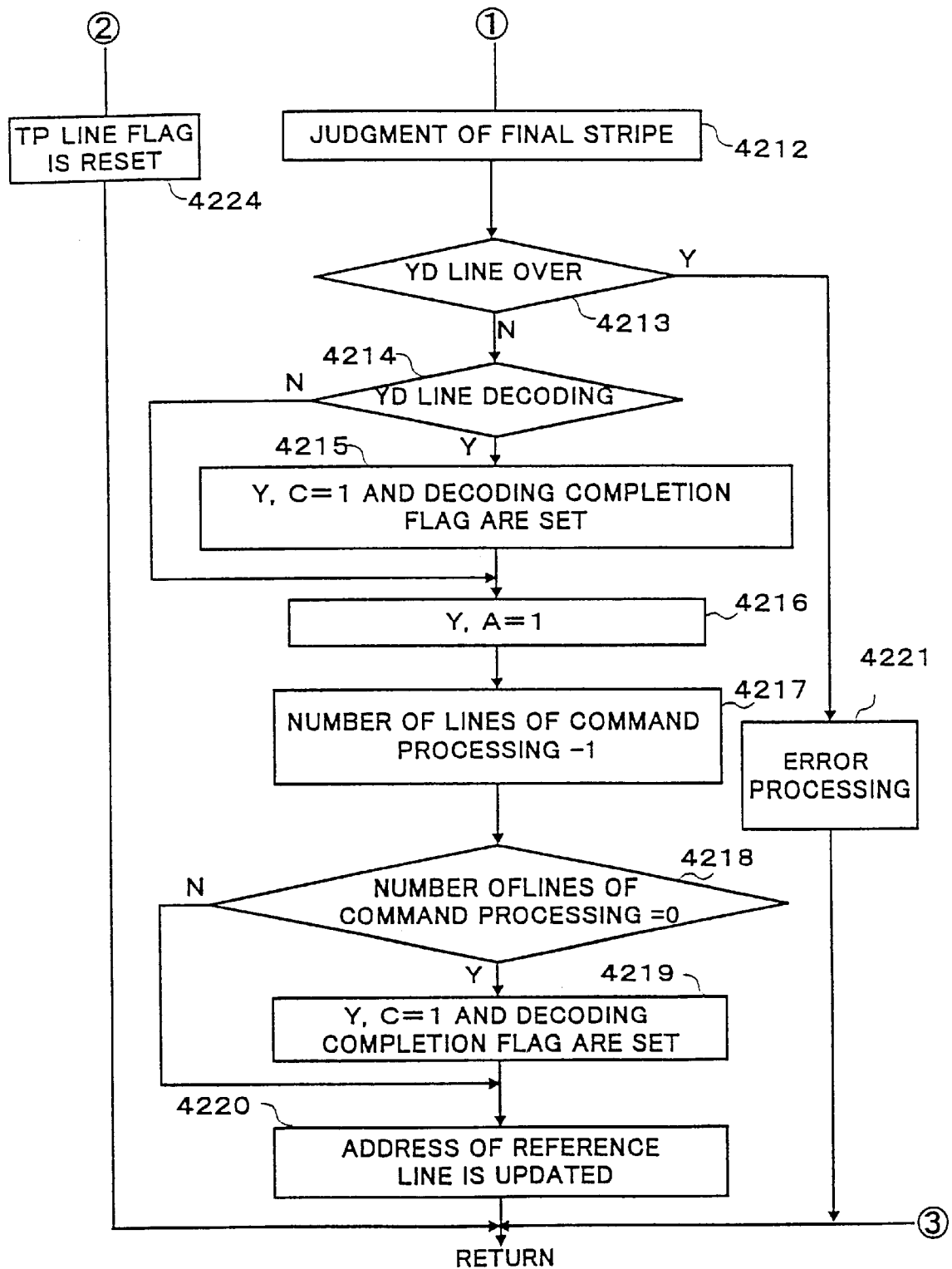
Figure 43:
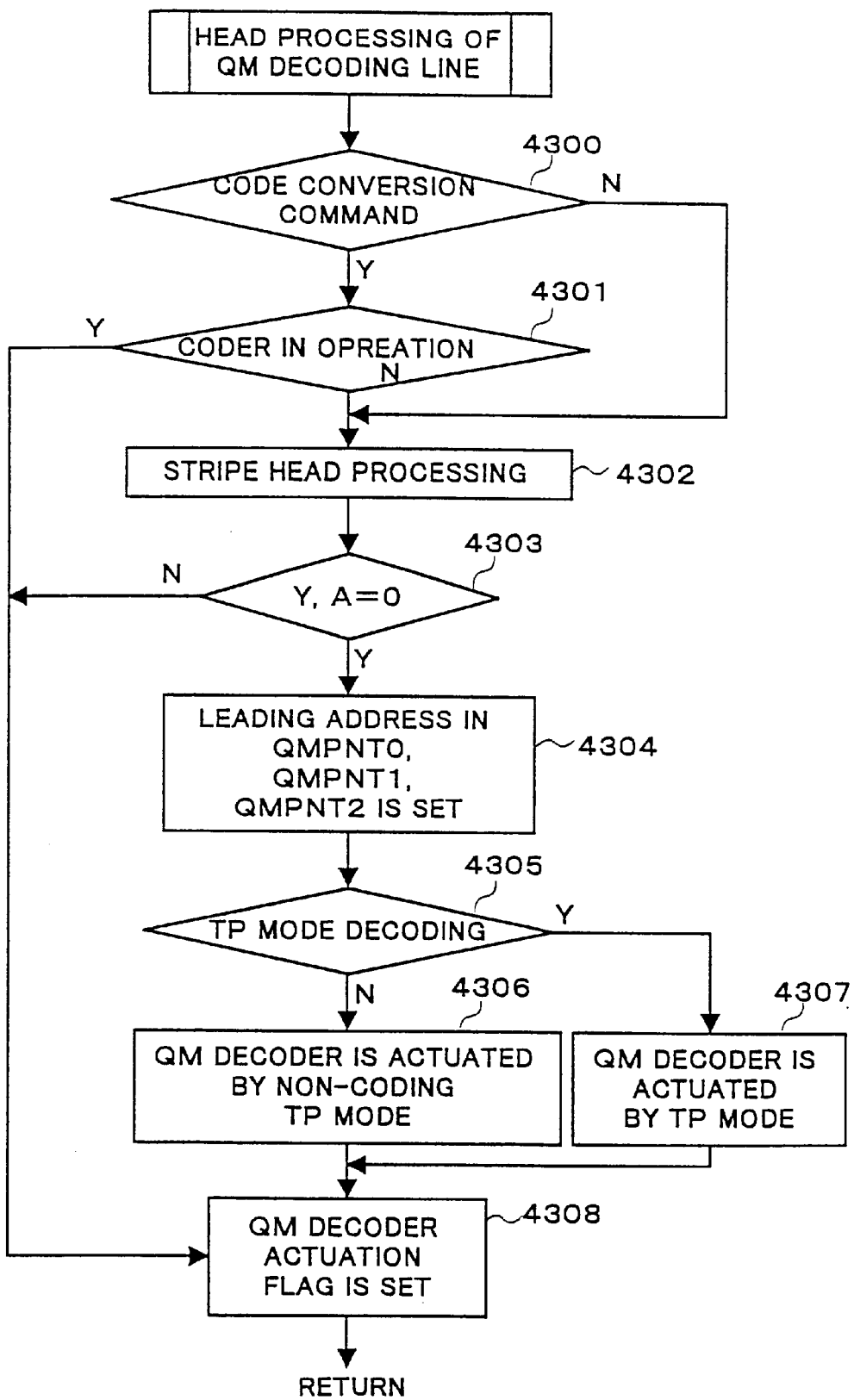
FIG. 43 is a flowchart of a line head processing of QM decoding.

FIGS. 42A, 42B and FIG. 43 are the main flowcharts of one line QM decoding processing 4105. Processing 4200 judges whether decoding of the number of the command line is completed or not. Abranchto the line head processing (FIG. 43) or the line end processing from processing 4203 is performed by judgment of processing 4201 and processing 4202. Processing 4203 judges whether the QM decoder is actuated or not by TP mode. In decoding of TP mode, the flag showing whether the decoding line is the same as the immediate preceding line is decoded. As a result, the flag shows that the decoding line is the same as the immediate preceding line (hereinafter referred to as TP line), decoding processing is completed by swapping the decoding line for the reference line. If being not the same, the encoded data following the flag should be decoded.

If it is known that the decoding object line is TP line by judgment of processing 4204, the flag showing the TP line is set in processing 4205. This the flag is used at updating of the reference line. Processing from processing 4206 is common with the TP mode decoding, which is conventional decoding.

Processing 4206 and processing 4207 perform addition of the number of lines decoded and subtraction of the number of the stripe respectively. As the same as the encoding, the number of the stripe lines shows the number of lines required to complete one stripe processing. Processing 4208 judges whether a marker code being a control code is detected or not. The marker code is the configuration of "0xFF* *+parameter", and is detected by QM decoder (block 610 in FIG. 6). The typical marker code are ATMOVE marker designating the position of AT pixel and NEWLEN marker noticing the number of lines of one page. The NEWLEN marker is sent, when there are changes in the reconstituted number YD of lines of one page designated in the header information sent prior to the encoded data of one page. In the parameter of NEWLEN marker, the defined YD is written.

In processing 4208, the marker code is detected, and if the code is NEWLEN marker, the number D_YD of lines of one page in the parameter register is rewritten in processing 4210. In the initialization value of D_YD, the value obtained by analyzing of the aforementioned header information is written.

If not being NEWLEN marker, the processing adapted to the marker code is performed in processing 4211.

Processing 4212 judges whether the stripe in processing is the final stripe of one page or not as in the case of encoding. Processing 4212 judges whether D YD line counter (DO_LCONT) and the number of the stripe lines (DO_LOWORK) meet the following conditions or not.

$$DO\_LCONT \leq D\_YD \leq DO\_LCONT + DO\_LOWORK \quad \text{(Formula 2)}.$$

The left side expresses the position processing at present in page and the right side expresses the position where decoding of the stripe being processed at present is completed. If D_YD meets this condition, the current stripe becomes the final stripe. If being the final stripe, the flag showing the situation is set.

Processing 4213 judges whether $$DO\_LCONT > D\_YD \quad \text{(Formula 3)}$$

is obtained according to the result of comparison with processing 4212. In this condition, QM decoder has decoded the number of lines of one page or more already. This condition is designated as YD line over.

Arithmetic coding can reconstitute any number of symbols from the given data on the basis of the configuration principle, when the number of the reconstituted symbol is unknown. YD line over is caused by the case that detection of NEWLEN is delayed from decoding processing by any reason, for example, input retardation of NEWLEN marker code from the system bus or the like. Especially, this is ready to be caused in case that the QM decoder is designed to operate at high speed and in addition, in case of this embodiment that detection of the marker code and decoding processing are performed simultaneously.

At YD line over, differences between D_YD and DO_LCONT is set in the predetermined register so that the MPU can understand and the error code showing YD line over is set similarly as error processing in processing 4221, and then, decoding the command processing is completed.

Processing 4214 judges whether $$DO\_LCONT = D\_YD \quad \text{(Formula 4)}$$

is obtained according to the result of comparison with processing 4212. When meeting this condition, C bit of the address register Y is set in processing 4215, which shows that this the line data is the final data. Moreover, the final flag of decoding processing is set. This flag is referred in processing 4200.

Processing 4216 sets A=1 in the address register Y corresponding to the line memory, since the reconstituted image of one line in the line memory Y is constituted and indicate the setting for the subsequent processing. Subtraction of the number of lines of command processing is performed by processing 4217. As a result, if being zero by judgment of processing 4218, the same processing as processing 4215 is performed in processing 4219.

As is understood from the above description, the completion conditions of QM decoding command processing are the following three items:
1) reconfiguration of YD line,
2) YD line over,
3) reconfiguration of the predetermined number of the command line.

Processing 3414 updates the address pointer of the reference line for decoding of the subsequent line by setting Y->Y1D, Y1D->Y2D, Y2D->Y, if being not TP mode.

Processing 4222 to processing 4224 set the leading address in three the address counters of QMPNT0 QMPNT1, QMPNT2 when being judged not to be TP mode in TP mode decoding, and actuate QM decoder by decoding of the conventional mode.

FIG. 43 shows the line head processing of QM decoding. In processing 4300 and processing 4301, operation of the encoder is checked, if being the code conversion command, or entering to stripe head processing of processing 4300 is performed, if being not the conversion command. In processing 4302, the number of stripe line is checked, the stripe head processing is carried out, since being the head of the stripe if being zero, In processing 4303, whether the decoding line memory is unassigned is checked. If being A=1, since the data in the line memory Y is not processed the decoder is actuated. If being A=0, the address pointer is set in processing 4303 and the decoder is actuated by setting whether reconstituting by TP mode or not. In processing 4303, the flag showing being actuated is set. This flag is checked in processing 4202 in FIG. 40.

Combining T.4 coding-decoding, QM coding/decoding and resolution conversion described above, various code conversions processing between T.4 code and QM code can be realized readily. Subsequently, these are described in order. Description of Code Conversion from T.4 Code to T.4 Code.

FIGS. 44A and 44B are illustrations of the code conversion processing from the T.4 code to the T.4 code. These are conversion between MH, MR and MMR codes and correspond to processing of the command code 0x0E to 0x16 in the command list in FIG. 14.

Figure 44:
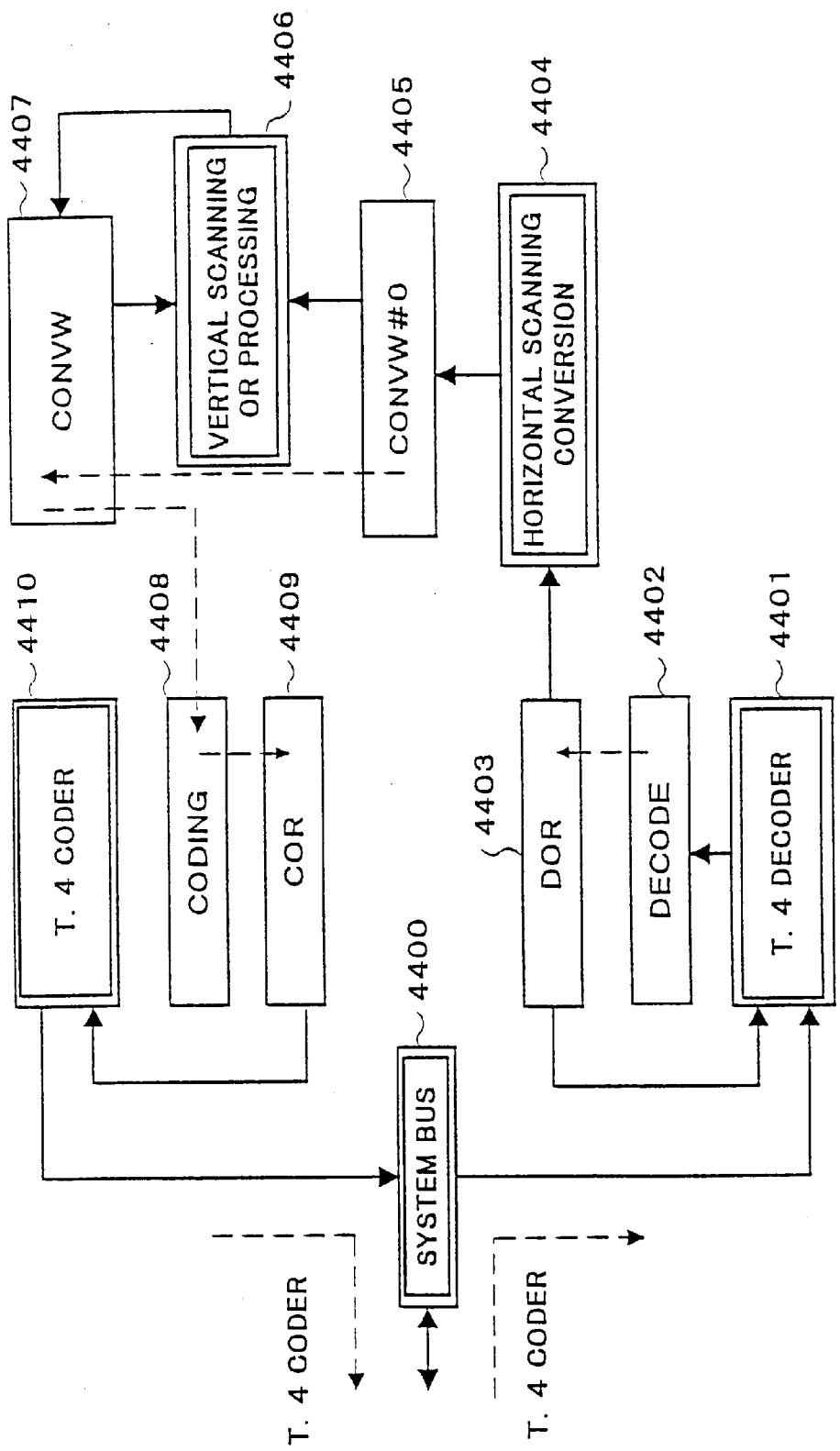
FIG. 44 is an illustration of a data movement of code conversion between MH, MR and MMR code.

The encoded data is entered from the system bus 4400 as in the case of decoding encoding. As already described, decoded data of T.4 code is reconstituted in line memory DECODE by T.4 encoder 4401. When reconfiguration of one line is completed, the data of line memory DECODE is passed to the reference line DOR or DIR. FIG. 44 describes the case of the channel 0 (DOR). In contrast with this, the area of the reference line is passed to line memory DECODE. Conversion processing is performed from D0R to CONVW#0 (4405) through the horizontal scanning converter 4404 in parallel with reconstituting of the second line.

The line data converted by horizontal scanning conversion are processed by the OR thinned-out operation and simple the thinned-out processing, and the data processed by conversion processing is passed to the line memory CONVW. The passed data is passed to the line memory ENCODING to be encoded by T.4 encoder 4410 and to be sent to the exterior from the system bus 4400.

[Description of Code Conversion from T.4 Code to QM code]

FIG. 45 is an illustration of the code conversion processing from the T.4 code to the QM code. These correspond to processing of the command code 0x1F to 0x21 in the command list in FIG. 14. Although the configuration is substantially similar to FIG. 44, the data of CONVW is entered into QM encoder 4510. When QM encoding of one line is completed, the data of CONVW is passed to the reference line Y1C.

Figure 46A:
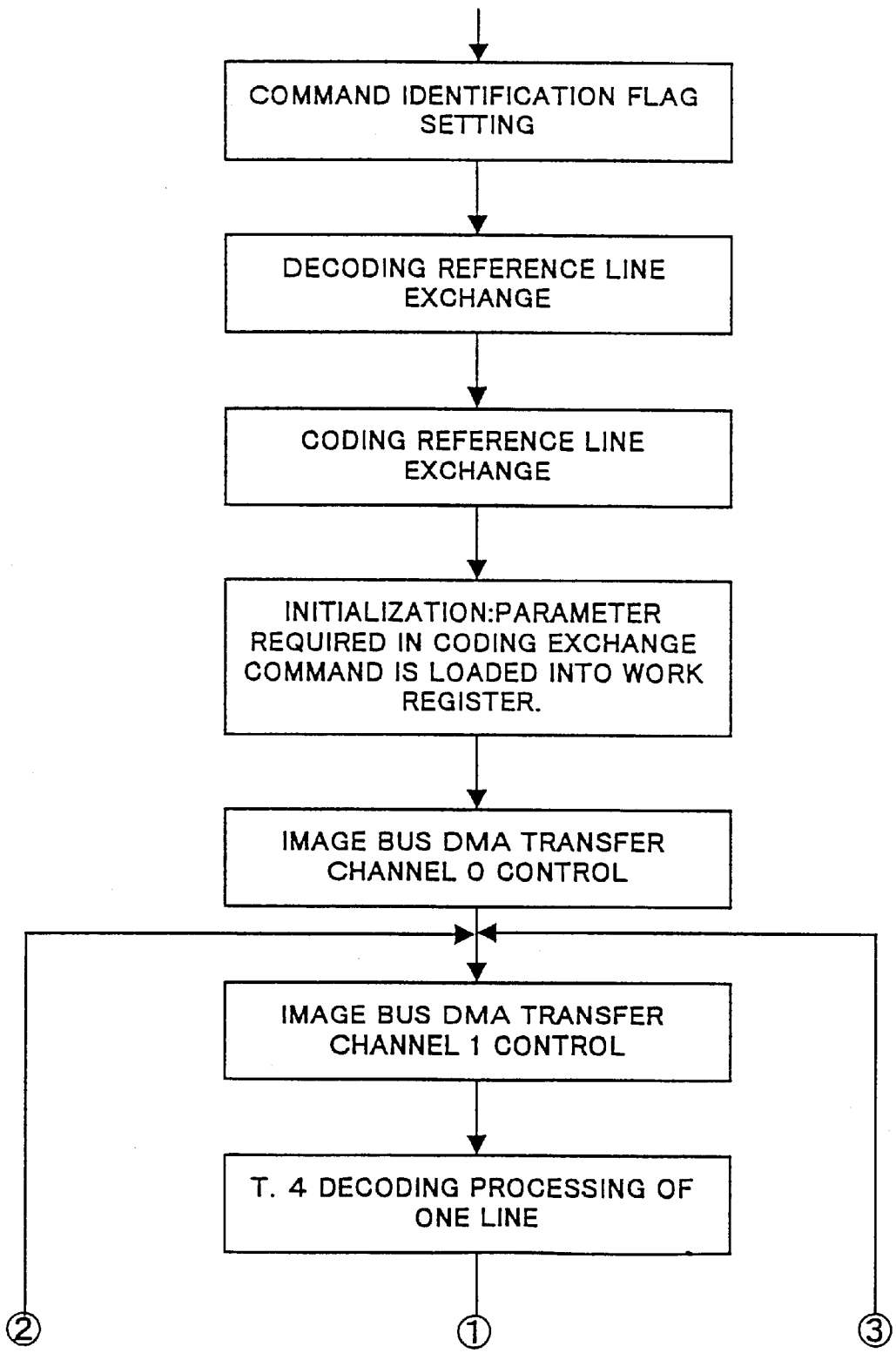
FIGS. 46A and 46B are illustrations of code conversion from MH, MR and MMR code to QM code.
Figure 46B:
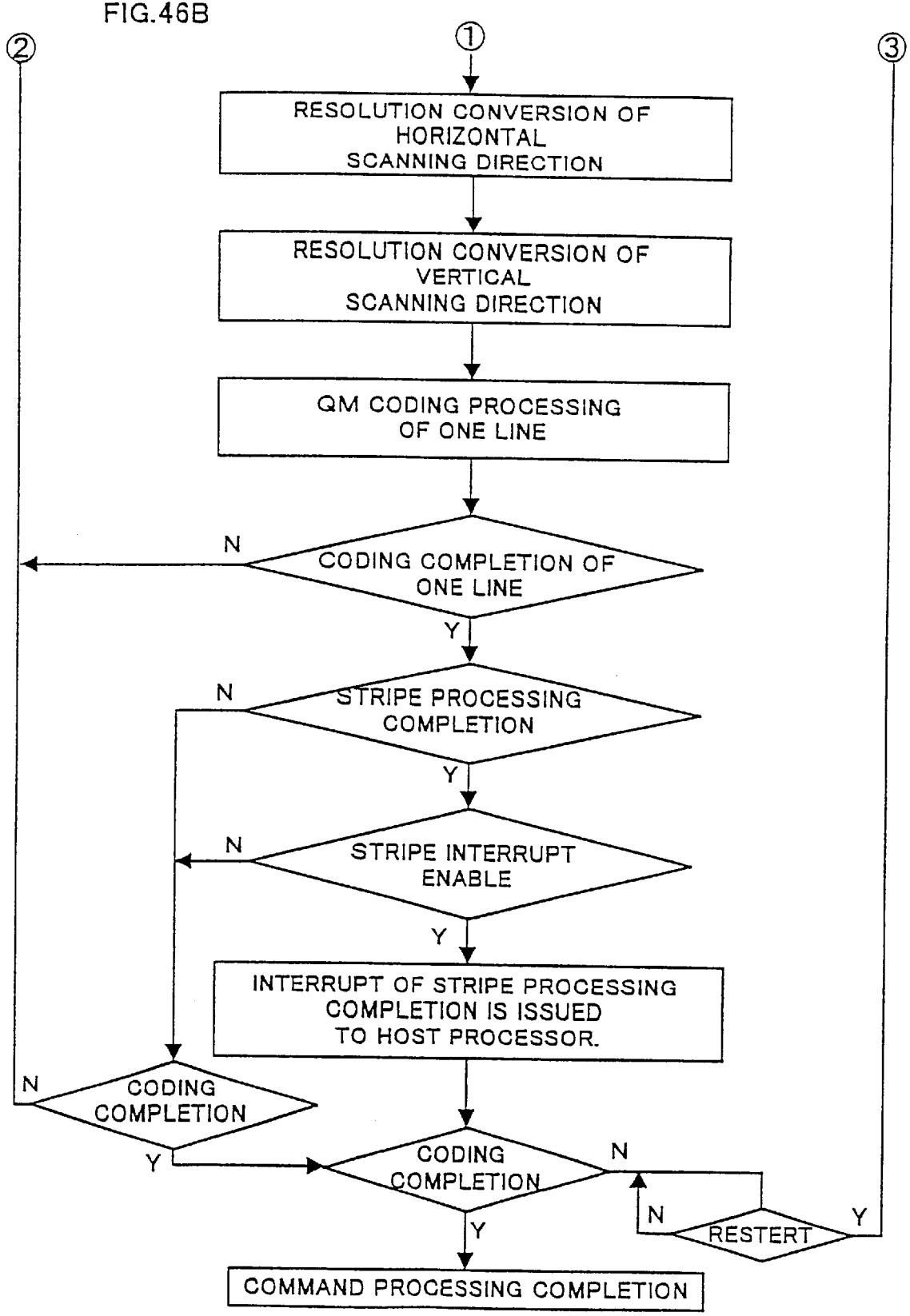

FIG. 46 is a processing flowchart. The entire configuration is similar to QM encoding processing in FIG. 33, and each component of the flow is the same as the components described above already.

[Description of Code Conversion from QM code to T.4 Code]

Figure 48A:
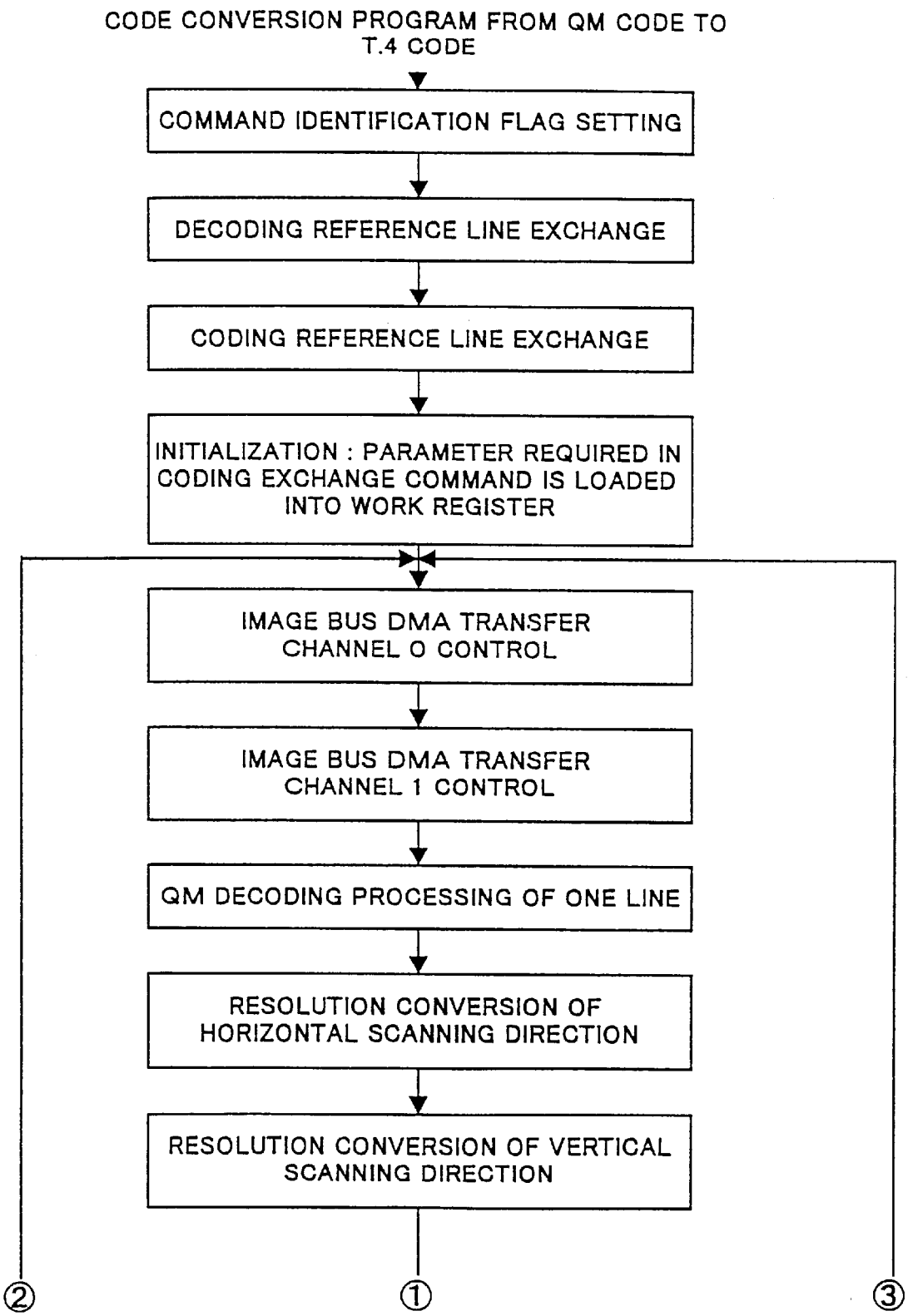
FIGS. 48A and 48B are illustrations of code conversion from QM code to MH, MR and MMR code.
Figure 48B:
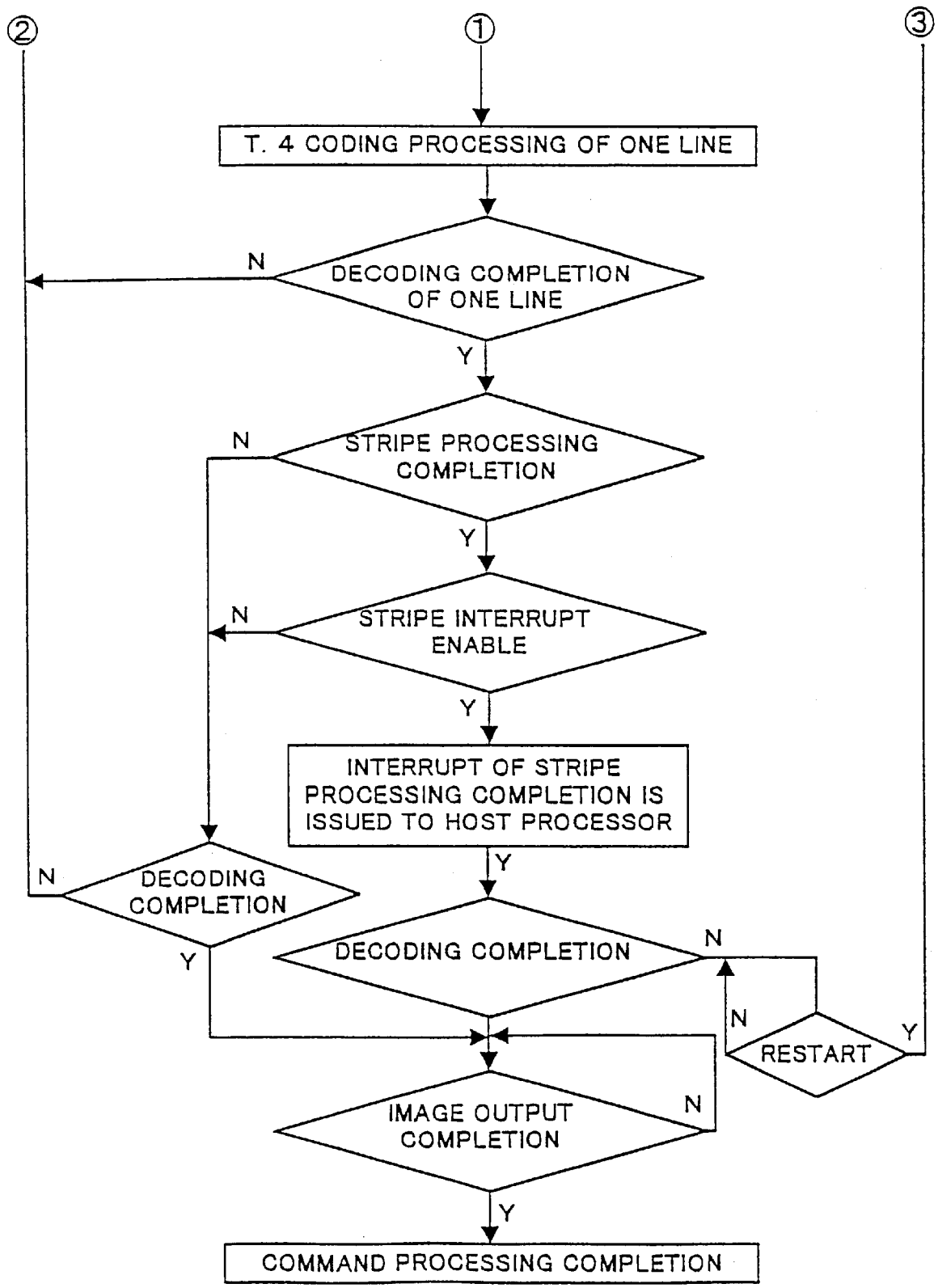

FIG. 47 is an illustration of the code conversion processing from the QM code to the T.4 code. These correspond to processing of the command code 0x1C to 0x1E in the command list in FIG. 14. FIG. 48 is a processing flowchart. The entire configuration is similar to QM decoding processing shown in FIG. 41, and each component of the flowchart is the content described above already.

[Description of Code Conversion from QM code to QM code]

Figure 49:
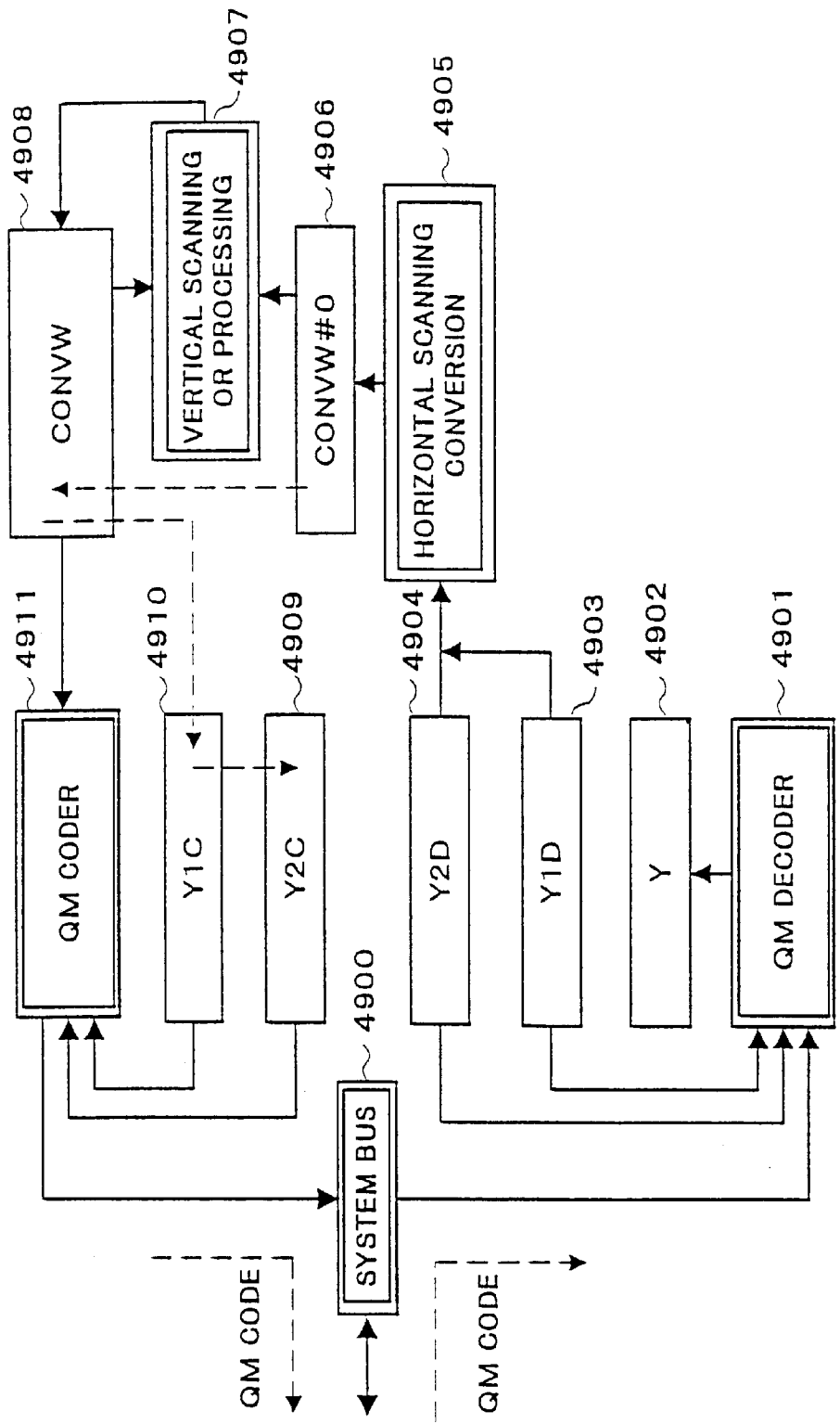
FIG. 49 is an illustration of a data movement of code conversion from QM code to QM code.

FIG. 49 is an illustration of the code conversion processing from the QM code to the QM code. These correspond to processing of the command code 0x22 in the command list in FIG. 14. In this code conversion, the attribute of the page size and QM encoding, for example, selection of template, the location of AT pixel, the presence or absence of TP mode or the like can be converted by resolution conversion.

QM decoding (4901 to 4904) and resolution conversion (4905 to 4908) in FIG. 49 are the same configuration as FIG. 47. QM encoding (4909 to 4911) are the same configuration as FIG. 45.

Figure 50:
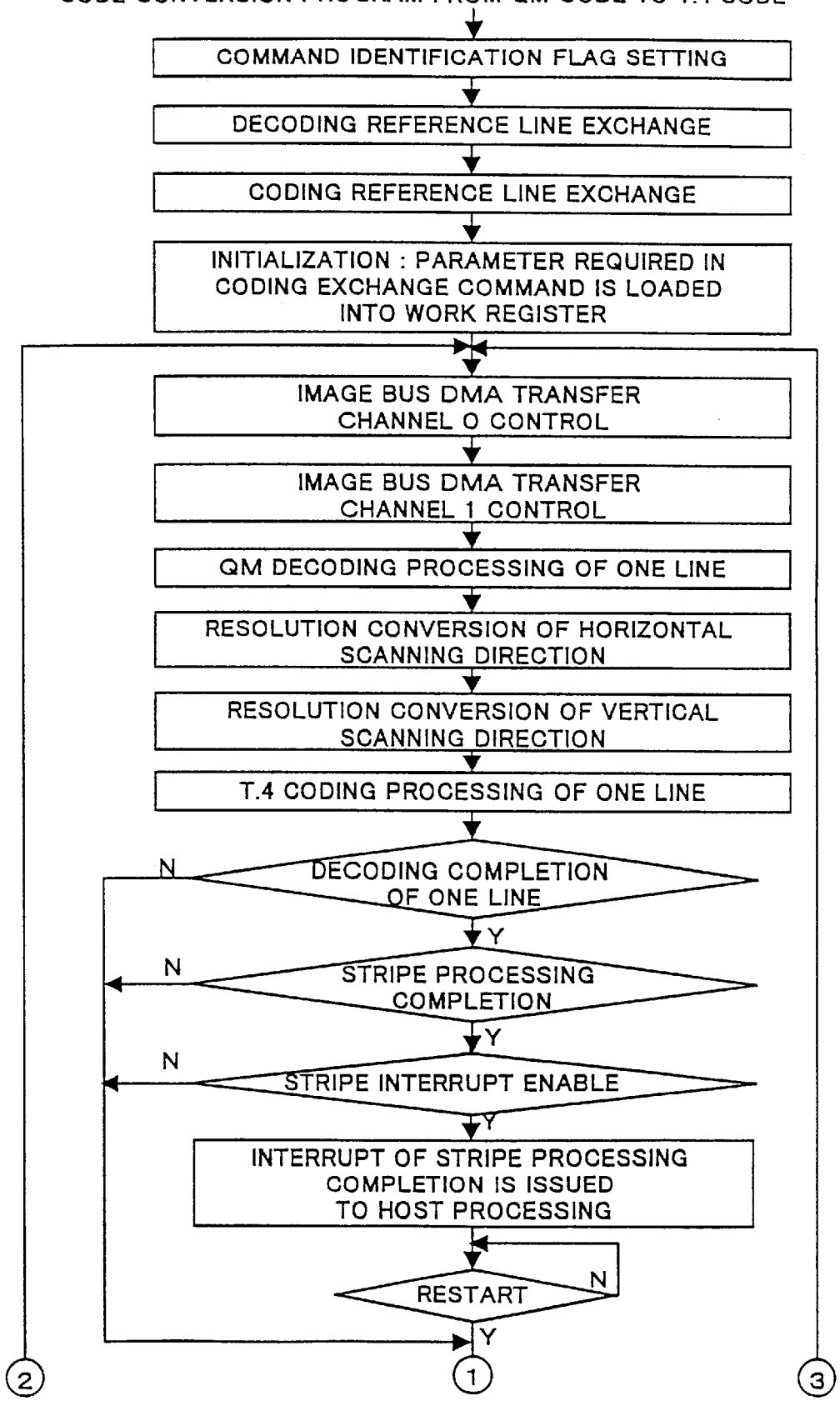
FIG. 50 is an illustration of the first half of code conversion from QM code to QM code.
Figure 51:
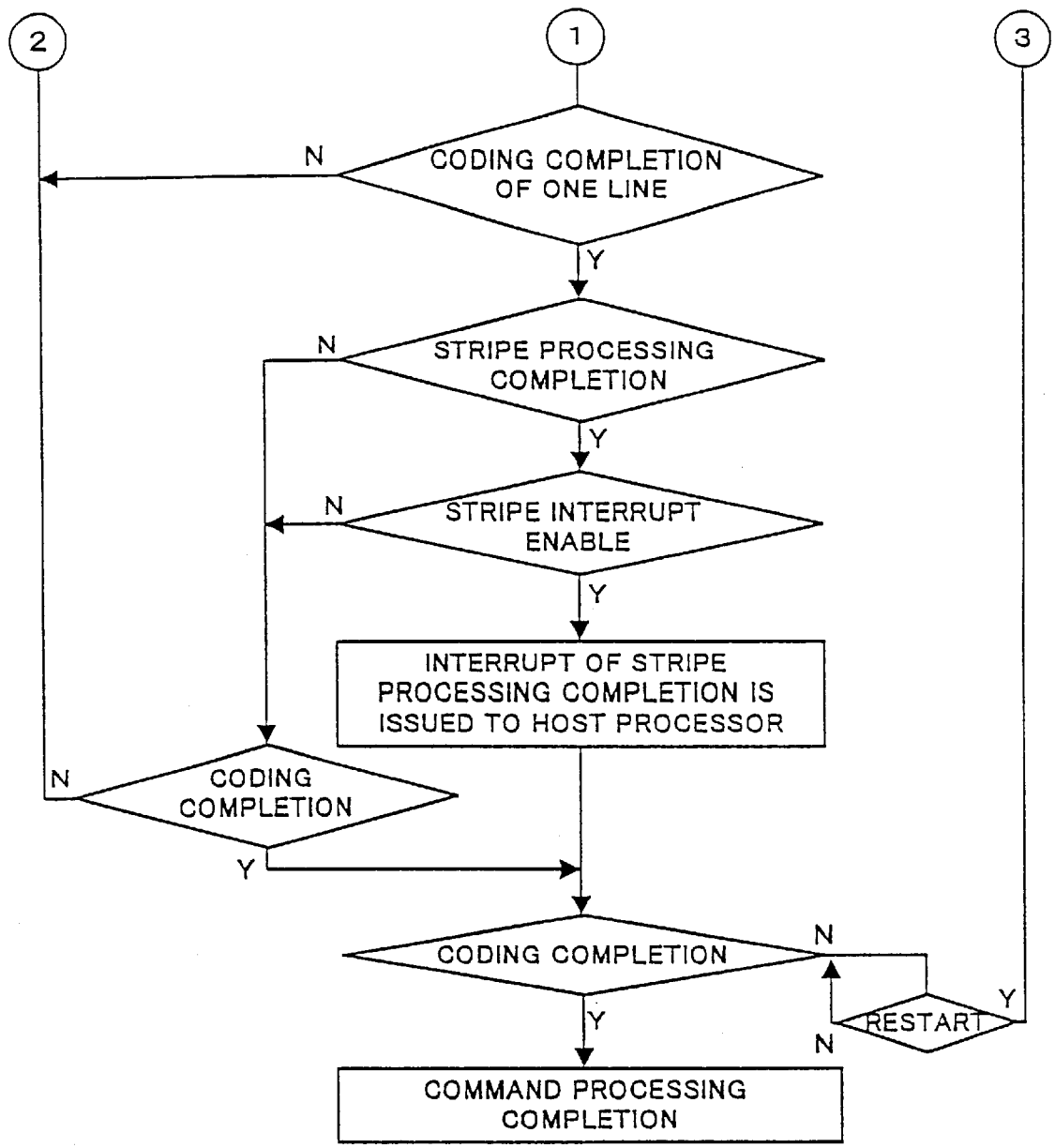
FIG. 51 is an illustration of the latter half of code conversion from QM code to QM code.

FIG. 50 and FIG. 51 are processing flows of the code conversion from the QM code to the QM code. These are a combination of QM decoding processing and QM encoding and each component of the flow is the content described above already.

[Initialization Command Processing]

Subsequently, initialization processing of QM encoding/QM decoding is described. These correspond to processing of the command code 0x18 to 0x19 in the command list in FIG. 14. The MPU allows, first, to execute initialization processing for this image processor. After completion thereof, the command such as encoding, decoding and code conversion are issued.

In QM encoding initialization command, the following processing are performed mainly. Entire area of the context table for encoding is cleared. The reference line memory for encoding is cleared. Referring to the encoding parameter set in the a parameter register shown in FIG. 11, the header information (hereinafter referred to as BIH) to be added to the encoded data is sent.

Figure 52:
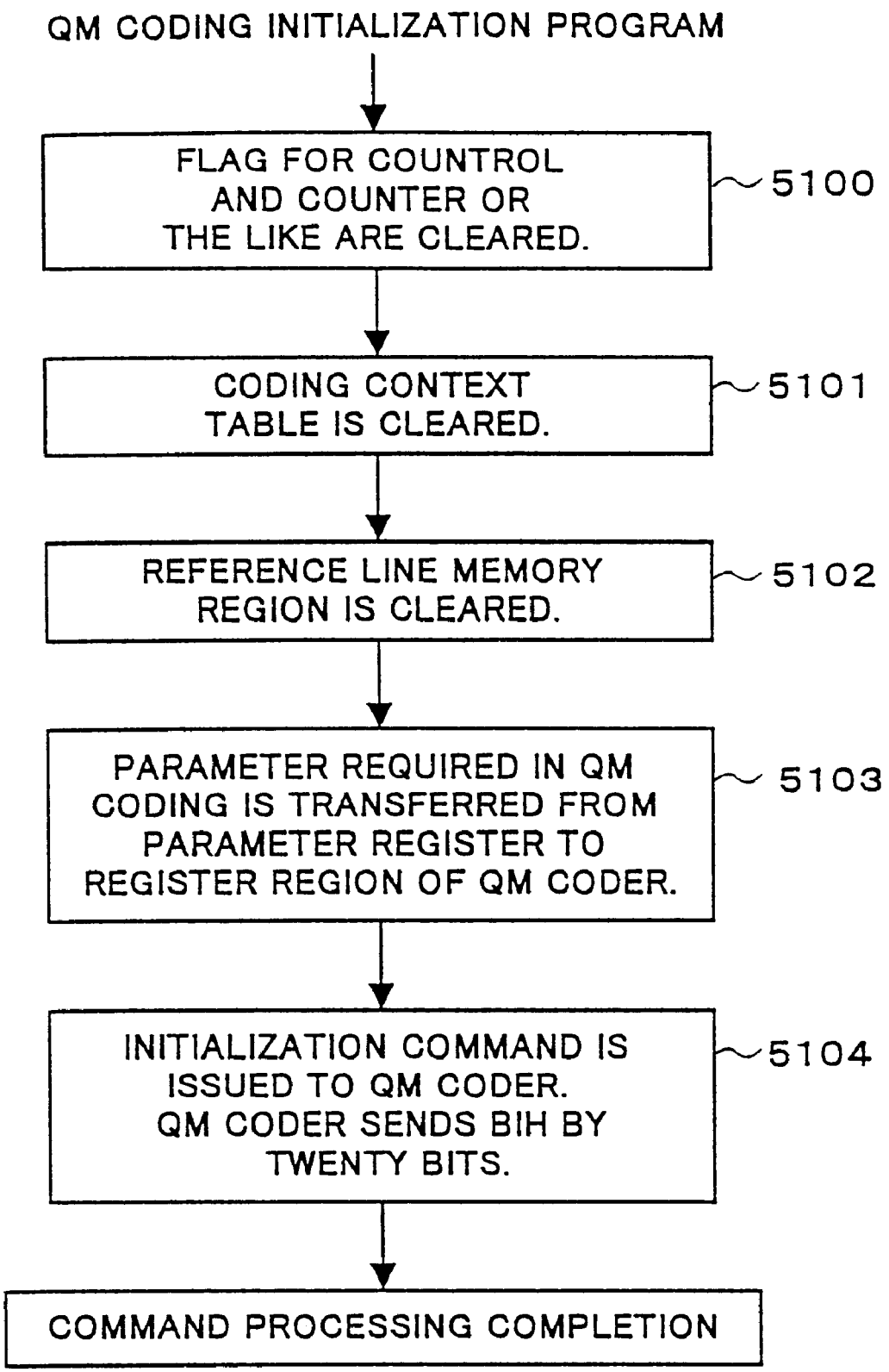
FIG. 52 is a flowchart of initialization of QM encoding

FIG. 52 shows a flowchart of the QM encoding initialization command. Processing 5100 clears the flag bit and the counter for control. Processing 5100 clears the context table 600 for encoding (FIG. 6) consisting of 1024 bytes. Processing 5102 clears the reference line memory Y1C and Y2C.

Processing 5103 transfers the parameter required in encoding to register 601 (FIG. 6) inside QM encoder. QM encoder generates BIH in processing 5104, to send to the system bus referring to the parameter. The format of BIH is specified in ITU recommendation T.82. The parameters included in BIH are, for example, the number of pixel of one line, the number of lines of one page (YD), the number of lines constituting the stripe, horizontal scanning of AT pixel, the offset of the vertical scanning direction, selection of template TP mode or the like.

Heretofore, the MPU has written the header information BIH in code memory and only the encoded data connected thereto has been generated by an encoding device. In this embodiment, the encoding device generates BIH to the encoded data.

Figure 53:
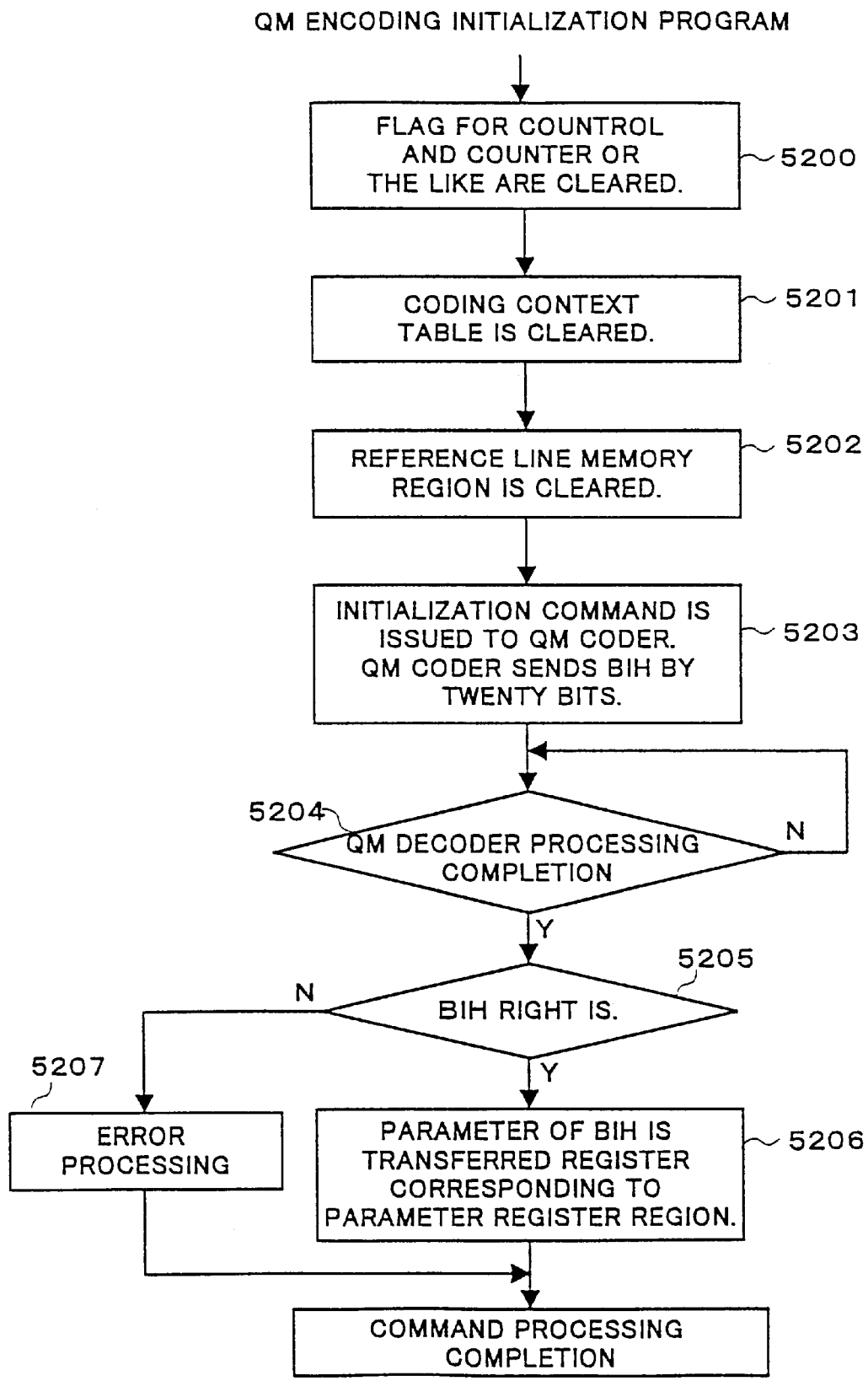
FIG. 53 is a flowchart of initialization of QM decoding

FIG. 53 is flowchart of the QM decoding initialization. The processing content is substantially similar to encoding, and is as follows.

First, the entire area of the context table for decoding is cleared, and the reference line memory for decoding is cleared. Moreover, BIH is red, and whether the content is proper or not is checked and the analyzed BIH information is extended to the decoding parameter register area shown in FIG. 11.

Processing 5200 to processing 5202 execute the same processing as encoding for decoding. In processing 5203, the control section 114 in FIG. 14 issues the command executing initialization processing to QM decoder, and BIH is red from the system bus, and analysis of the content is executed. All this while, the system is in latency at processing 5204.

After completion of analysis, whether BIH is proper on the syntax or not and whether being compatible with this image processor are judged in processing 5205. If being problems, the code showing the situation is set in the predetermined register which the MPU can understand in processing 5207 and initialization processing is completed. If BIH is proper, the parameter of BIH is extended to the decoding parameter register area in processing 5206 and initialization processing is completed.

Heretofore, the MPU has executed analysis of the header information BIH and the decoding device has executed the decode of the encoded data only. In this embodiment, the decoding device executes analysis of BIH to decoding of the encoded data.

As is apparent from the above description, this invention has the following advantages.

Each code-conversion device of MH, MR and MMR and QM being a typical encoding of a binary image is integrated concentrating on line memory, whereby decoding processing of MH code, MR code or MMR code and QM encoding processing can be performed at high speed.

For encoding processing for expansion of the vertical scanning direction, the code data corresponding to the image to be extended can be generated without constituting the image to be extended on memory by operating the address pointer of the line to be encoded and the reference line, whereby the device scale can be minimized and high speed processing is realized.

Expansion of the vertical scanning direction at data transfer and decoding is executed without constituting the image to be extended on memory by sending the object line to be expansion a plurality of times, whereby the device scale can be minimized and high speed processing is realized.

Conversion from MH, MR and MMR codes to QM code and vice versa can be performed without accessing the memory outside the image processing apparatus, whereby conversion processing can be executed at high speed.

Conversion from QM code to QM code can be performed at high speed without accessing the memory outside the image processor by changing the encoding parameter.

When MR and MMR encoding and MR and MMR decoding, and QM encoding and QM decoding are performed exchanging at groups of a plurality of lines, exchange of the reference line is performed automatically, whereby time sharing processing of a different encoding can be performed at high speed.

The conversion parameter is represented by a set of the number of line being thinned-out consecutively and the number of line OR thinned-out being consecutively at reduction conversion of the vertical scanning direction, thereby flexibility of vertical scanning reduction being able to be improved.

The leading address at write and at read of line memory can be set independently, whereby the movement of the image to both sides within a page can be executed freely. A combination with encoding can be performed, whereby the encoded data corresponding to the movement of the image to both sides within a page can be generated.

When detection of NEWLEN marker code at QM decoding is retarded by any cause, the code and the number of the lines reconstituted excessively showing the retardation can be calculated to notice to an MPU, whereby the disused line data can be removed before recording.

The final stripe is determined automatically at QM encoding and insertion of the control code required is performed at high speed without interposition of the MPU.

Addition, analysis/separation of the header information to the row of the encoded data is executed at high speed without interposition of the MPU at QM encoding and QM decoding.

What is claimed is:

1. An image processing apparatus comprising:
   a plurality of code-conversion devices for performing at least one of encoding and decoding by different codes, an internal memory being shared by said each code conversion device; and
   a control section for controlling an operation of said each code-conversion device;
   wherein said plurality of code-conversion devices, said internal memory and said control section are integrated in one chip, and coded data are converted to another coded data having a different form within the one chip, wherein said code-conversion devices comprise a first code-conversion device for performing encoding and decoding by MH code, MR code or MMR code and a second code-conversion device for performing encoding and decoding by QM code, and,
   in a code conversion process for converting the MH code, the MR code or the MMR code entered from the external bus to the QM code, said first code-conversion device and said second code-conversion device perform decoding processing of the MH code, the MR code or the MMR code and perform QM coding using a line memory secured in the internal memory, without outputting intermediate data to the exterior of the one chip.

2. The image processing apparatus according to claim 1, further comprising an internal bus for transferring data to each said code-conversion device and said internal memory, and external bus control means for interface with an external bus,
   wherein said internal memory provides a line memory to each said code-conversion device.

3. The image processing apparatus according to claim 1, wherein the line memory which said resolution converting device uses is secured in the internal memory, and the line memory of said internal memory is used in a process of resolution conversion by said resolution converting device, without outputting intermediate data to the exterior of the one chip.

4. The image processing apparatus according to claim 1, wherein expansion encoding is performed by operating an address pointer of an encoded line and the reference line, when expansion processing in a vertical scanning direction to the encoded data is executed.

5. The image processing apparatus according to claim 1, wherein expansion processing is performed by outputting an object line to be extended a plurality of times, when expansion processing in a vertical scanning direction is executed.

6. The image processing apparatus according to claim 1, wherein, when detection of a control code showing the number of reconstituted lines is retarded upon QM decoding, information indicative of the retardation is transmitted to the outside of the code-conversion devices.

7. The image processing apparatus according to claim 1, wherein, when encoding by QM code, a final stripe is identified to insert a required a control code.

8. The image processing apparatus according to claim 1, wherein the control section executes additional processing of header information for a row of the encoded data.

9. The image processing apparatus according to claim 1, wherein the control section executed analysis/separation of header information added to a row of the encoded data.

10. An image processing apparatus comprising:
    a plurality of code-conversion devices for performing at least one of encoding and decoding by different codes, an internal memory being shared by said each code conversion device;
    a control section for controlling an operation of said each code-conversion device;
    wherein said plurality of code-conversion devices, said internal memory and said control section are integrated in one chip, and coded data are converted to another coded data having a different form within the one chip; and
    a resolution converting device for performing resolution conversion of an image, said resolution converting device sharing said internal memory with said code conversion devices,
    wherein said code-conversion devices, said resolution converting device and said control section are integrated in one chip, and the coded data is converted to another resolution, within the chip, wherein said resolution converting device combines consecutive thinned-out processing and consecutive OR thinned-out processing, when reduction conversion of the entered image data is performed in the vertical scanning direction.

11. The image processing apparatus according to claim 10, further comprising an internal bus for transferring data to said code-conversion devices, said resolution converting device and said internal memory, and external bus control means for interface with an external bus,
    wherein said internal memory provides a line memory to said code-conversion devices and said resolution converting device.

12. An image processing apparatus comprising:
    a plurality of code-conversion devices for performing at least one of encoding and decoding by different codes, an internal memory being shared by said each code conversion device; and
    a control section for controlling an operation of said each code-conversion device;
    wherein said plurality of code-conversion devices, said internal memory and said control section are integrated in one chip, and coded data are converted to another coded data having a different form within the one chip, wherein said code-conversion devices comprise a first code-conversion device for performing encoding and decoding by MH code, MR code or MMR code and a second code-conversion device for performing encoding and decoding by QM code, and, in a code conversion process for converting the QM code entered from the external bus to the MH code, the MR code or the MMR code, said first code-conversion device and said second code-conversion device perform decoding processing of the QM code and perform encoding processing of the MH code, the MR code or the MMR code using a line memory secured in the internal memory, without outputting intermediate data to the exterior of the one chip.

13. The image processing apparatus according to claim 12, further comprising an internal bus for transferring data to each said code-conversion device and said internal memory, and external bus control means for interface with an external bus, wherein said internal memory provides a line memory to each said code-conversion device.

14. The image processing apparatus according to claim 12, wherein expansion encoding is performed by operating an address pointer of an encoded line and the reference line, when expansion processing in a vertical scanning direction to the encoded data is executed.

15. The image processing apparatus according to claim 12, wherein expansion processing is performed by outputting an object line to be extended a plurality of times, when expansion processing in a vertical scanning direction is executed.

16. The image processing apparatus according to claim 12, wherein the control section executes additional processing of header information for a row of the encoded data.

17. The image processing apparatus according to claim 12, wherein the control section executes analysis/separation of header information added to a row of the encoded data.

18. An image processing apparatus comprising:

a plurality of code-conversion devices for performing at least one of encoding and decoding by different codes, an internal memory being shared by said each code conversion device; and a control section for controlling an operation of said each code-conversion device;

wherein said plurality of code-conversion devices, said internal memory and said control section are integrated in one chip, and coded data are converted to another coded data having a different form within the one chip, wherein said code-conversion devices comprise a first code-conversion device for performing encoding and decoding by MH code, MR code or MMR code and a second code-conversion device for performing encoding and decoding by QM code, and in a code conversion process for converting a first QM code entered from the external bus to a second QM code different from the first QM code in an encoding parameter, said second code-conversion device performs decoding processing of the first QM code and encoding processing to the second QM code having a different encoding parameter using a line memory secured in the internal memory, without outputting intermediate data to the exterior of the one chip.

19. The image processing apparatus according to claim 18, further comprising an internal bus for transferring data to each said code-conversion device and said internal memory, and external bus control means for interface with an external bus, wherein said internal memory provides a line memory to each said code-conversion device.

20. The image processing apparatus according to claim 18, wherein expansion encoding is performed by operating an address pointer of an encoded line and the reference line, when expansion processing in a vertical scanning direction to the encoded data is executed.

21. The image processing apparatus according to claim 18, wherein expansion processing is performed by outputting an object line to be extended a plurality of times, when expansion processing in a vertical scanning direction is executed.

22. The image processing apparatus according to claim 18, wherein the control section executes additional processing of header information for a row of the encoded data.

23. The image processing apparatus according to claim 18, wherein the control section executes analysis/separation of header information added to a row of the encoded data.

24. An image processing apparatus comprising:

a plurality of code-conversion devices for performing at least one of encoding and decoding by different codes, an internal memory being shared by said each code conversion device; and a control section for controlling an operation of said each code-conversion device;

wherein said plurality of code-conversion devices, said internal memory and said control section are integrated in one chip, and first coded data are converted to second coded data having a different form within the one chip, wherein the internal memory comprises a line memory area used in encoding processing and decoding processing by said code-conversion devices and a parameter register area holding parameter groups used in the encoding processing and the decoding processing, wherein a reference line of MR encoding or MMR encoding and a reference line of QM encoding are assigned in a common area of the line memory area.

25. The image processing apparatus according to claim 24, wherein the parameter groups stored in the parameter register area are transferred to a storage section that is under control of the control section of a processing unit in a single operation.

26. An image processing apparatus comprising:

a plurality of code-conversion devices for performing at least one of encoding and decoding by different codes, an internal memory being shared by said each code conversion device; and a control section for controlling an operation of said each code-conversion device;

wherein said plurality of code-conversion devices, said internal memory and said control section are integrated in one chip, and coded data are converted to another coded data having a different form within the one chip, wherein the internal memory comprises a line memory area used in encoding processing and decoding processing by said code-conversion devices and a parameter register area holding parameter groups used in the encoding processing and the decoding processing, wherein a reference line of MR decoding or MMR decoding and a reference line of QM decoding are assigned in a common area of the line memory area.

27. An image processing apparatus comprising:

a plurality of code-conversion devices for performing at least one of encoding and decoding by different codes, an internal memory being shared by said each code conversion device; and a control section for controlling an operation of said each code-conversion device;

wherein said plurality of code-conversion devices, said internal memory and said control section are integrated in one chip, and coded data are converted to another coded data having a different form within the one chip, wherein the internal memory comprises a line memory area used in encoding processing and decoding processing by said code-conversion devices and a parameter register area holding parameter groups used in the encoding processing and the decoding processing, wherein the parameter groups are stored in the parameter register area, separated into processing units, said processing units including at least one of a MR encoding processing unit and a QM decoding processing unit.

28. An image processing apparatus comprising:

a plurality of code-conversion devices for performing at least one of encoding and decoding by different codes, an internal memory being shared by said each code conversion device; and a control section for controlling an operation of said each code-conversion device;

wherein said plurality of code-conversion devices, said internal memory and said control section are integrated in one chip, and coded data are converted to another coded data having a different form within the one chip, wherein an object line to be expanded is output a plurality of times without extending image data into an external memory, when the image data entered from the exterior of the one chip is output to the exterior of the one chip after being extended in the vertical scanning direction, expansion processing being performed thereby.

29. The image processing apparatus according to claim 28, further comprising an internal bus for transferring data to each said code-conversion device and said internal memory, and external bus control means for interface with an external bus, wherein said internal memory provides a line memory to each said code-conversion device.

30. The image processing apparatus according to claim 28, wherein expansion encoding is performed by operating an address pointer of an encoded line and the reference line, when expansion processing in a vertical scanning direction to the encoded data is executed.

31. The image processing apparatus according to claim 28, wherein expansion processing is performed by outputting an object line to be extended a plurality of times, when expansion processing in a vertical scanning direction is executed.

32. The image processing apparatus according to claim 28, wherein the control section executes additional processing of header information for a row of the encoded data.

33. The image processing apparatus according to claim 28, wherein the control section executes analysis/separation of header information added to a row of the encoded data.

34. The image processing apparatus according to claim 10, wherein a parameter for reduction conversion comprises a number of consecutive thinning-out lines and a number of consecutive OR thinning-out lines.

35. An image processing apparatus comprising:

a plurality of code-conversion devices for performing at least one of encoding and decoding by different codes, an internal memory being shared by said each code conversion device;

a control section for controlling an operation of said each code-conversion device;

wherein said plurality of code-conversion devices, said internal memory and said control section are integrated in one chip, and coded data are converted to another coded data having a different form within the one chip;

an address counter in which a leading address of a line memory is set, an address register in which the leading address of the line memory that is set as an initial value of said address counter is stored, an offset register in which an offset value to be added to the leading address output from said address register is stored; and means for shifting the image in right and left directions within a page by controlling the offset value upon write and read of the line memory.

36. The image processing apparatus according to claim 35, wherein movement of the image in right and left directions within a page is executed substantially in parallel with generation of the encoded data by the plurality of code-conversion devices.

37. The image processing apparatus according to claim 35, further comprising an internal bus for transferring data to each said code-conversion device and said internal memory, and external bus control means for interface with an external bus, wherein said internal memory provides a line memory to each said code-conversion device.

38. The image processing apparatus according to claim 35, wherein expansion encoding is performed by operating an address pointer of an encoded line and the reference line, when expansion processing in a vertical scanning direction to the encoded data is executed.

39. The image processing apparatus according to claim 35, wherein expansion processing is performed by outputting an object line to be extended a plurality of times, when expansion processing in a vertical scanning direction is executed.

40. The image processing apparatus according to claim 35, wherein the control section executes additional processing of header information for a row of the encoded data.

41. The image processing apparatus according to claim 35, wherein the control section executes analysis/separation of header information added to a row of the encoded data.

42. An image processing apparatus comprising:

a plurality of code-conversion devices for performing at least one of encoding and decoding by different codes, an internal memory being shared by said each code conversion device; and a control section for controlling an operation of said each code-conversion device;

wherein said plurality of code-conversion devices, said internal memory and said control section are integrated in one chip, and coded data are converted to another coded data having a different form within the one chip, wherein exchange processing of a line is performed so that a reference line of the code conversion device of an object for operation is secured in a line memory, while a plurality of code-conversion devices are operated.

43. The image processing apparatus according to claim 42, further comprising an internal bus for transferring data to each said code-conversion device and said internal memory, and external bus control means for interface with an external bus, wherein said internal memory provides a line memory to each said code-conversion device.

44. The image processing apparatus according to claim 42, wherein expansion encoding is performed by operating an address pointer of an encoded line and the reference line, when expansion processing in a vertical scanning direction to the encoded data is executed.

45. The image processing apparatus according to claim 42, wherein expansion processing is performed by outputting an object line to be extended a plurality of times, when expansion processing in a vertical scanning direction is executed.

46. The image processing apparatus according to claim 42, wherein the control section executes additional processing of header information for a row of the encoded data.

47. The image processing apparatus according to claim 42, wherein the control section executes analysis/separation of header information added to a row of the encoded data.

48. An image communication device, comprising:
an image input device;
an image recorder/display device; and
an image processing apparatus operatively connected to said image input device and said image recorder/display device, said image processing apparatus comprising:
a plurality of code-conversion devices for performing at least one of encoding and decoding by different codes, an internal memory being shared by said each code conversion device; and
a control section for controlling an operation of said each code-conversion device;
wherein said plurality of code-conversion devices, said internal memory and said control section are integrated in one chip, and coded data are converted to another coded data having a different form within the one chip, wherein said code-conversion devices comprise a first code-conversion device for performing encoding and decoding by MH code, MR code or MMR code and a second code-conversion device for performing encoding and decoding by QM code, and,
in a code conversion process for converting the MH code, the MR code or the MMR code entered from the external bus to the QM code, said first code-conversion device and said second code-conversion device perform decoding processing of the MH code, the MR code or the MMR code and perform QM coding using a line memory secured in the internal memory, without outputting intermediate data to the exterior of the one chip.

49. The image communication device according to claim 48, said image processing device further comprising an internal bus for transferring data to each said code-conversion device and said internal memory, and external bus control means for interface with an external bus,
wherein said internal memory provides a line memory to each said code-conversion device.

50. The image communication device according to claim 48, wherein expansion encoding is performed by operating an address pointer of an encoded line and the reference line, when expansion processing in a vertical scanning direction to the encoded data is executed.

51. The image communication device according to claim 48, wherein expansion processing is performed by outputting an object line to be extended a plurality of times, when expansion processing in a vertical scanning direction is executed.

52. The image communication device according to claim 48, wherein the control section executes additional processing of header information for a row of the encoded data.

53. The image communication device according to claim 48, wherein the control section executes analysis/separation of header information added to a row of the encoded data.

54. The image communication device according to claim 48, wherein the line memory which said resolution converting device uses is secured in the internal memory, and the line memory of said internal memory is used in a process of resolution conversion by said resolution converting device, without outputting intermediate data to the exterior of the one chip.

55. The image communication device according to claim 48, wherein, when detection of a control code showing the number of reconstituted lines is retarded upon QM decoding, information indicative of the retardation is transmitted to the outside of the code-conversion devices.

56. The image communication device according to claim 48, wherein, when encoding by QM code, a final stripe is identified to insert a required control code.

57. An image communication device, comprising:
an image input device;
an image recorder/display device; and
an image processing apparatus operatively connected to said image input device and said image recorder/display device, said image processing apparatus comprising:
a plurality of code-conversion devices for performing at least one of encoding and decoding by different codes, an internal memory being shared by said each code conversion device; and
a control section for controlling an operation of said each code-conversion device;
wherein said plurality of code-conversion devices, said internal memory and said control section are integrated in one chip, and coded data are converted to another coded data having a different form within the one chip, wherein said code-conversion devices comprise a first code-conversion device for performing encoding and decoding by MH code, MR code or MMR code and a second code-conversion device for performing encoding and decoding by QM code, and,
in a code conversion process for converting the QM code entered from the external bus to the MH code, the MR code or the MMR code, said first code-conversion device and said second code-conversion device perform decoding processing of the QM code and perform encoding processing of the MH code, the MR code or the MMR code using a line memory secured in the internal memory, without outputting intermediate data to the exterior of the one chip.

58. The image communication device according to claim 57, said image processing device further comprising an internal bus for transferring data to each said code-conversion device and said internal memory, and external bus control means for interface with an external bus,
wherein said internal memory provides a line memory to each said code-conversion device.

59. The image communication device according to claim 57, wherein expansion encoding is performed by operating an address pointer of an encoded line and the reference line, when expansion processing in a vertical scanning direction to the encoded data is executed.

60. The image communication device according to claim 57, wherein expansion processing is performed by outputting an object line to be extended a plurality of times, when expansion processing in a vertical scanning direction is executed.

61. The image communication device according to claim 57, wherein the control section executes additional processing of header information for a row of the encoded data.

62. The image communication device according to claim 57, wherein the control section executes analysis/separation of header information added to a row of the encoded data.

63. An image communication device, comprising:
an image input device;
an image recorder/display device; and
an image processing apparatus operatively connected to said image input device and said image recorder/display device, said image processing apparatus comprising:
a plurality of code-conversion devices for performing at least one of encoding and decoding by different codes, an internal memory being shared by said each code conversion device; and
a control section for controlling an operation of said each code-conversion device;
wherein said plurality of code-conversion devices, said internal memory and said control section are integrated in one chip, and coded data are converted to another coded data having a different form within the one chip, wherein said code-conversion devices comprise a first code-conversion device for performing encoding and decoding by MH code, MR code or MMR code and a second code-conversion device for performing encoding and decoding by QM code, and
in a code conversion process for converting a first QM code entered from the external bus to a second QM code different from the first QM code in an encoding parameter, said second code-conversion device performs decoding processing of the first QM code and encoding processing to the second QM code having a different encoding parameter using a line memory secured in the internal memory, without outputting intermediate data to the exterior of the one chip.

64. The image communication device according to claim 63, said image processing device further comprising an internal bus for transferring data to each said code-conversion device and said internal memory, and external bus control means for interface with an external bus,
wherein said internal memory provides a line memory to each said code-conversion device.

65. The image communication device according to claim 63, wherein expansion encoding is performed by operating an address pointer of an encoded line and the reference line, when expansion processing in a vertical scanning direction to the encoded data is executed.

66. The image communication device according to claim 63, wherein expansion processing is performed by outputting an object line to be extended a plurality of times, when expansion processing in a vertical scanning direction is executed.

67. The image communication device according to claim 63, wherein the control section executes additional processing of header information for a row of the encoded data.

68. The image communication device according to claim 63, wherein the control section executes analysis/separation of header information added to a row of the encoded data.

69. An image communication device, comprising:
an image input device;
an image recorder/display device; and
an image processing apparatus operatively connected to said image input device and said image recorder/display device, said image processing apparatus comprising:
a plurality of code-conversion devices for performing at least one of encoding and decoding by different codes, an internal memory being shared by said each code conversion device; and
a control section for controlling an operation of said each code-conversion device;
wherein said plurality of code-conversion devices, said internal memory and said control section are integrated in one chip, and coded data are converted to another coded data having a different form within the one chip, wherein an object line to be expanded is output a plurality of times without extending image data into an external memory, when the image data entered from the exterior of the one chip is output to the exterior of the one chip after being extended in the vertical scanning direction, expansion processing being performed thereby.

70. The image communication device according to claim 69, said image processing device further comprising an internal bus for transferring data to each said code-conversion device and said internal memory, and external bus control means for interface with an external bus,
wherein said internal memory provides a line memory to each said code-conversion device.

71. The image communication device according to claim 69, wherein expansion encoding is performed by operating an address pointer of an encoded line and the reference line, when expansion processing in a vertical scanning direction to the encoded data is executed.

72. The image communication device according to claim 69, wherein expansion processing is performed by outputting an object line to be extended a plurality of times, when expansion processing in a vertical scanning direction is executed.

73. The image communication device according to claim 69, wherein the control section executes additional processing of header information for a row of the encoded data.

74. The image communication device according to claim 69, wherein the control section executes analysis/separation of header information added to a row of the encoded data.

75. An image communication device, comprising:
an image input device;
an image recorder/display device; and
an image processing apparatus operatively connected to said image input device and said image recorder/display device, said image processing apparatus comprising:
a plurality of code-conversion devices for performing at least one of encoding and decoding by different codes, an internal memory being shared by said each code conversion device;
a control section for controlling an operation of said each code-conversion device;
wherein said plurality of code-conversion devices, said internal memory and said control section are integrated in one chip, and coded data are converted to another coded data having a different form within the one chip;
an address counter in which a leading address of a line memory is set,
an address register in which the leading address of the line memory that is set as an initial value of said address counter is stored,
an offset register in which an offset value to be added to a leading address output from said address register is stored; and
means for shifting the image in right and left directions within a page by controlling the offset value upon write and read of the line memory.

76. The image communication device according to claim 75, said image processing device further comprising an internal bus for transferring data to each said code-conversion device and said internal memory, and external bus control means for interface with an external bus, wherein said internal memory provides a line memory to each said code-conversion device.

77. The image communication device according to claim 75, wherein expansion encoding is performed by operating an address pointer of an encoded line and the reference line, when expansion processing in a vertical scanning direction to the encoded data is executed.

78. The image communication device according to claim 75, wherein expansion processing is performed by outputting an object line to be extended a plurality of times, when expansion processing in a vertical scanning direction is executed.

79. The image communication device according to claim 75, wherein the control section executes additional processing of header information for a row of the encoded data.

80. The image communication device according to claim 75, wherein the control section executes analysis/separation of header information added to a row of the encoded data.

81. The image communication device according to claim 75, wherein movement of the image in right and left directions within a page is executed substantially in parallel with generation of the encoded data by the plurality of code-conversion devices.

82. An image communication device, comprising:

an image input device;

an image recorder/display device; and an image processing apparatus operatively connected to said image input device and said image recorder/display device, said image processing apparatus comprising:

a plurality of code-conversion devices for performing at least one of encoding and decoding by different codes, an internal memory being shared by said each code conversion device; and a control section for controlling an operation of said each code-conversion device;

wherein said plurality of code-conversion devices, said internal memory and said control section are integrated in one chip, and coded data are converted to another coded data having a different form within the one chip, wherein exchange processing of a line is performed so that a reference line of the code conversion device of an object for operation is secured in a line memory, while a plurality of code-conversion devices are operated.

83. The image communication device according to claim 82, said image processing device further comprising an internal bus for transferring data to each said code-conversion device and said internal memory, and external bus control means for interface with an external bus, wherein said internal memory provides a line memory to each said code-conversion device.

84. The image communication device according to claim 82, wherein expansion encoding is performed by operating an address pointer of an encoded line and the reference line, when expansion processing in a vertical scanning direction to the encoded data is executed.

85. The image communication device according to claim 82, wherein expansion processing is performed by outputting an object line to be extended a plurality of times, when expansion processing in a vertical scanning direction is executed.

86. The image communication device according to claim 82, wherein the control section executes additional processing of header information for a row of the encoded data.

87. The image communication device according to claim 82, wherein the control section executes analysis/separation of header information added to a row of the encoded data.

* * * * *